United States Patent
Kohut

(10) Patent No.: US 11,578,481 B1
(45) Date of Patent: Feb. 14, 2023

(54) DISTRIBUTED COMMUNICATIONS PLATFORM THEATER CONTROL SYSTEM

(71) Applicant: Global Air Logistics and Training, Inc., Del Mar, CA (US)

(72) Inventor: John Kohut, Carlsbad, CA (US)

( * ) Notice: Subject to any disclaimer, the term of this patent is extended or adjusted under 35 U.S.C. 154(b) by 164 days.

(21) Appl. No.: 17/170,855

(22) Filed: Feb. 8, 2021

Related U.S. Application Data

(60) Provisional application No. 62/971,951, filed on Feb. 8, 2020.

(51) Int. Cl.
| | | |
|---|---|---|
| *E04B 1/343* | (2006.01) | |
| *E04B 1/348* | (2006.01) | |
| *H04W 4/80* | (2018.01) | |
| *G06F 16/25* | (2019.01) | |
| *H04W 84/18* | (2009.01) | |
| *G06F 16/28* | (2019.01) | |

(52) U.S. Cl.
CPC ...... *E04B 1/34321* (2013.01); *E04B 1/34336* (2013.01); *E04B 1/34807* (2013.01); *G06F 16/258* (2019.01); *G06F 16/285* (2019.01); *H04W 4/80* (2018.02); *H04W 84/18* (2013.01)

(58) Field of Classification Search
CPC ............ E04B 1/34321; E04B 1/34336; E04B 1/34807; H04W 4/80; H04W 84/18; G06F 16/285; G06F 16/258
See application file for complete search history.

(56) References Cited

U.S. PATENT DOCUMENTS

| | | | |
|---|---|---|---|
| 7,424,225 B1* | 9/2008 | Elliott | H04B 7/18504 398/118 |
| 9,441,357 B1* | 9/2016 | Vafaee | E04B 1/34336 |
| 10,673,646 B1* | 6/2020 | Shinar | H04L 5/0055 |
| 2016/0016362 A1* | 1/2016 | Kim | B23Q 15/00 700/98 |
| 2016/0142891 A1* | 5/2016 | Virhiä | G06Q 50/01 340/870.07 |
| 2016/0194863 A1* | 7/2016 | Schmitt | E04H 1/00 52/745.02 |
| 2016/0194893 A1* | 7/2016 | Schmitt | H05K 7/1497 52/173.1 |
| 2017/0123393 A1* | 5/2017 | Boicey | H04L 51/42 |
| 2018/0260877 A1* | 9/2018 | Li | G07G 1/0045 |
| 2020/0226442 A1* | 7/2020 | Volkerink | G06K 19/07773 |

* cited by examiner

*Primary Examiner* — Gisele D Ford
(74) *Attorney, Agent, or Firm* — BakerHostetler

(57) ABSTRACT

Presented herein is a transportable, distributed, edge-based, cloud-centered broadband command, control and communications infrastructure with built-in resilience that can be employed in data collection and integration, intelligence processing, mission planning, cognitive decision support and operational command, control and communications system. Specifically, a Modular Mission Systems (MIMS), composed of Modular Load Units (MLU), and tactical communications gateways integrated onto air platforms of opportunity in podded configurations (PODS) that can bring cloud-based, broadband communications and processing architectures to the tactical edge.

20 Claims, 38 Drawing Sheets

DISTRIBUTED COMMUNICATIONS PLATFORM THEATER CONTROL SYSTEM

CROSS-REFERENCE TO RELATED APPLICATIONS

This application is a continuation of U.S. Provisional Patent Application No. 62/971,951, filed Feb. 8, 2020, which is hereby expressly incorporated by reference in its entirety for all purposes.

BACKGROUND

The United States Department of Defense (DoD) has established global military dominance over the last three decades through many facets of military power, but perhaps the most compelling is its ability to centrally plan and direct military operations and communicate globally to its operational forces for execution. The fundamental challenge for the U.S. military now is that emerging adversaries have watched this capability and are taking dramatic and far-reaching steps to disrupt and destroy this unique capability, which would completely imperil our country's global standing and even our way of life.

U.S. airpower has been unmatched for the last several decades largely due to Centralized Command and Control (CCC) that employs industrial-era air power planning processes within a small number of Air and Space Operations Centers (AOC) located around the globe. Similarly, the Navy uses fixed Maritime Operating Centers (MOC) and two remaining C2 Ships. AOCs and MOCs, collectively in this application referred to as CCC Centers, are typically remote from the battlespace to enhance their survivability. CCC Centers are usually staffed by hundreds, if not thousands of officers, analysts, technicians, and support personnel, typically commanded by a four-star general or flag officer. The planning processes employed are referred to as industrial because they have reduced air power employment practically to a carefully honed mechanism with precise timing, massive numbers, global logistics and carefully calculated damage assessments. This level of planning, like operating a global airline or running a massive factory, requires rigid scheduling, strict obedience to orders and avoidance of change. For example, in the First Gulf War, thousands of American attack sorties devastated Iraq night after night without any mishaps. But the process is slow, so an adversary that attempts to disrupt it will have devastating impact on these carefully laid plans.

CCC Centers receive battlefield information from a variety of sensors in air, in space, on the ground and on the seas. In the Air Force's case, key contributors are E-3 Airborne Warning And Control System (AWACS) and the E-8 Joint Surveillance and Target Attack System (JSTARS). NATO and other allies depend upon the same or similar airborne sensors for their operations. While these aircraft have proven their meddle in finding and targeting numerous enemy planes, tanks, ships and soldiers, they are losing their effectiveness because they are ever more vulnerable to enemy attack and they are simply getting old. To be effective as sensors, they have to get close to the enemy but when they do, advanced ground and airborne threats can easily defeat them. Since survivability has become such an issue, the Air Force has abandoned plans to replace them with similar airplane systems.

Modern naval combatants, particularly large deck aircraft carriers, have significant centralized command and control capabilities and well-seasoned staffs to support mission planning and execution. Again, over the last few decades, these have been able to become integral parts of the U.S. global command and control systems by performing large scale planning, targeting and execution functions. However, again the emerging adversaries have developed weapons and sensors that can rapidly target and destroy these ships if they dare to radiate sensor or communications systems, which effectively takes them out of the CCC capabilities.

CCC Centers are connected to their in-theater sensors and operating air, ground and maritime forces via satellite communications and undersea cables that then connect to localized tactical networks. Against the adversaries of the past several decades, these command, control and communications capabilities were secure and reliable, but now are woefully vulnerable to assault by emerging adversaries. If CCC is physically destroyed or isolated from their sensors and/or their air, ground and maritime forces, these operating forces will become paralyzed resulting in a catastrophic defeat.

The DoD certainly is not standing still regarding modern technology. For example, the commercial world has moved much of its information storage and processing application capabilities into "the Cloud", which DoD is now following. The Cloud is actually a significant number of large, centralized data centers located around the world connected with robust data communications that can reach to any appropriately equipped user. Many U.S. and foreign companies have created these global clouds that are connecting more and more people. Many governmental organizations have migrated their data storage and processing capabilities to the cloud, with the Intelligence Community and DoD doing so at essentially all classification levels. These are very powerful tools in peacetime but ones that have unique vulnerabilities during times of conflict.

Many of the commercial data centers for the cloud are located within national borders of potential adversaries. If a conflict arises with such a nation, these centers could be coopted, disrupted, or destroyed, which would suddenly degrade the cloud. Similarly, the connectivity could be disrupted as will be discussed in paragraphs 0011 through 0013.

FIG. 1 illustrates a depicts, in a stylized way, how CCC interacts with in-theater and space sensors and commands operational forces today. In this diagram, the larger of the two surfaces represent the forward battle area and the smaller the rear area that CCC Center is located, which is far distant from the battle area. In FIG. 2, this arrangement is disrupted by enemy action that physically attacks the CCC Center, kinetically attacks communications satellites and jams global communications links. The effect is that anticipated direction from senior leaders to forward forces is stopped. Space-based sensors may still operate but their information can no longer reach CCC to be processed and there are no forward processing capabilities that could perform this function for the operational forces. Without ongoing direction from CCC and lacking real time intelligence, the cohesion of the operating forces crumbles, and the carefully orchestrated coordination of attack and defense operations disintegrates, spelling disaster. Against the emerging adversaries, a drastic change to our CCC doctrine is required, one that distributes command and control and enables it to directly connect with operational forces near the forward combat theater. This patent covers such a solution, but first the mechanisms for this CCC disruptions are illuminated.

Physical attacks on CCC Centers can be in the form of long range conventional or nuclear missile attack or special operations that assault the centers themselves or the personnel that support them. In either case, this would likely result in the complete elimination of planning, processing and execution control for an extended, if not indefinite period.

Space-based assets, either communications satellites or sensors, can be physically attacked by space-based, air launched or ground launched interceptors. By the nature of orbital mechanics, satellite positions can be readily predicted far in advance and can easily be targeted. Destruction mechanisms can impact a single satellite or a wide swath of orbital ranges with all satellites in those ranges likely impacted or destroyed. This latter point is particularly germane for those that anticipate highly populated satellite constellations in Low Earth Orbit (LEO) would be impervious to attack because of sheer numbers.

Another attack mechanism against satellite communications is electromagnetic jamming. Currently, the primary location of communications satellites is in Geo-synchronous Earth Orbit (GEO), which enables satellites to appear fixed in the sky. This means they are very predictable and susceptible to jamming from a wide variety of hostile platforms.

While Satellite Communications is generally thought to carry most of the global data, undersea fiber optics cables actually are the true global communications highways carrying 99% of international data. The DoD employs commercial undersea cables to move data into forward operational theaters where it then routes that data over secure military circuits to operational forces. This implies two vulnerabilities that adversaries will exploit, the undersea cables themselves and the junction points where the information is routed, each highly vulnerable to enemy disruption and exploitation.

As reliance on computer processing has grown within nearly all societies on Earth, the threat of using cyber warfare techniques has grown exponentially in just about every aspect of life. The internet and the Cloud have made cyber attacks available to nearly anyone anywhere. Emerging adversaries have in particular been active in this area, with a major focus of using these weapons to attack CCC. While many tools and techniques have been developed to counter this threat, the ability to isolate computational systems is a key method to prevent or mitigate such attacks. Of course, complete isolation would severely impair CCC so some method that maintains desired connectivity while preventing unwanted connectivity is needed.

Finally, an overarching imperative is to fight future wars with a coalition of allied nations to strengthen our side and further isolate the adversary. However, military operations, whether in peacetime or war, require segregating information so only cleared personnel with need-to-know gains access. Within the current CCC construct, this is primarily handled by physically separating the other national command centers from U.S. CCC Centers. That said, some coalition members become assigned to U.S. CCC Centers so they generally are physically segregated to spaces that have access only to information for which they are cleared. But when an adversary attacks CCC Centers and disrupts communications, the ability to command and control coalition forces ends.

What is needed, therefore, is a new command and control doctrine that distributes the functionality of the CCC Centers, moves these capabilities much closer to the operational forces, and makes command and control communication fully resilient and survivable. Such a Distributed Command and Control (DCC) approach needs new equipment and methodologies that are summarized herein. Of particular usefulness would be a dispersed, redundant communications web that is not subject to the same threats from which the current vulnerable infrastructure suffers. Further, it would be useful to have a rapidly configurable system that is highly adaptable, fluid, and easily upgraded for planning operations, processing intelligence and directing mission execution.

SUMMARY OF THE DISCLOSURE

Accordingly, provided herein is a transportable, distributed, edge-based, cloud-centered broadband command, control and communications infrastructure with built-in resilience that can be employed in data collection and integration, intelligence processing, mission planning, cognitive decision support and operational command, control and communications system to fully support DCC. Specifically, a Modular Mission Systems (MMS), composed of Modular Load Units (MLU), and tactical communications gateways integrated onto air platforms of opportunity in podded configurations (PODS) that can bring cloud-based, broadband communications and processing architectures to the tactical edge. Such systems can be employed by the CCC Centers as slices of capability, which includes members of the CCC Center staff, that can forward deploy on a wide variety of air, maritime and ground expeditionary platforms or installations to facilitate operational-level of war command and control and make in-theater communications resilient, seamless and secure from enemy attack. FIG. 3 illustrates how these MMS and PODS can be deployed in-theater and be fully connected with the CCC Center when global communications and cloud services are present, likely during peacetime. In this environment, all the capabilities of legacy Centralized Command and Control are retained and enhanced with in-theater C2 nodes that can speed up the information processing and decision making for operations. The MIMS in the various platforms are connected with each other and with the theater sensors and operational forces directly, forming a C2 Web that shares information, processing capabilities and decision making.

As depicted in FIG. 4, when the enemy attacks CCC Center and global communications (space-based communications and undersea cables), the C2 Web instantly recognizes the disruption and takes operational control without losing sensor feeds, connectivity with operational forces or ability to make decisions to fully prosecute the war. The web of MMS provide for continued broadband capabilities, massive in-theater processing power and enables critical, real-time decision making. In such an instance, the distributed command and control centers are able to fight through attack.

Particularly, implementing the distributed modular communications infrastructure for processing, storage, and transferring of data, as described herein, makes it more difficult to compromise forward communications. This imperviousness to disruption by attack is because of the inbuilt redundancy of having multiple, mobile command and communications systems that are capable of being spread out over a large region. Such redundancy is important because, in order to compromise communications, then several different localities would have to be disabled, which given their ease of transportation makes them readily packed up, moved, and easily re-deployed, thus, making them difficult to locate and difficult to successfully disable. This DCC and communications infrastructure, therefore, is mobile, capable of being easily transported over long ranges, but rugged, and designed to withstand wartime and/or harsh environmental conditions, without compromising speed or extent of processing power. Although highly flexible in structure, the disclosed modular units may be configured so as to be impact resistant, and therefore, cushioned against shocks and impacts, such as during air dropping and deployment.

Accordingly, in various embodiments, the modular units of the disclosure are configured in a manner so as to be ruggedized and robust, but at the same time they include a high performance computing infrastructure, such as a multiplicity of processing and communications racks that form a transportable data farm, which is easily connectable with other forward and rearward facing mobile or stationary command centers. Specifically, the modules of the disclosure are readily deployed and positioned so as to not only improve communications, but to also improve logistics planning and achieve sustainment of forward forces in time of war against an adversary determined to disrupt them.

In such embodiments, the modular units can be decentralized as opposed to centralized, and can be synchronized across a wide topographical area. In various embodiments, the distributed, mobile, modular units may provide a wide-ranging, broadband communications infrastructure for the deployment of a hyper-sonic mission planner architecture. For instance, in various instances, a multiplicity of MMS and PODS may be deployed in a forward position, in a threatening environment, and may be communicably coupled together for the rapid collection, processing, and transmission of data, such as to form a web of communications.

For example, provided herein are MMS that are portable and configured as data collection, processing, and communications units that may additionally be adaptable as inhabitable modules, such as one or more MLUs, which are capable of being transported and/or operated within a variety of cargo aircraft, including military air mobility aircraft as well as commercial air cargo. The MMS, consisting of a variable number of MLUs depending upon mission requirements, can perform data collection, intelligence processing, Unmanned Air Vehicle (UAV) and Unmanned Maritime Vehicle (UMV) mission planning and control, and DCC functions. The airborne MMS are enabled by wing mounted PODS to provide tactical and global communications functions.

Accordingly, the proposed C2 Web enhances and expands the capabilities resident within a centralized command center with the same tools and operators as are within the CCC Center, but in a forward web of nodes that no matter how an adversary tries to disrupt global communications. Unique MMS features are the ability to:

a. Be tailored to specific mission requirements very rapidly,
b. Operated in a wide variety of platforms including cargo aircraft, special mission or commercial ships, expeditionary bases, and rugged military and commercial land vehicles,
c. Transported on commercial air cargo services anywhere in the world in 24 hours if military transport is not available,
d. Unlike conventional military platform systems, can be rapidly and cost effectively upgraded, updated and modernized at low cost within commercially available facilities.

This infrastructure brings all of data collection, processing, and storage to the forward edge, but also in a distributed configuration that creates redundancy and security in the communications architecture. The infrastructure is capable of being integrated within the multiple different branches of the service so as to cater to their individual needs, but is also capable of being operated in a universal framework. It further includes components that are modernized, can be effortlessly updated, and may be operated by a plurality of individuals, in a multiplicity of locations, by a large number of individuals deployed in the furthest reaches of desolate locations and between all different branches of the armed services.

Further, as indicated above, the typical global communications infrastructure includes both hardware and software. Such hardware includes satellite communications, aircraft such as AWACS, undersea communications cables, and large, infield communications compounds that are currently used for collecting data and generating information, which once collected is typically transmitted over long distances to and from CCC Centers. However, as described above, each of these information-gathering modalities can be readily disrupted and even denied for long periods of time, such as by direct kinetic/non-kinetic attacks, and/or cyber warfare.

The PODS on MMS equipped and other aircraft of opportunity enables the long-delayed implementation of the Joint Airborne Layer Network (JALN) resilient communications architecture at a fundamentally lower cost. The JALN requirement was validated in 2009 but the plethora of dedicated platforms, needed to provide the many airborne nodes required to ensure robust data communications across an operational theater of war, became prohibitively expensive. The POD approach on various military and even commercial aircraft drove the cost down by and order of magnitude.

Further, present satellite usage requires large amounts of investment so as to get the satellite into space, and then larger amounts of money in rents for bandwidth that largely remains un-utilized during peacetime. In like manner, the AWACS planes are costly to maintain during peacetime, but costly to use during times of conflict, where there is simply not enough aircraft to maintain consistent communications, and the large infield communications compounds require an inhibitive large amount of people to support. Hence, although the present configurations are useful in intelligence gathering such as using planes and satellites, e.g., for creating aerial layers that are collectively configured for extending a web of sensor units that can generate a wide variety of sensed data, such data collection mechanisms are expensive to deploy and difficult to manage, often requiring hundreds to thousands of aircraft and satellites.

Specifically, each of these airplanes and satellites have to be purchased, and then remain in a non-operational, state of readiness during times when they are not engaged or being prepared for engagement in a conflict. In many instances, these instruments cannot be used for other purposes because of the risk of their needing to be spun up and used and them not being available for being spun up because they are already in use for other purposes. It is expensive paying for an asset, such as a reconnaissance plane or leased bandwidth on a satellite, which is not in use and cannot be used until such use is necessary.

Accordingly, in one aspect, provided herein is the MMS is its ability to operate in commercial cargo aircraft, which uniquely enables the ability to have essentially no standing fleet of aircraft within DoD during peacetime but be able to quickly (within a few weeks' time) expand the fleet, and therefore the number of C2 Web nodes. This eliminates tremendous costs normally associated with maintaining a fleet like AWACS or JSTARS.

In this manner, a distributed command center infrastructure may be configured in a manner to create a redundant information collection and analyses web, making the communications facility less vulnerable to a single attack, creates redundancy, and expedites the pushing of information through the system by creating a multiplicity of pipelines through which information and data may be transmitted. In various embodiments this transfer may be performed with or without using a satellite as an intermediary so as to insure a quicker, timely, and more coherent data transmission.

Presented herein, therefore, is a fully distributable, forward, operational level command, control, and communications center with a layered mesh communications network, which may be referred to as a "C2-Web". For instance, provided herein is a resilient, agile communications platform that includes a high capacity communication transmission backbone, that can be layered and made overlapping. The proposed communications platforms allow for cross communications and analysis in a forward domain, which may be implemented with a flexible array of sensors and effect analysis from a plurality of domains, which can then be transmitted and applied to any other domain. Particularly, provided herein is a major organizational and doctrinal change over what is currently provided for and implemented in engagement infrastructure. More particularly, provided are technical solutions for providing resilient communications, forward processing, with enhanced applications to speed decision making.

Part of the innovation, as described herein, includes the advent of many simultaneous nodes that form a low latency, high bandwidth web of communications and data transfer that can also be highly structured but widely configurable. In certain instances, the communications web may be configured as a long-range network with high bandwidth, e.g., >50 Mbps, connectivity, that spans over a large area, such as over about 250,000 sq. miles or more. In particular instances, the web may further be structured to form a high capacity backbone, but with a flexible transition layer that is capable of being both structured, yet configurable, and easily reconfigurable. And, because of its ability to be rapidly reconfigurable, it can more easily be masked to create communication source deception, such that any given source of data collection and/or transmission is readily hidden, thus, further securing communications from deleterious activity. Hence, provided herein is a rapidly deployable, very high bandwidth, communications web that spans across large areas, and yet functions as a supplement or replacement for typical global communications using satellites.

For example, as depicted in FIG. 5, platforms of opportunity (aircraft that would be in the area on another mission but which can also carried the Communications POD) can form flexible ad hoc communications and data networks, in the commercial world referred to as a "data plane", that can communicate with one another, and by which vast amounts of data can be transferred. The PODs serve as the gateway between the various military data links, thus eliminating a requirement for tactical aircraft to somehow be equipped with all the tactical links or become deficient in data. The POD also performs the function of a "control plane", which keeps track of the various highly dynamic tactical networks, determines the best routing path based upon requisite quality of service (QoS) and directs the data plane on how to move the data.

Particularly, as depicted in FIG. 5, given the technologies disclosed herein, mobile and flexible planes of data collection and communication can be configured, such as where depicted is all of a data collection plane, a transition plane, a control plane, and a management plane. Each plane may be populated by one or more mobile communications units that may be controlled by a data link management system, which system may include and access a plurality of radios, such as a Common Data Link (CDL), Tactical Targeting Network Technology (TTNT), and other specialty radios, transceivers, routers, switches, and/or processing units. In such an instance, high-capacity communications web may be form to blanket a region in communication assets, whether they be on the ground, sea, or air. Hence, FIG. 5 illustrates an exemplary embodiment of a POD enabled, low cost JALN architecture.

The details of one or more embodiments are set forth in the accompanying drawings and the description below. Other features and advantages will be apparent from the description and drawings, and from the claims.

DETAILED DESCRIPTION OF THE DISCLOSURE

Figure 1:
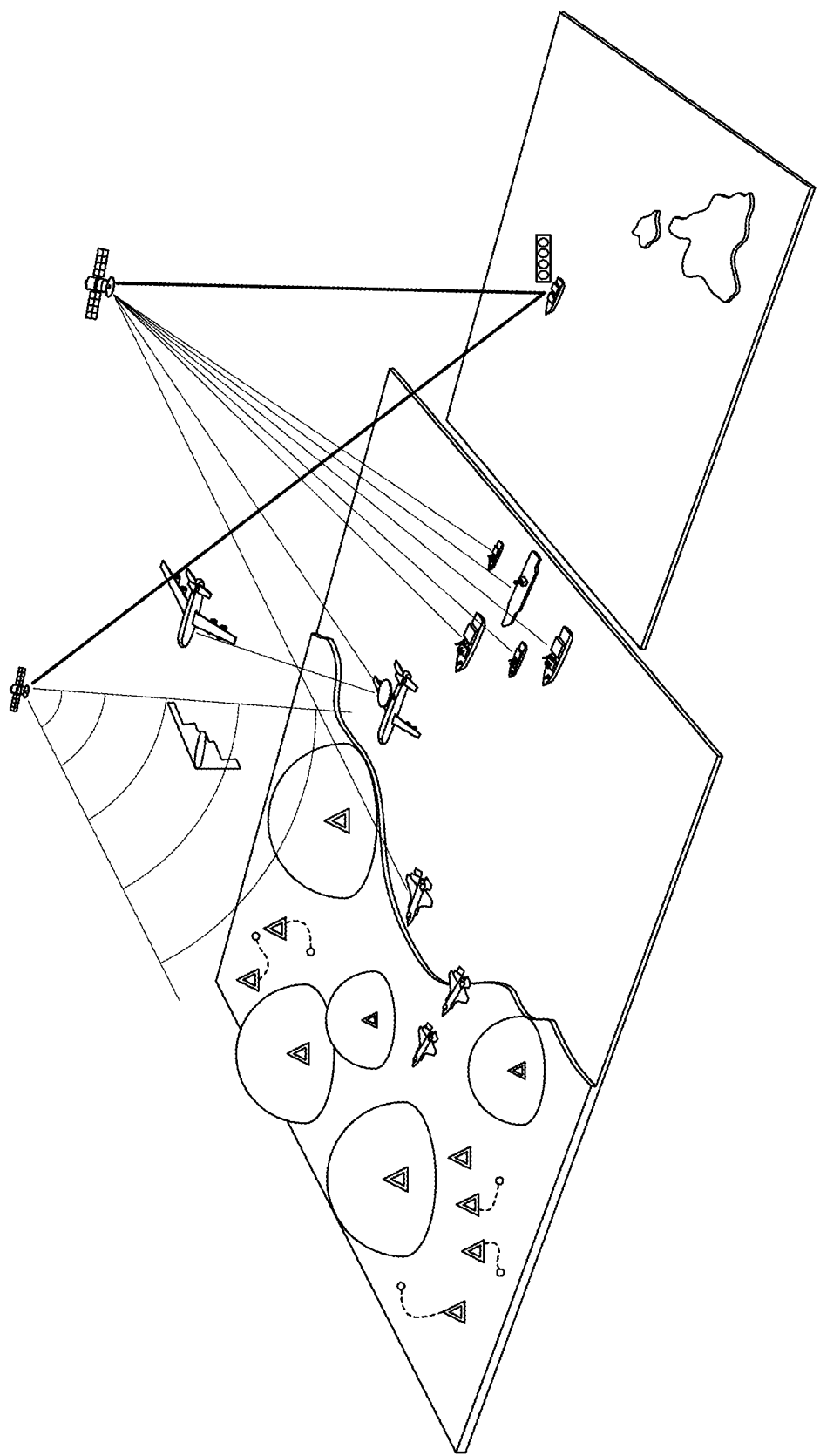
FIG. 1 is a representation of the legacy command, control and communications architecture currently employed by U.S. DoD and other nations.
Figure 2:
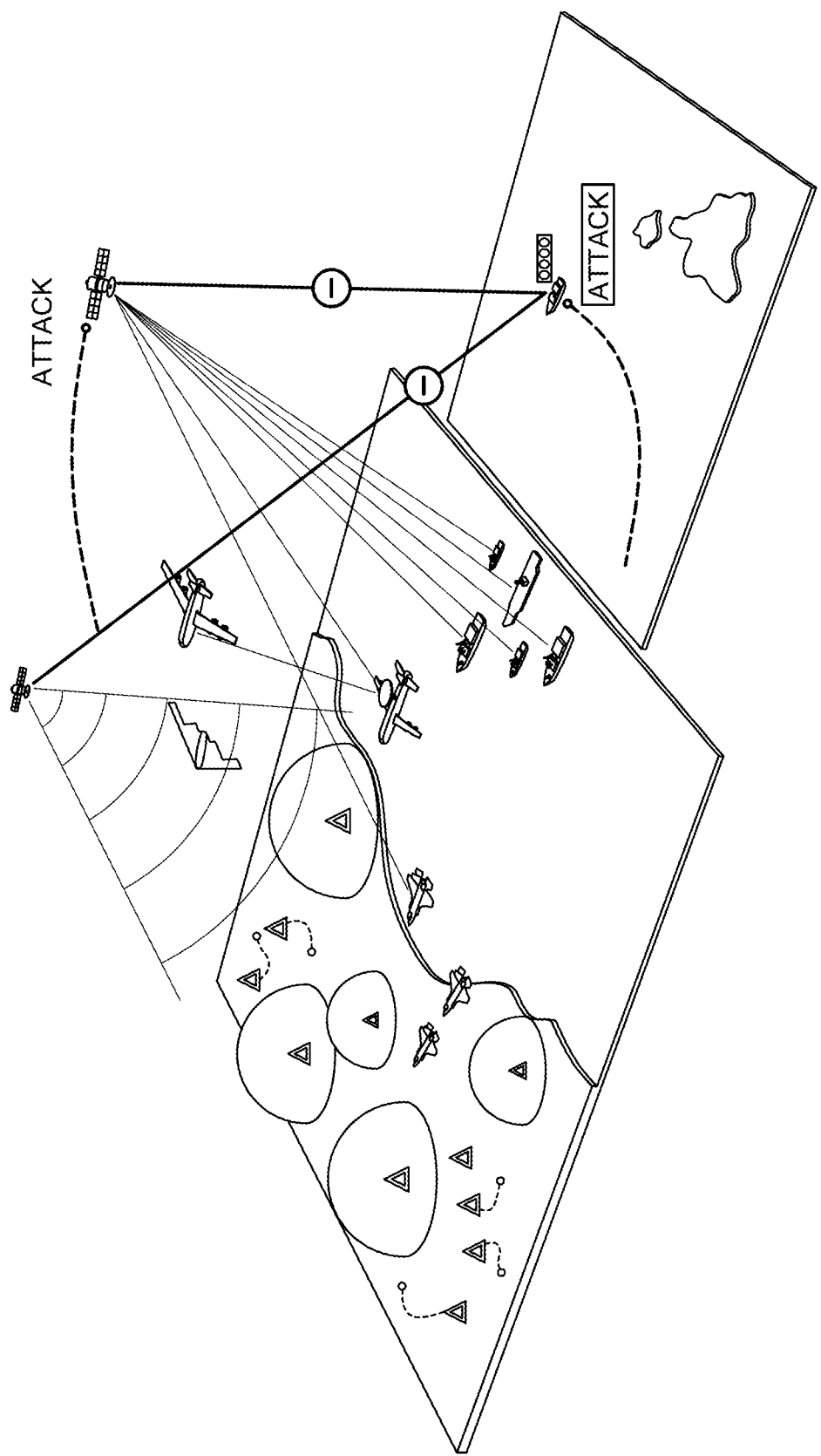
FIG. 2 is the representation of the legacy command, control and communications architecture of FIG. 1 with global communications disrupted by the adversary.

Accordingly, provided herein is a command, control and communication platform that may be configured for implementing near real-time data collection and communication transmission, network configuration, and data analytics, at the edge of conflict even when adversarial disruption is threatened. Particularly, the presented modular mission system platform is formed of a multiplicity of modular communications units that are configured for rapidly being assembled, deployed, and dispersed across a wide range of diverse topologies for the purpose of building a flexible command, control and communications web that can blanket a region in a constellation of mobile communication nodes. The modular units may be configured as mobile, module load units, MLUs, that can easily be configured and transported to a region of interest, deployed at the edge of conflict, be manned by a small number of forward operators, and thereby serve as a series of edge-based, mini-communications and command centers. Likewise provided are a series of modular communications elements, e.g., PODS, that are designed to be removably coupled to a conveyance, such as underneath a wing of an airplane, whereby given the communications architecture of the POD, the conveyance is enabled to communicate with a selection of other POD based communications elements within the region.

Particularly, provided are MMS and POD based data collection, communications, and analytics systems that are configured to include communications and/or computing modules that contain one or more, e.g., each, of the various existent communication radios and networks, e.g., CDL, Link-16, TTNT, and other specialty networks, that are currently deployed in down range conflict monitoring and resolution. The modules may also include an interpretations unit for receiving communications from one radio of one module, translating it, re-encoding it, and configuring it for transmission by a separate network module via a respective radio, or other transceiver, to a selection of or all other modular units within the region, such as based on the communications and analytics needs of the system. More particularly, in such instances, the various radios, transceivers, amplifiers, decoders, interpreters, encoders, and other such electronics, needed to generate a far-ranging, redundant, communications web that is both resistant to attack, resilient, and self-healing may all be housed in a POD of the disclosure.

In particular implementations, the disclosed Modular Mission System (MMS) and PODS may be configured for being carried by one or more different land, sea, or air conveyances, and may be adapted so as to be capable of forming, or otherwise accessing, the same communications gateway, which gateway may be controlled via one or more planes of control. For instance, all MMS and POD carrying conveyances within a region may form a data collection and communication plane, which plane forms a first layer of a multi-layered communications platform. Such a data plane may further be controlled by a number of MIMS and/or POD carrying mobile assets that exert control over the data collection plane, which in turn, may be managed by a suitably configured management plane, e.g., where the management plane may be composed of those persons in charge of making strategic decisions for resolving a theater in conflict. Particularly, the present MLUs and/or PODS may be configured to form a modular mission system (MMS) that may be provided as a platform as a service (PAAS), such as where the MMS platform provides a number of data collection and communications modules, MLU or PODS, that form individualized, transportable data centers that can be configured for being carried and/or delivered to a region of interest by aircraft, support ships, ground combat trucks, and the like.

A beneficial feature of the present technology is that it makes the present archaic infrastructure capable of being integrated within the proposed PAAS platform of flexible web communications networks. In such an instance, based on the nature of the need, specialized or commercial communications assets, such as military or commercial satellites, airplanes, or other vessels and vehicles, may be outfitted and brought into a communications web, whereby all of the conveyances within the web may be capable of communicating one with the other, regardless of their inherent individual communications modality. In a manner such as this, a flexible, layered, communications topology may be generated. For instance, given the ability of fitting and/or retrofitting communication components with various of the mobile assets disclosed herein, low, medium, and high bandwidth communication units can all be brought into connectivity with one another, regardless of their unique inbuilt communications modalities, so as to create a high bandwidth, high capacity but unique communications framework, regardless of the level of conflict, such as permissive, contested, and even highly contested environments. Such fitting and/or retrofitting may be applied to not only country of origin forces, but also to those of coalitions and allies.

Specifically, the present communications webs may be flexibly formed using both in house, commercial, and allied resources that may all be made to communicate with each other and spread to cover a massive scale across an engagement theater. Particularly, communication nodes that may be brought into the web may be configurable and repositionable in a forward, distributed, multi-layered domain architecture. This flexible configuration pushes analysis and decision making closer to the theater and makes targeting and disruption harder, if not impossible, to effectuate, while at the same time as reducing latencies and supporting hypersonic offense and defense strategic planning and implementation, such as in a high capacity backbone.

More specifically, as depicted in FIG. 1, a theater in conflict can be far ranging and require upwards of hundreds to thousands of links, e.g., mobile communications vehicles and vessels that will need to be in communications with one another. However, in many instances, these conveyances have endogenous communications system that cannot naturally communicate with one another. Specifically, as depicted in FIG. 1, all of the conveyances within a given class or type can communicate with one another, and with a satellite relay, but cannot cross communicate with the conveyances of a different classification. Rather, in order to communicate, amongst different classifications, data and communications must first be transmitted to the satellite, which then communicates with CCC Center, that then translates, processes the communications, parses them, generates command instructions, which then get sent back to the front lines via the Satellite relay and/or under sea high capacity cables. This creates a huge latency that results in a large backlog in communication transmission. The MLUs and PODS of the present platform, however, overcomes this difficulty by coupling a communications module to the conveyance in a manner so as to allow them to connect with and engage with one another regardless of their natural communications capabilities. Also provided is a management system, e.g., a MIDS, that is configured for organizing and controlling the flow of communications within one or more communications gateways within a field of interest.

Hence, the various communications modalities, along with the MIDS and/or other communications terminals, form a communications gateway whereby all the MLU and POD based conveyances within the gateway can all communicate with one another, e.g., via CDL, Link 16, and/or other tactical targeting network technology (TTNT), in a faster, higher bandwidth manner. In such a manner, each MLU or POD carrying conveyance forms a node in a communications web, where each node in the web knows what assets every other node carries, their use parameters, and their control instructions. In such instances, the management system, e.g., a MIDS or Mission Links Management System (MLMS), may be designed for organizing and determining membership in a given plane, e.g., a data and/or transition and/or control plane, such as where membership can be assessed and determined, e.g., based on identification, CMP detection, and intent. Likewise, maintenance within a given plane, such as a data, or transition plane forming a CDP transition layer gateway, can be assured by CCD topology, whereby connection to a high capacity backbone (and other global communication networks), may be ensured by localized assured positioning, navigation and timing (APNT).

In a manner such as this, every asset in the network can know where every other asset is, what their objectives are, and what assets they carry for meeting those objectives. In such an instance, the MIDS or MLMS may employ one or more of a PGL and/or Positioning Navigational Timing (PNT), or other control element so as to maintain plane topology of all nodes in the web, which can further be used to determine the capabilities each node possess, and can also be used to determine which communication asset, e.g., HBW CDL, TTNT communication radio, or the like, to be employed in passing communications. Likewise, the management system, e.g., including PGL, may be configured to detect connectivity gaps within the web, and can then detect and suggest corrective actions that can be taken to close the gaps, such as including the movement of assets, e.g., airplanes, vehicles, and modular assets, in and out of a determined plane, such as by bringing new nodes onboard, e.g., CMP, and/or suggesting a change in communication transmission modalities, e.g., TTNT, Link-16, CDL, and the like. Thus, the various networks within the mesh communication web can be secured, highly structured, high bandwidth, and jam resistant.

Figure 6:
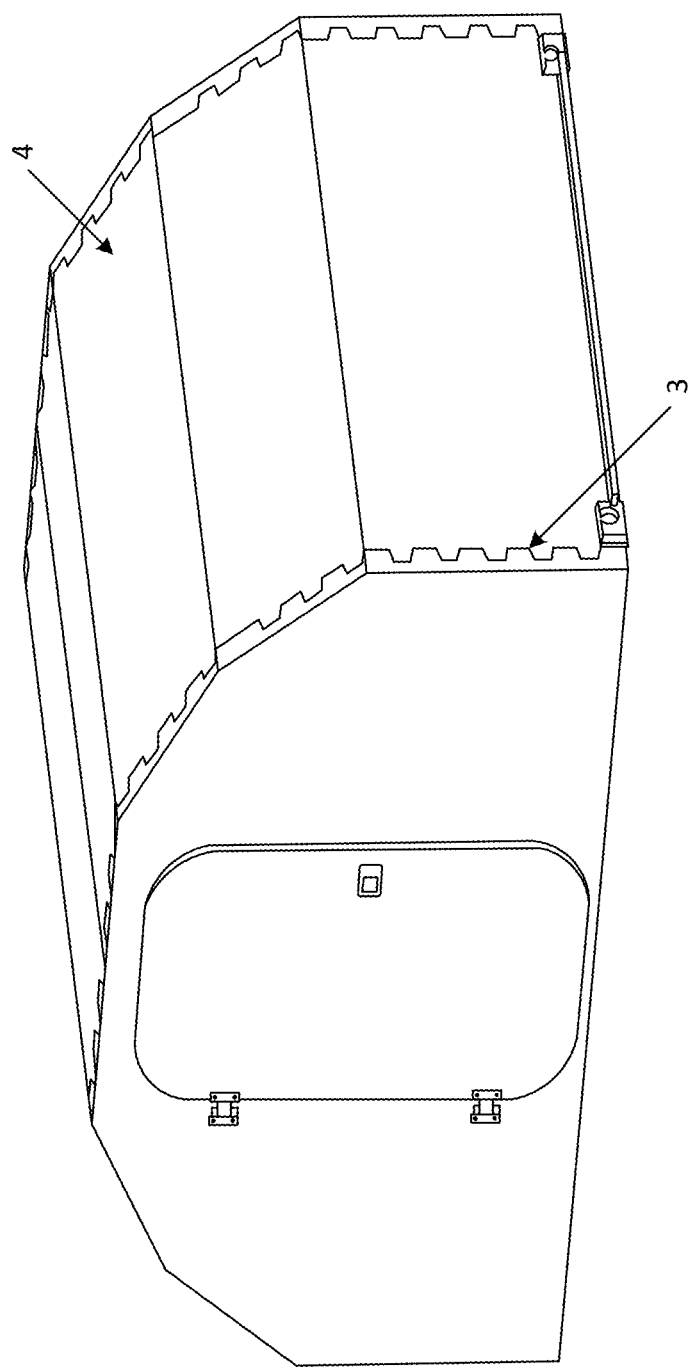
FIG. 6 is a single module load unit (MLU) for use in forming a C2 Web to provide flexible, far-ranging, redundant, mission planning, intelligence processing, targeting, communications, decision support and command and control.

For instance, as can be seen with respect to FIG. 6, in various instances, presented herein is a MLU. The modular mission system (MIMS) may include a MLU that may have a housing 5. The housing may be composed of boundary members 3 and/or panel members 4 that are both rugged enough to withstand inhospitable environments, such as in theater, or within an environment having suffered, or about to suffer, a natural disaster, and yet capable of being manipulated, organized, re-organized, and moveable with respect to one another, so as to form a unit of variable size and shape.

Hence, in certain instances, the module housing 5 may be collapsible, and therefore, capable of being reduced, such as in diameter and area, e.g., during transport, and expanded, e.g., during deployment, or vice-versa, but in either instance, the module 1 may be configured for use during both transport and deployment. Particularly, during deployment, the MLU 1 may be expandable, e.g., in a modular manner, such as by adding various boundary members and/or work stations to the housing. Accordingly, in various embodiments, the MLU 1 may be collapsible, such as during on or off loading and may be expandable once in the cargo transport and/or once positioned down range. As described below, the MLU may include a skeletal framework (not shown) as well as interchangeable wall units. In this instance the housing 5 includes both a front door and a back wall unit coupled to the skeletal framework so as to provide an enclosed unit 1.

Figure 7:
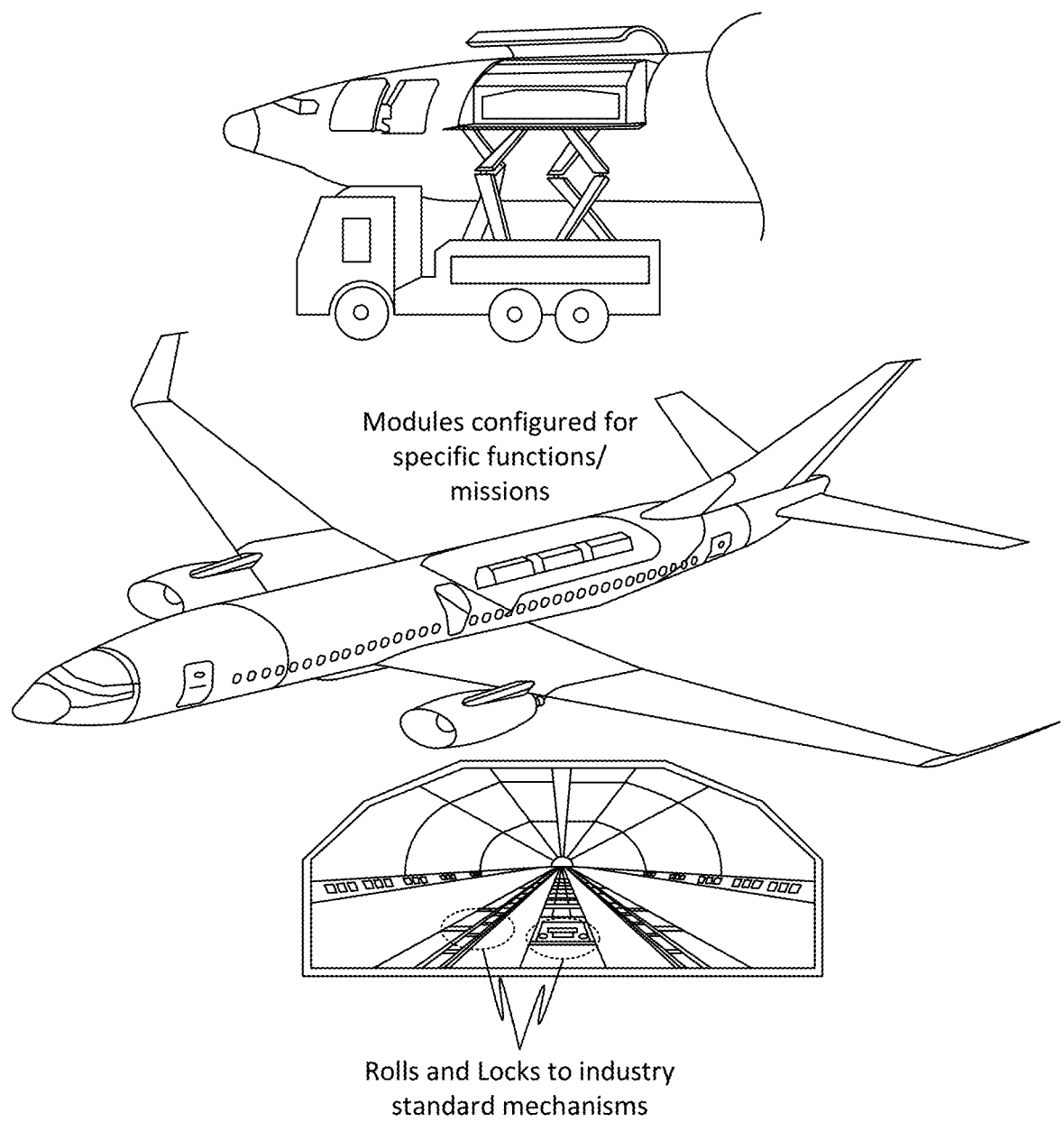
FIG. 7 is illustrates MLU loading, carriage and configuration of a sample MMS on an air cargo airplane.

Consequently, as can be seen with respect to FIG. 7, rather than the multi-billion-dollar fleet of specialized airplanes, like AWACS and JSTARS, the herein presented MLUs can be rolled onto existing aircraft, such as KC-135 or KC-46 air tankers, or C-40 or C-130 cargo aircraft, or even commercial air cargo aircraft. Likewise, as can be seen with respect to FIG. 8, the MLUs may be fitted into the hull of a ship, and/or may be transported through land vehicles such as for rapid deployment in a variety of rugged regions that might otherwise be geographically inaccessible.

Additionally, in various embodiments, various existing commercial air and sea freighters can be used for transporting the MMS MLUs, such as the Commercial Reserve Air Fleet (CRAF), which can be configured, e.g., retrofitted, to be used for moving the MLUS around the globe, on short notice, and without the undue burden of paying for such a large fleet of dedicated information gathering airlines during peacetime. In various embodiments, as can be seen with respect to FIG. 8, the modular unit may be configured for being retained within a sleeve, where the sleeve is configured for being attached to one or more portions of a transport vessel, such as on top of or bellow a deck and/or within a haul of a ship, and the like. Hence, the sleeve may be configured with a coupling mechanism that is unique to the transport vehicle, while the coupling between the sleeve and the modular unit may be universal.

Figure 9:
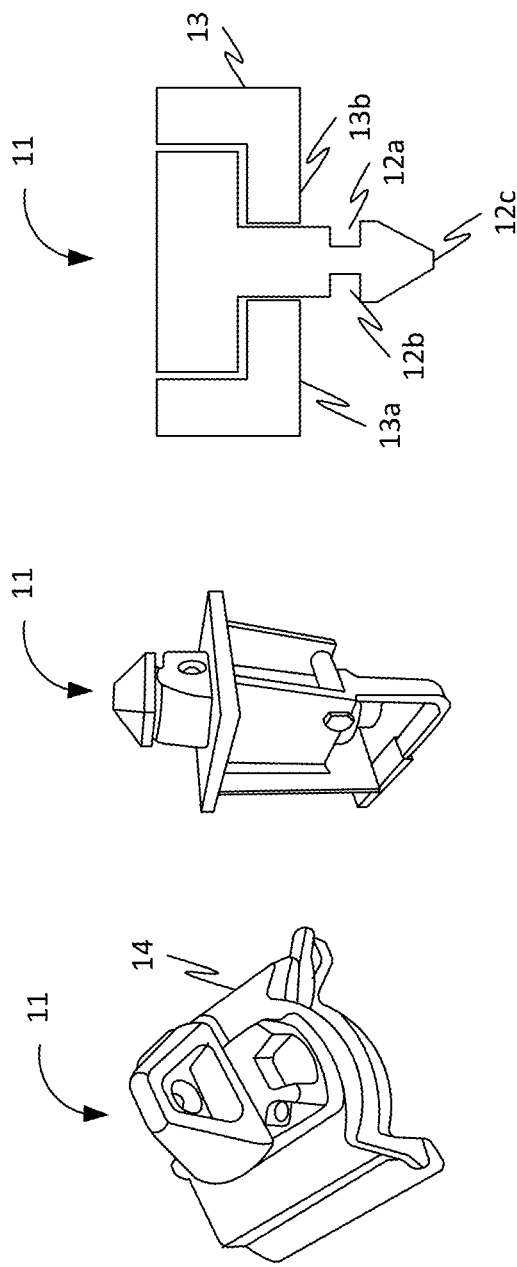
FIG. 9 is a variety of locking mechanisms for use in securing an MLU of the disclosure while being transported, such as by a vessel of FIGS. 7 and 8.

For instance, as can be seen with respect to FIG. 9, a variety of physical coupling mechanisms 11 may be used to couple the various modules and/or PODs together so as to be mated and locked into place, such as where the coupling mechanism may include a male mating member 12 that is configured for being inserted into a female receptacle member 13. In various instances, a locking mechanism 14 may also be included for ensuring that the mating between the male 12 and female 13 members remain locked in place when engaged. For example, the male member 12 may include a base that includes a post element 12*a*, having a groove 12*b*, and a head member 12*c*, such as where the post and/or groove is circular and has a diameter that is smaller than both the diameter of the base member and the head member so as to form the groove.

Likewise, the female member 13 may include a boundary member 13*a* bounding a receptacle 13*b* that is expandable so as to receive the head member and be fitted around the circumference of the groove. In various embodiments, the head member 12*c* may have a triangular or pyramidal configuration, so as to facilitate the physical mating and locking of MLUs in place and one with another, while also ensuring a pressurization and environmental seal for rapid MMS configuration setup in any environment (e.g. airborne, maritime, ground). Accordingly, in various instances, the groove or receptacle may be fitted with a compressible sealing member, such as an O-ring.

In various instances, the pyramidal portion can be a complete or a half-pyramid configuration having a lip or edge that fits within the groove, such as where the lip flexes when being fitted into and removed from the groove so as to form the latching. It is to be noted, that although configured as a pyramid, other shapes can also be employed, such as a circular or mushroom shape, or any configuration having a horizontal base coupled with a decreasing radius surface, whereby the intersection between the two of them forms an edge capable of fitting within the groove while at the same time compressing a waterproof gasket to make a waterproof and pressure proof seal between the panel members. A similar latching mechanism can be employed when coupling the module to the deck of a transport vehicle or vessel, such as a plane, ship, train, truck, and the like.

Figure 8:
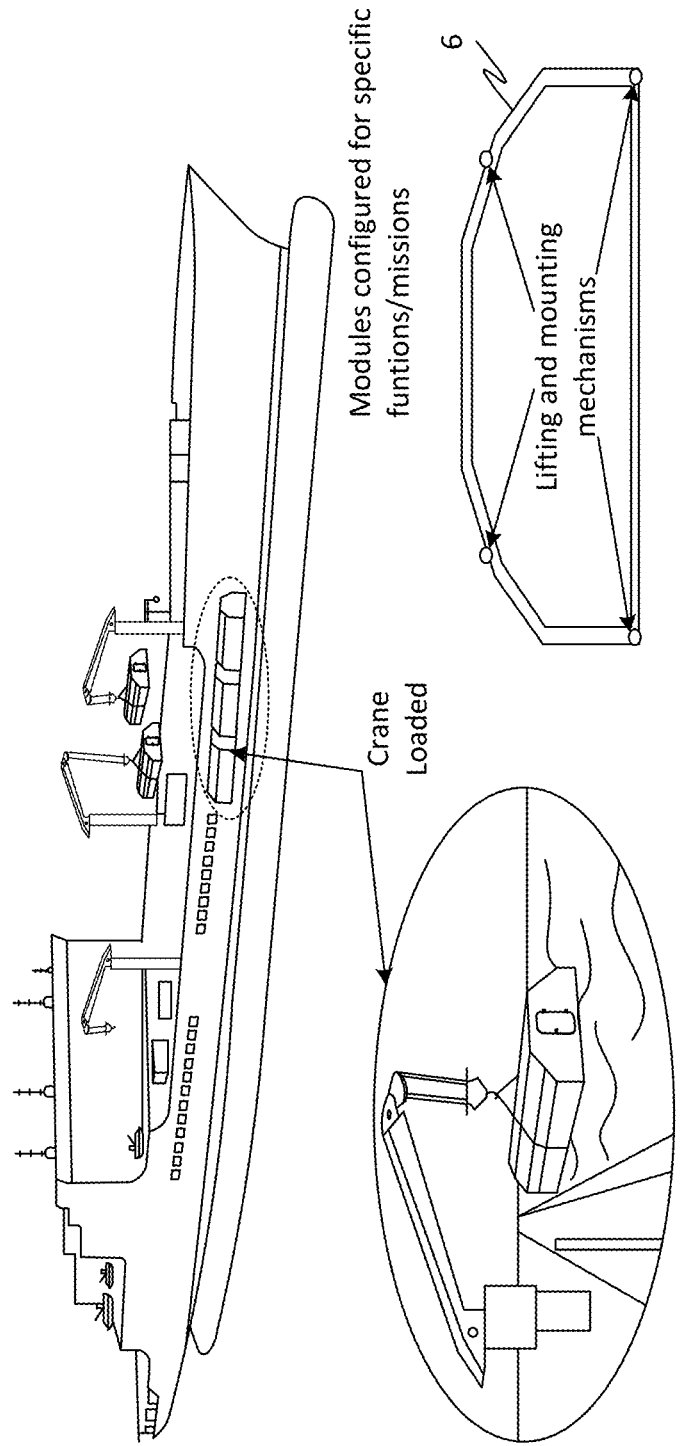
FIG. 8 is another exemplary vessel, in this instance a ship, configured for carrying one or more MLUs of the disclosure, such as for use in or near a theater in conflict.

As can be seen with respect to FIGS. 7 and 8, the MLUs are transportable by not only DOD specific aircraft, but also commercial air carriers and ships, e.g., MSC ships, can also be configured to transport the modules. And in various instances, the modules may be rapidly configured for operations aboard planes, ships, trains, trucks, and the like, during the delivery to forward bases. In certain implementations, the MLUs that compose an MMS may be configured for being occupied and used during transport. For instance, the module may be adapted to have an environment that is hospitable for occupation and use by one or more persons, controllable, and capable of being sustained over long periods of time. In such instances, the module may be fully sustainable without having to be connected to any outside resources, such as one or more resources of the conveyance vehicle used to transport the pod. In such an instance, the modular mission system may include from 1 to 5 to 20 to 25 or more people, during transport.

Particularly, in particular embodiments, the MLU may have an internal environment that is outfitted for use during long hours of transport, such as across oceans and long duration flights. More particularly, long duration flights of forward operators are often wasted in down time as these operators are non-operational during transit. For instance, long duration aircraft can stay airborne for extended periods of time with aerial refueling and mechanical systems inflight support, but the limiting factors have been the ability of the crew to function for those extended periods of time. With proper environmental support (e.g. lower cabin altitudes, enhanced humidity control, reduced noise), crew monitoring and proper habitability support, aircraft could remain airborne for 24 hours or more, and if the present modules are deployed for use while in transit in the plane. This, therefore, enhances the operational capabilities, increases on-station time, and reduces fleet requirements. In this manner, flight patterns can be shifted from short duration to long duration flights, therefore, requiring less turnaround, increasing the allowable number of on days, and minimizing the number of off days. Thus, the present mobile communications modules can save lives, money, and other resources.

Figure 10:
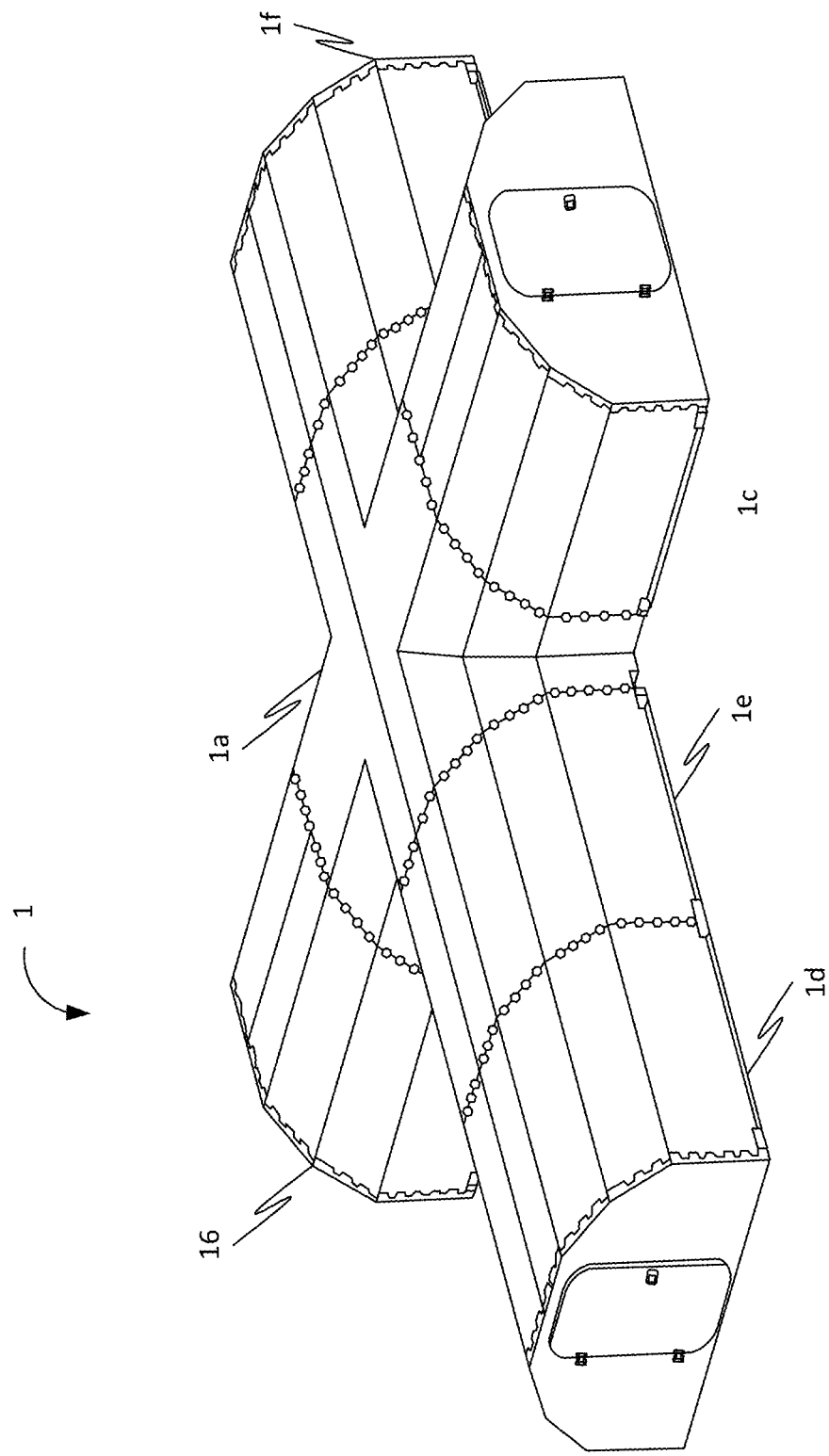
FIG. 10 is a representative embodiment of a plurality of MLUs of FIG. 4 coupled together so as to form a C2 command center, in this iteration in the form of a cross for operations at expeditionary bases.

Further, as can be seen with respect to FIG. 10, in various instances, e.g., during deployment the modular units 1 may be configured for being coupled together in an inter-locking system of connectable MLUs that can be joined together, in transport, or down range, so as to form a modular, forward, command (C2/C4) center of variable size and occupancy. Particularly, the modular units may be configured to have inter changeable and removable walls, so as to be connectable left to right, front and back, such as with the removal of one or more walls, while at the same time being capable of being joined together to form a master unit with adjacent sub-units, all from the same architecture. So being, the various MLU and PODS of the system may be static or configurable, their dimensionality can be pre-configured to mission objective types, or can be configurable on the fly to adapt rapidly to environmental conditions. As depicted in FIG. 10, a forward, edge-based module C4 command center 10 is provided, where the command center includes five module units 1*a*, having a cross-like configuration, and modules 1*b*, 1*c*, 1*d*, 1*e*, and 1*f*, which spread out from each arm of the centralized cross shaped module 1*a*. In certain instances, each module unit may have its own grounded floor component, but in some instances, multiple units may share a common floor unit, such as where the floor unit provides a preselected foot print such as a line, an H, a T, a square, an elliptical footprint upon which multiple MMUs may be positioned and grounded.

Figure 11:
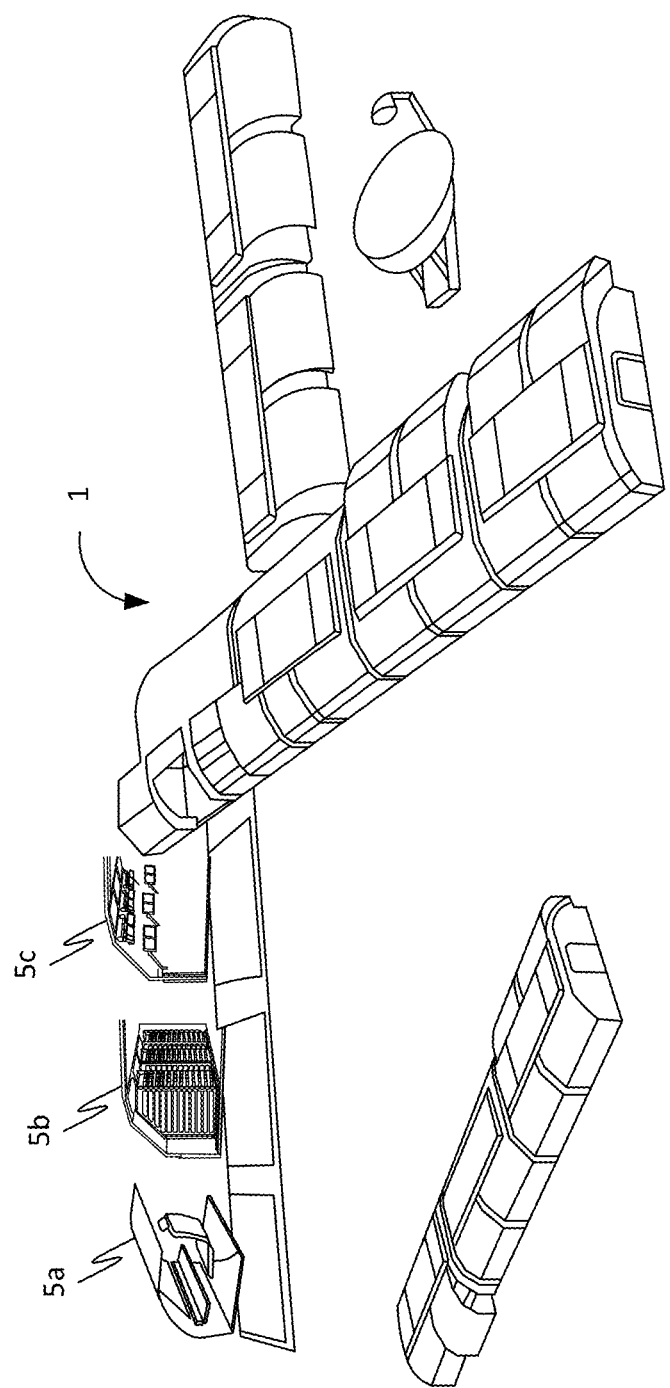
FIG. 11 is another representative embodiment of a plurality of MLUs of FIG. 6 coupled together so as to form a C2 command center, in this iteration in the form of a "T", where the modular units are made up of interchangeable, functional wall units.

Furthermore, as can be seen with respect to FIG. 11, presented herein are configurable mobile units 1 that form modules, or MLUs, which may be fabricated as fungible ground, air, or ship units that form mini-command C2 centers for the collection, receipt, and analysis of data, which can then be subjected to managerial overview for immediate decision making and implementation, such as on the edge. As depicted, each MLU, is configurable in such a manner as to serve as a companion to every other module so as to enable each MLU to be loaded or transported separately, by air, seaborne, or terrestrial vessel, but be finally positioned near a theater of engagement and mated, one with another, to form a complete set of operational workstations.

Any number of operational modules 1 can be incorporated into a given MMS configuration to provide required managemental capabilities. For instance, as can be seen in FIG. 11, in various embodiments, the modules may be configurable in their interconnectivity between modules, and may further be configurable as to their skeletal framework 2 and the wall-like panels 4 that form the wall structures. For example, in one embodiment, the overall formation of the shape of the layout of a plurality of the modules are highly configurable, with interlocking and interchangeable modules being able to be fit together like "LEGOS"®. Likewise, as depicted the wall units 4 may be interchangeable, where each wall unit may be configured with one or more technical features in a manner so as to have a specialized focus.

Figure 12:
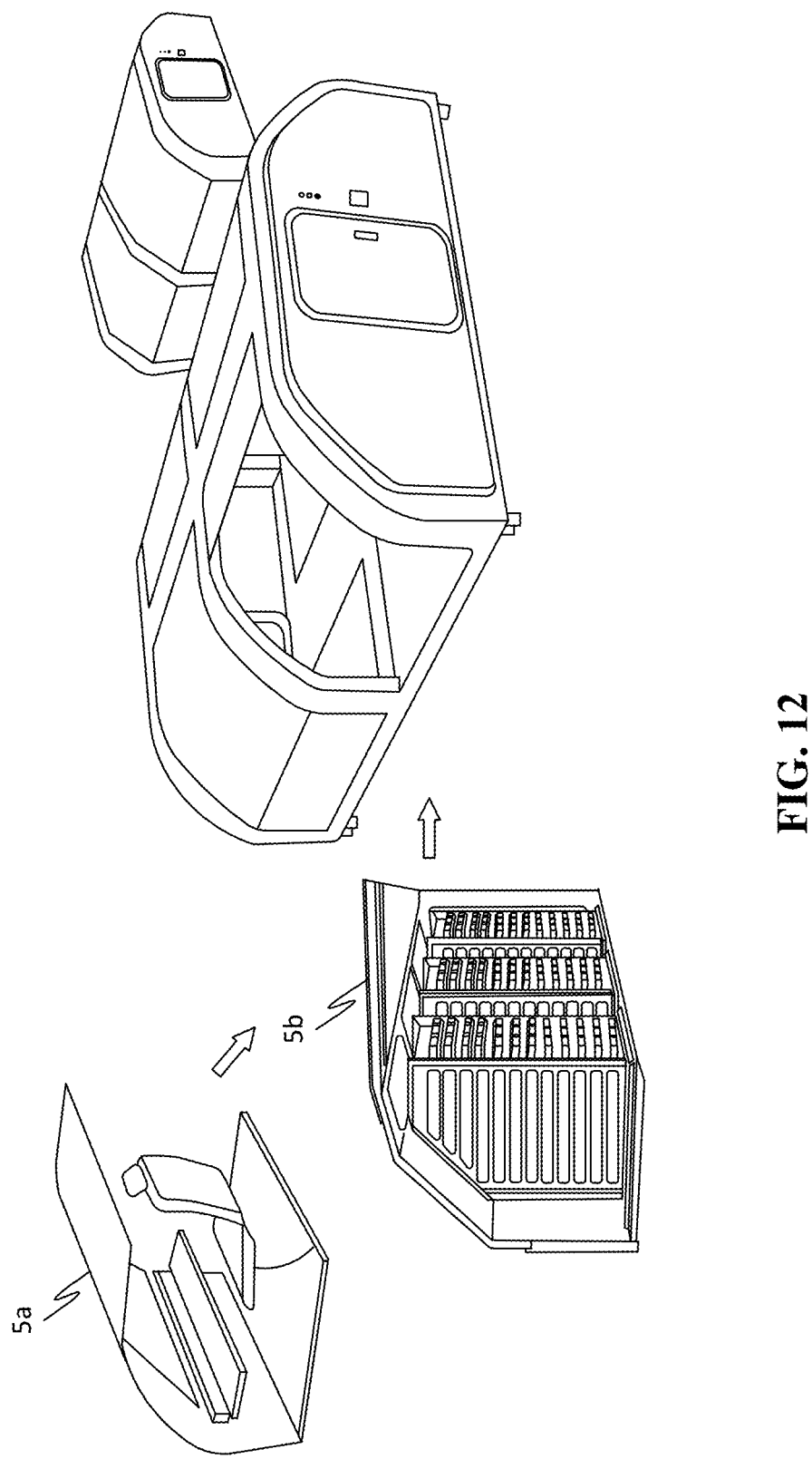
FIG. 12 illustrates the modular approach to MLU construction.

In particular instances, as depicted in FIG. 12, a functional wall unit 4 may be configured as an operator work station 20, a server rack 30, a display wall, an electronics rack, a storage and/or arms center, or other utility unit, and the like. In such an instance, the wall units can be swapped in and out so as to give each module unit its own particular single or multi-focus, which can be easily interchanged based on the changing mission parameters of deployment. Likewise, at the end of the module a wall having a door is positioned to enclose the module environment.

Specifically, as can be seen with respect to FIGS. 10-14, in various embodiments, the modules may be composed of two general parts, a skeletal framework that forms the architectural backbone of the structure, and an interchangeable panel section that forms the walls of the structure. In such an instance, the framework structures may be configured to be interlocking on one or more, e.g., two, three, four or more, sides so as to form a desired pattern, such as a long row, an "L" or "T" or "O" or "X" shape. In certain instances, a curvilinear shape may be provided for curved, circular, and/or "S" shaped configurations. Likewise, the shape and formation of each actual module is also configurable and may include interchangeable exterior and interior wall and compartment panels.

Figure 14:
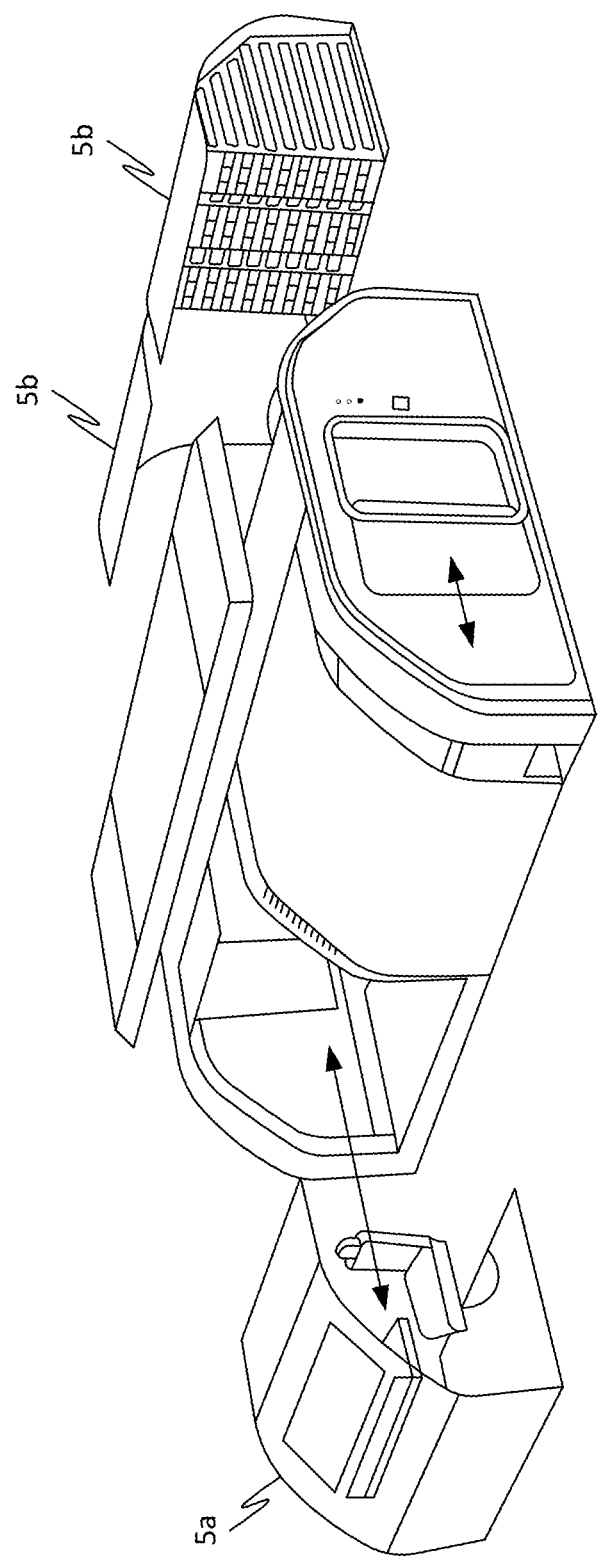
FIG. 14 depicts the representation of deconstructed MLUs of FIG. 12, where the MLU can be expanded or condensed such that it can optimally be used on narrow body or wide body air cargo aircraft.

More specifically, as depicted in FIG. 14, at the base of the module unit 1 is a skeletal framework 2 that forms the backbone of the structure. The framework structure is formed of a plurality of border elements 3 that together form the outline or boarder portions of the module. The boarder elements 3 are attachable to one another so as to form the outline of the structure. This outline can be any shape and configuration dependent on the desired footprint. The module 1 also includes wall units 4, as depicted in FIG. 12, which can be fitted to the skeletal component 2, so as to form an enclosed module unit, such as depicted in FIG. 6.

Figure 13:
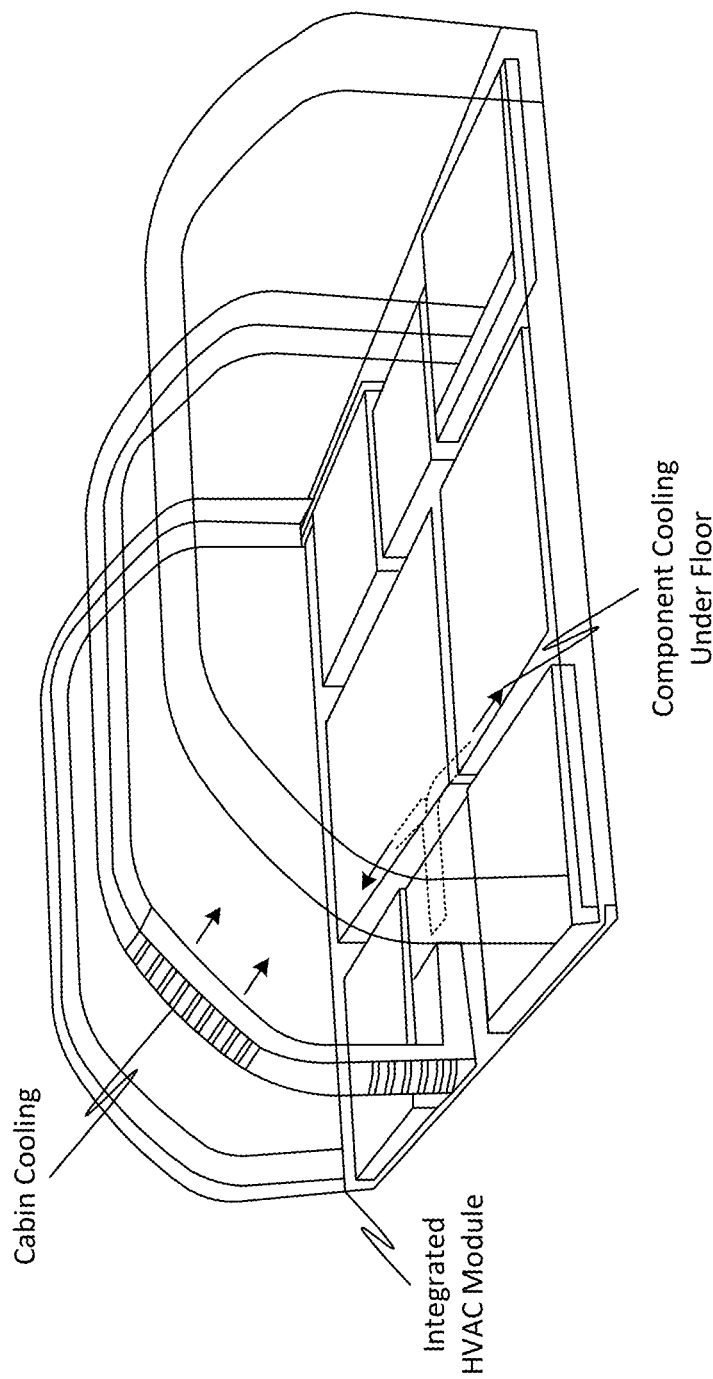
FIG. 13 depicts a representation of a deconstructed MLU to illustrate heating, cooling and pressurization approaches.

For instance, as can be seen with respect to FIGS. 13 and 14, in one aspect of the disclosure, a transportable modular communications unit 1 for performing data collection, analysis, and communication transmission in an inhospitable environment is provided. In a particular embodiment, the transportable modular communications unit 1 may include a housing, as depicted in FIG. 6, that is formed of an internal skeletal framework 2 and at least one interchangeable, functional wall unit 5. Particularly, the skeletal framework 2 defines an interior space and an exterior space, such as when the framework is coupled with one or more of the wall units 5 and/or wall panels 4. Specifically, the skeletal framework 2 is composed of or otherwise includes a plurality of boundary members 3 such as where the boundary members are positioned so as to be opposed and offset from one another by a first distance.

Figure 15:
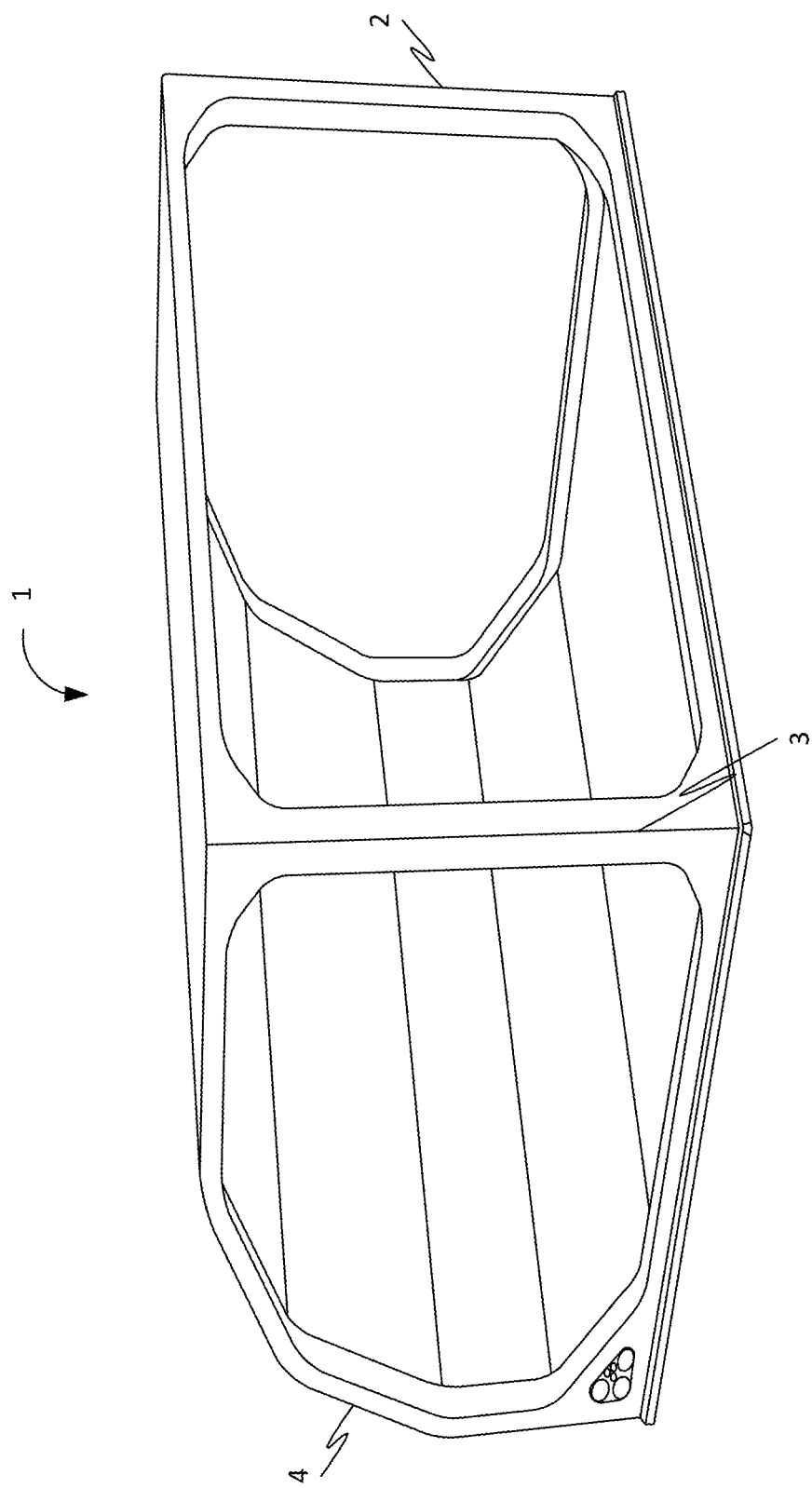
FIG. 15 depicts a representation of an interchangeable wall unit of an MLU, in this instance, the MLU is a left-hand side MLU.
Figure 17:
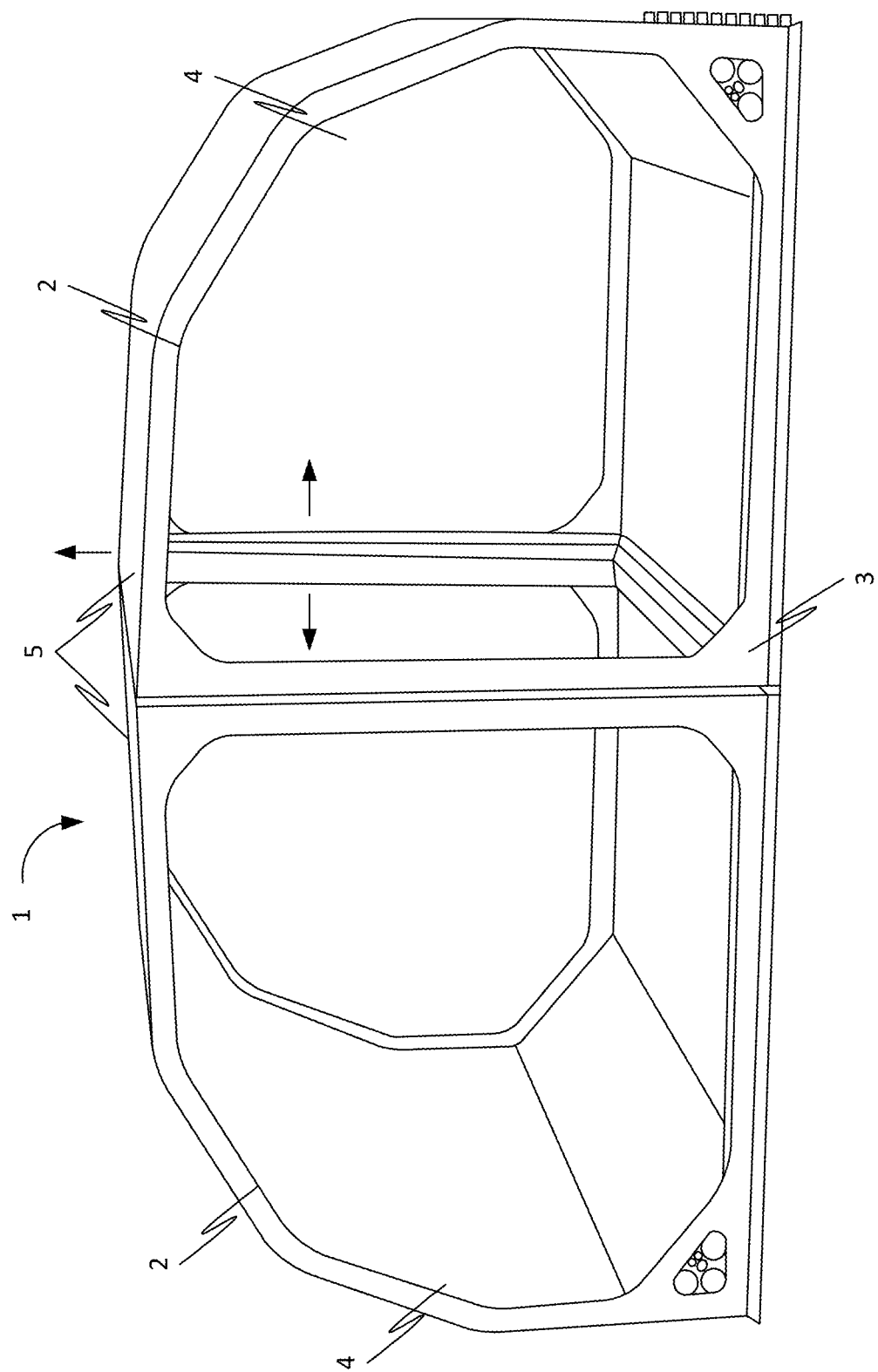
FIG. 17 depicts a representation of a plurality of interchangeable wall units of an MLU, in this instance including the LHS and RHS units of FIGS. 15 and 16 forming an entire MLU.

More specifically, as depicted in FIGS. 11 and 12, the skeletal framework is configured to form two adjacent compartments, in this instance, including a forward and a rearward compartment, which are composed of the same skeletal framework 3. However, in other embodiments, any number of compartments may be outlined by the skeletal framework, including 1, 2, 3, 4, 5, 10 or more. Nevertheless, the more compartments included by a single skeletal framework, the less transportable the modular unit 1 will be. Hence, in various instances, the skeletal framework is configured for providing a structure for one half of a modular unit, as depicted in FIG. 15, but where the boundary members 3 include interfaces for being coupled together so as to grow, one being added on to another, longitudinally, so as to form a row of half-modular units, e.g., extended rear side of one to front side of another, and/or may include interfaces that allow two half modular units to be added, side by side, to each other latitudinally so as to form a whole modular unit, such as depicted in FIG. 17, where a right hand side module unit 5a and a left hand side module unit 5b form a complete module unit.

Accordingly, with respect to FIG. 13, as depicted is a skeletal framework that includes two left hand side module units and two right hand side module units so as to form two complete module units that are coupled together, rear-wards to forwards, so as to form both a row of separable left-hand units and separable right hand units, but are also separably coupled together, side by side to form a framework for two complete module units. As depicted in FIG. 14, this bounding framework additionally outlines a plurality, in this instance four (4), receptacles that includes further interfaces for receiving or otherwise being coupled with functional wall units 5a and 5b Hence, in this manner, the skeletal framework can be grown both longitudinally and latitudinally, as shown in FIG. 11.

Specifically, with regard to FIGS. 12 and 13, each module half-unit includes a set of boundary members 3, in this instance, in the shape of a curvilinear "C" that are opposed to one another so as to form a forward side boundary and a rearward side boundary. The forward side boundary and the rearward side boundary may be coupled to one another by one or more extended joining members, such as at a bottom of the "C" configuration, so as to form a connected bottom element, in this instance as a floor, and/or at a top of the "C" configuration, so as to form a ceiling, as shown in FIG. 14. Accordingly, as depicted in FIG. 14, in certain embodiments, the skeletal framework 2 may include at least one top extended joining member, which may be a single structural joining element or, as in this instance, may be configured as a ceiling element, and may include a bottom extended joining member, which may be another single structural joining element or, as in this instance, may be configured as a floor element.

More specifically, each extended joining member spans the distance between the forward side boundary and a rearward side boundary and is coupled therewith so as to form both the overall skeletal framework 2, but also to create a receptacle into which a wall unit, such as a functional wall unit 5 may be inserted and coupled to the skeletal framework so as to form an enclosed portion of the module unit 1. Hence, together the forward and rearward side boundaries along with the top and bottom extended joining members form a first surface interface that is configured as a first receptacle boundary that is adapted for receiving at least one interchangeable wall units. In such an instance, the at least one interchangeable wall unit is configured to join, or otherwise be coupled with the receptacle boundary in a manner so as to at least partially enclose the housing thereby separating an interior space from an exterior space.

As depicted in FIGS. 12 and 14, in these instances, one interchangeable wall unit 5a includes a work station having at least one client computing device and a display screen, for insertion into and coupling with one module unit, and a further interchangeable wall unit for insertion into and coupling with another module unit includes a server system. Further, as depicted in FIG. 14, additional wall units for insertion into the skeletal framework 2 may also be provided so as to form an enclosed modular complex, which enclosed module forms a boundary defining an enclosed interior space that is separated, e.g., by the wall units 5 or wall panels 4, from an exterior space.

A unique feature of the modular mission units is that in some embodiments, the interior space defines an internal area that is variable, such as where the housing is adjustable in a manner where the internal area may be increased or decreased. For instance, the transportable modular communications unit may be of variable size and may be collapsible, such as where the internal skeletal structure, as well as the wall units 5 and/or wall panels 4 are extendable and/or collapsible, or of preset variable sizes that can be mixed and matched. Specifically, in specific embodiments, one or more of the opposed boundary members and one or more of the extended joining members are configured for being lengthened, shortened, or bent thereby increasing or decreasing the framework and thereby increasing or decreasing the internal area.

More specifically, the components of the modular unit 1 may be configured so as to be extendable or collapsible in a variety of different manners. For example, one or more of the opposed boundary members and/or one or more of the extended joining members may include a plurality of segments that are configured for collapsing in on one another, such as by being bent or by having internal cavities that are of different sizes (areas), such that one segment is capable of translating with respect to the other longitudinally, e.g., telescopically. In particular instances, one or more of the opposed boundary members and/or one or more of the extended joining members include a plurality of segments that are configured for rotating and/or pivoting with respect to one another in a manner so as to increase or decrease the area of the module unit 1. More particularly, in particular embodiments, the plurality of segments may be coupled one with another by a hinge member, such as a hinge member that is configured for allowing one or more of the plurality of segments to pivot with respect to one another in one or more of an X, Y, or Z plane. In certain instances, the hinge member may be configured for ratcheting, such as in accordance with a defined arc or preset degree of an angle such as from 1 or 2 or 5 degrees up to about 180 degrees, including about 10 or 20 or even 30 degrees to about 120, 140, or even 160 degrees in a positive or negative direction, for instance, from about 45 or 60 degrees to about 90 or 100 or 110 degrees.

As indicated, in various embodiments, the skeletal framework 2 and/or one or more wall units 5 and/or wall panels 4 may be composed of a flexible material that allows the components to be collapsible, bent, compressed, or otherwise changed in size. For instance, one or more of the boundary segments may be composed of a flexible metal, poly-carbonate, polypropylene, or other plastic, rubberized material, such as a memory form material, which allows the structural feature to move from one position to another, such as from an extended to a collapsed configuration, such as for transport, but to reform and reshape, such as post transference. Accordingly, in various embodiments, one or more of the opposed of boundary members and extended joining members may be comprised a flexible material that is configured for bending.

Figure 16:
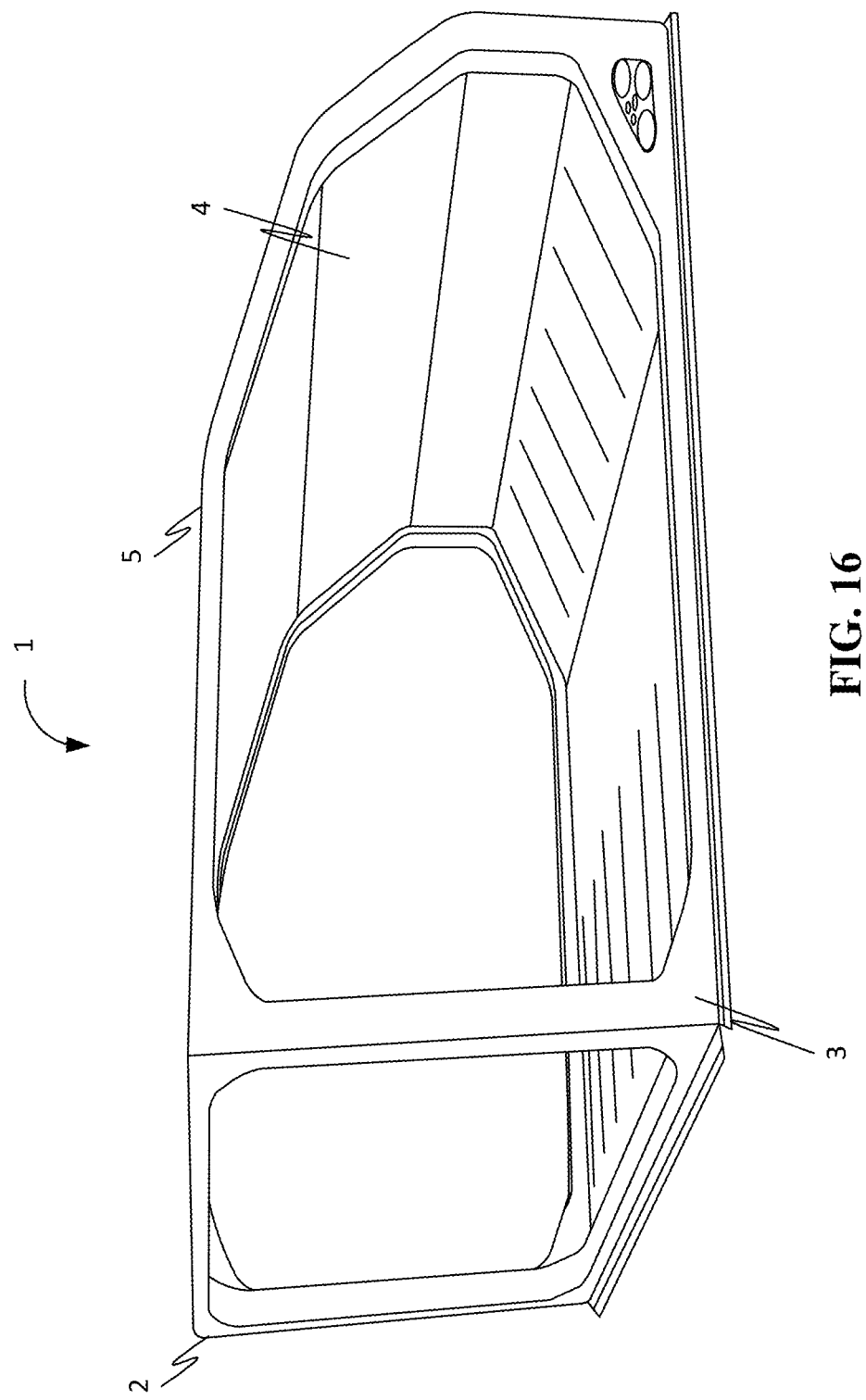
FIG. 16 depicts a representation of an interchangeable wall unit of an MLU, in this instance, the MLU is a right-hand side MLU.

Further, as indicated, as depicted in FIGS. 15 and 16, the transportable modular communications unit is configured of a pair of opposed boundary members that have a "C"-like configuration, which in this instance, may be substantially curved or curvilinear. However, in other instances, the "C"-like configuration may not be substantially curved, but rather, may be formed of boundary segments that coupled together so as to form 90 degree angles with respect to one another, but other angles are also possible such from 45 to 120 degrees with respect to one another, more or less, such as where the boundary segments are joined by a hinge member. In certain instances, the boundary members form a square component that includes a floor element segment that is joined to a wall element segment, such as where the wall is normal to the floor, but yet includes a ceiling element that is curved or curvilinear.

Likewise, as indicated, in various instances, the pair of opposed boundary members may be coupled together by being joined with one or more e.g., a pair of opposed, joining members that are configured for being lengthened or shortened in a manner to increase or decrease the distance by which the opposed boundary members are separated from one another, such that the length and/or width of the module unit 1, or module complex together, may vary. For instance, in various embodiments, the boundary members may be composed of 2, 3, or 4 (or more) bonding segments, where at least one, or one set, of opposed bounding segments are offset from one another by one or more of a third and/or fourth bounding segments, where, in some embodiments, one or more of the bounding segments is configured for being extended or retracted, e.g., in length. For example, in one embodiment, the skeletal framework may be composed of at least two sets of opposed bounding segments that form squares, which squares form the front and rear bounding members.

In such an instance, the squares of each of the bounding members may be coupled together at their corners by 2, 3, or 4 extended joining members, such that the skeletal framework forms a cube. In certain instances, one or more, e.g., each of the bounding members may be composed of bounding segments that translate one with respect to another, e.g., telescopically, such that their lengths may vary independently from one another or collectively, such that the interior area of the cube may be increased or decreased in an X, Y, or Z plane. In certain instances, various of the bounding members may be coupled together by one or more hinge members that are configured for allowing one or more of the plurality of segments to pivot with respect to one another in one or more of an X, Y, or Z plane.

Figure 18:
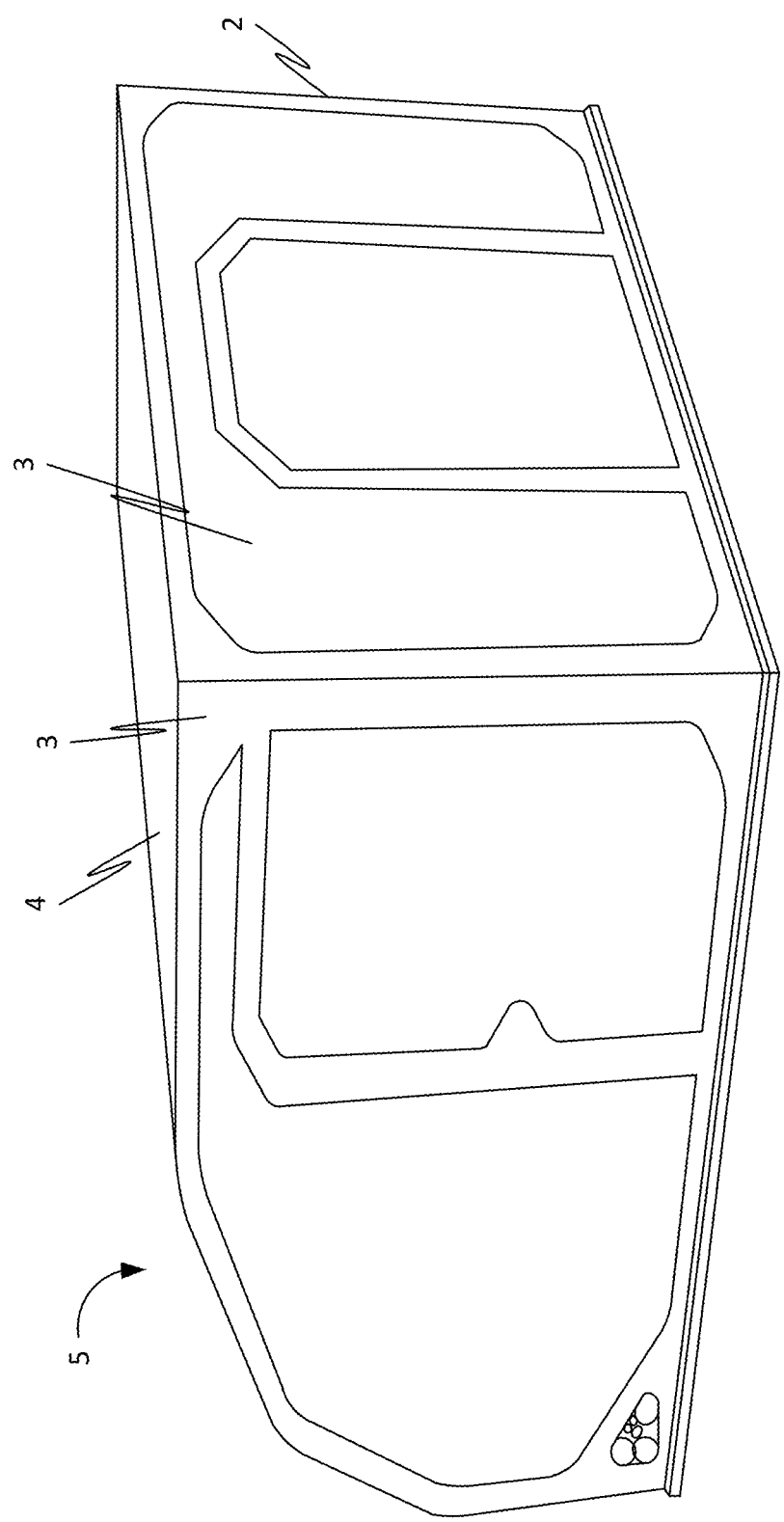
FIG. 18 depicts a representation of the MLU of FIG. 17, where the MLU has been enclosed by a plurality of interchangeable wall units, in this instance, where the wall units include doors.

Further, as depicted in FIG. 18, the module unit 1 may include boundary members 3 that form a forward side boundary and a rearward side boundary along with a side boundary that forms a receptacle that is configured for being coupled with a wall panel 4, such as where the wall panel 4 is a solitary wall or side unit. In such an instance, the boundary members may include one or more of a removable wall panel interface that is configured for allowing a wall panel 4 to be coupled therewith, such as to partially or fully enclose the internal space. Hence, in certain instances, the boundary members may include, a first, a second and a third (or more) boundary interfaces that are configured for allowing a wall unit to be removably coupled to the skeletal framework, such as depicted in FIG. 18.

However, in other instances, the boundary members may include, a first, a second and a third (or more) boundary interfaces that are configured for allowing boundary members of a second, third, or fourth module unit to be removably coupled together, such as depicted in module unit 1a of FIG. 10. Hence, in various instances, the skeletal framework 3 of FIG. 13 may include a forward side boundary, a rearward side boundary, and top and bottom extended joining members that each include bounding surface interfaces that are configured as a removable wall panel interface that is adapted for being coupled to a removable wall panel. Additionally, one or more of the interfaces may configured as a receptacle boundary interface for receiving a second interchangeable wall unit. Further, a modular unit interface may be included at a boundary member that is configured for allowing a first modular unit to be coupled to a second module unit, such as depicted in FIG. 6.

Figure 21:
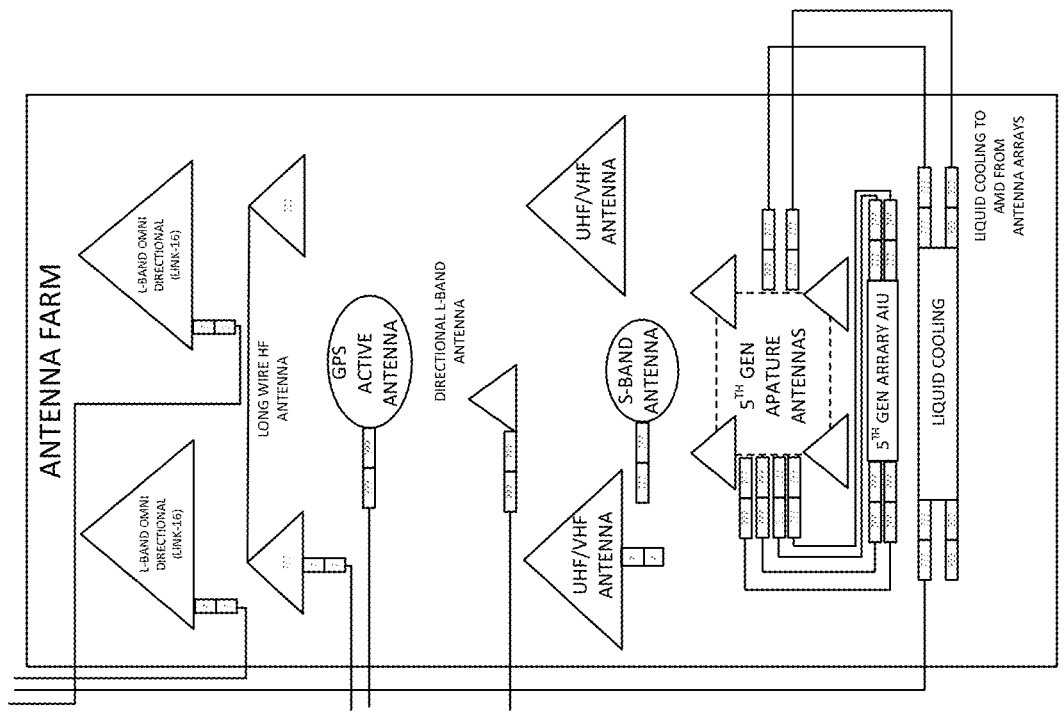
FIG. 21 is a depiction of an LHS MLU workstation, showing an antenna array.
Figure 21:
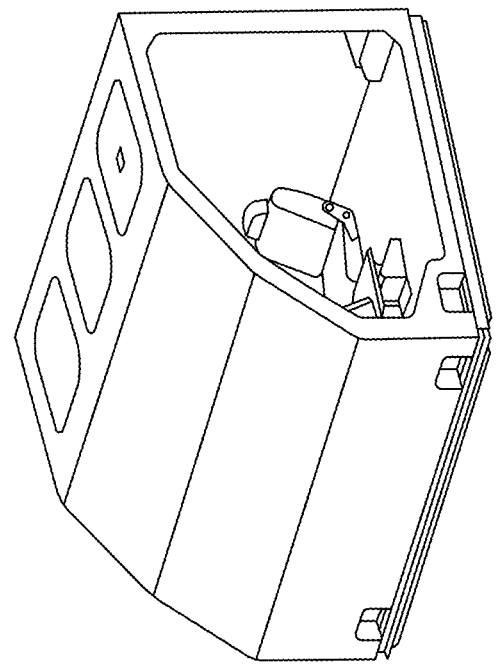

Specifically, as depicted in FIG. 6, the forward side boundary and the rearward side boundary of a LHS and RHS module, which are coupled together by a modular unit coupling interface, each includes a removable wall panel forming a front surface, whereby the front surface includes a door element, and in some instances, may also include a window element. Additionally, as depicted, a first transportable modular communications unit 1a is coupled to a second transportable modular communications unit 1b via the modular unit interface, so as to form a whole module unit 1. Further, as depicted in FIG. 21, contained within an interior space, or coupled to an outer surface of the modular unit 1, may be one or more, e.g., a plurality of, sensor elements, which sensor elements may be coupled to one or more interior client computing devices, such as where the two are operationally coupled via a network interface.

For instance, in various embodiments, a plurality of sensor elements may be provided, whereby the plurality of sensor elements include one or more interior sensor elements, e.g., positioned within the interior space, and one or more exterior sensor elements, e.g., coupled to an exterior portion of the housing. In such an instance, the interior sensor elements may be configured for detecting one or more interior conditions, and the exterior sensor elements may be configured for determining one or more exterior conditions, such that collectively the sensor elements are adapted for collecting internal and external sensed data, which may then be communicated to the interior client computing device, or an associated interior, exterior, or remote server system, such as via the network connection. Accordingly, as described in detail herein, a server system may be included within the module, such as depicted at FIGS. 13 and 14, where the server system having one or more processing units, the one or more processing units including a plurality of processing engines configured for receiving and analyzing the collected internal and external sensed data to produce analyzed result data. A data storage unit may also be included and coupled to one or more of the server system and the client computing device by the network interface, such as where the data storage unit includes one or more structured databases for storing the collected internal and external sensed data as well as the analyzed result data according to one or more classifications, as explained in detail below. A communication's module may also be provided and coupled to one or more of the client computing device and the server system, such as where the communications module comprising one or more of a radio frequency (RF) transmitters or other radios, such as a CDL, Link-16, TNTT radio, a cellular transmitter, a WIFI transmitter, a LiFi transmitter, and a Bluetooth transmitter, for communicating the collected internal and external sensed data and the analyzed result data.

As can be seen with respect to FIG. 14 the various wall-like units 4, which may be made up of one or more panel elements that form the various sides, e.g., walls, and/or compartments of the structure, may also be configured to be interchangeable. These side walls 4 may be outfitted with different components to make them function capable so as to perform one or more concentrated functions, such as configured for being a work station, a computing station, a display wall, a berthing unit, a galley, and the like. More particularly, in various instances, as can be seen with respect to FIGS. 15-19, the various compartments, walls, and/or panels 4 of the structure 2 can be interchanged, and in particular instances, the structures are formed as compartment portions that can be combined and intermixed and may include wall-like panel portions 3 that are interchangeable, and may include internal components such as electronics and displays.

Further, as can be seen with respect to FIG. 15, a structural walled framework unit is provided, where in this instance, the framework is configured as a compartment portion, having one or more curved wall panels, and openings that are configured to be enclosed by one or more removable panel portions. With respect to FIG. 15, provided is a left-hand compartment portion, and in FIG. 16, a complementary right-hand compartment portion is also provided. The two compartment portions may be configured so as to be coupled together, such as through an interlocking connection mechanism, which may allow the two compartments to be expandable at the midsection, e.g., for additional interior surface area.

As can be seen with respect to FIG. 17, in particular implementations, the various compartments, workstations, walls, and panels are interchangeable, capable of being added together or removed, and may be configured to be mixed and matched in such a manner as to be assembled in a variety of arrangements. For instance, as exemplified, the left-hand and right-hand compartments are capable of being combined together to make a whole module. They can be combined side to side, so the two halves make a whole, and can further be combined end to end to form a long chain, such as with a passage way therethrough, such as depicted in FIGS. 10 and 13.

Figure 19:
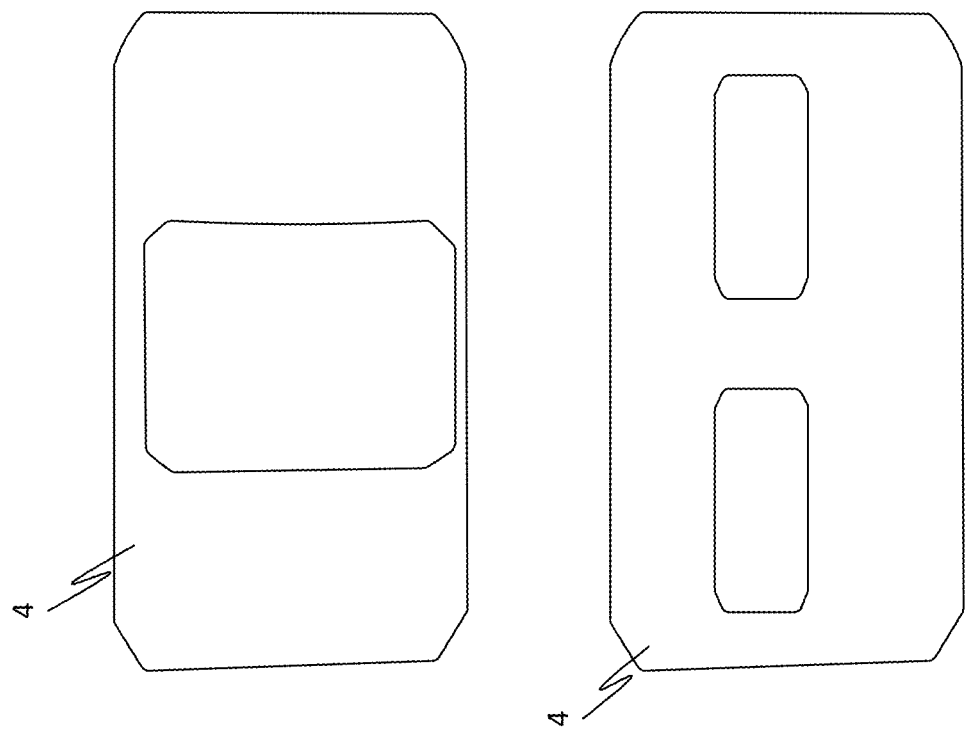
FIG. 19 depicts a plurality of interchangeable wall units of FIG. 6G, where the wall units include windows or doors.
Figure 19:
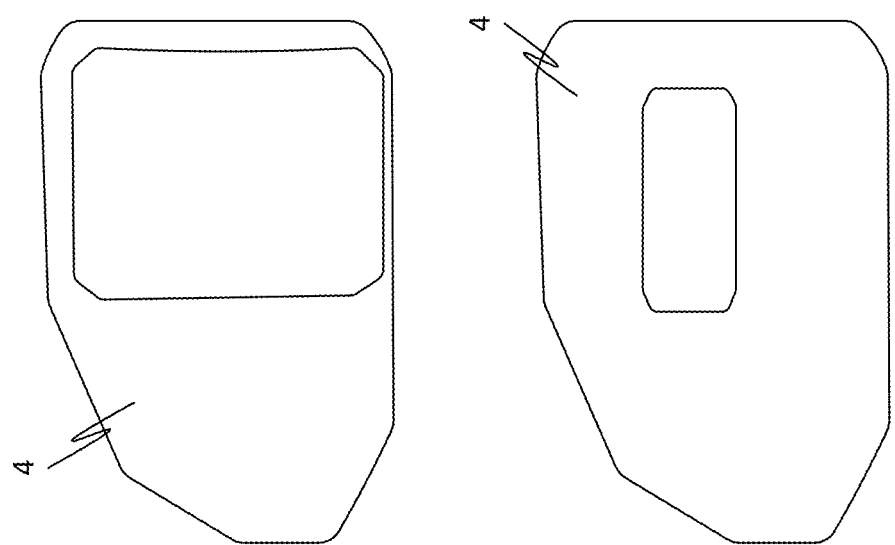

Likewise, as depicted in FIG. 18, the skeletal framework can also be combined with sides and walls to form an enclosed box, or they can be left open, or any mixture thereof. Hence, in various instances, a compartment can be sectioned off and used independently, or a plurality of compartments can be coupled together to form units, and together the units can be combined to form whole sections or segments, and sections can be used to form entire modular based complexes. Particularly, as depicted at FIG. 19, a sectioned off compartment is provided, where the compartment includes a skeletal structural component combined with a plurality of wall panels, where in this instance, each of the wall panels include doors for ingress and egress to and from the interior, e.g., cavity, of the walled in compartment.

In certain instances, the connections between compartments and/or wall or window panels may include explosive bolts, such as at hinges, pivots, or translation points that may be triggered when rapid egress is desired, which may be triggered in response to extreme shock, pressure, fire, etc. In particular instances, the modules may include pressure, temperature, acceleration, deceleration, air, oxygen, CO and/or $CO_2$ level monitors, and the like. In various instances, one or more of these sensors may be coupled to the explosive bolt elements, so that in dangerous internal environments, and threats thereof, an opening may be generated for rapid egress. Additionally, as can be seen with respect to FIG. 18, each of the wall-like panels may include a skeletal framework, e.g., border portion 3 and a panel portion 4 that may include one or more structural features such as a window, a door, and the like. Each module unit may be configured to include a variety of connections, such as including mechanical, structural, electrical, and data connections.

As depicted in FIGS. 15 and 16, each compartment may further include a utility partition for retaining various utilities. For instance, the utility partition may be configured as a pass through running the length of the module compartment. In particular instances, the utility pass through may be configured to house various conduits that function to ensure habitability. Particularly, as indicated, the mobile modules may have an internal environment, e.g., a temperature and pressure-controlled environment, that is controllable and suitable for occupation and use in a manner that the staff working therein is able to function and work without growing fatigued and tired. More particularly, an automated module management system may be provided for controlling the various electronic components and lighting features of the MLU.

For instance, the environment may be a controllable environment, such as capable of being oxygenated, cooled, and heated as required without dependence on the transport vessel. In such a manner as this, the modules can be stored and transported while having minimal impact on the vessel itself, requiring very little modification to the vessel itself. In such instances, the passthrough conduit may include wiring and cables for power, electricity, communication, data transfer, HVAC conduits, ventilation, piping for water, oxygen supply system, gas, other fluid materials, pressurization materials, and the like. For example, dependent on the use to which each specific MLU is to be employed, any given module may include a fluidic system, such as an oxygen system, for the module itself and/or for each operator. One or more fluidic detection sensors, such as for oxygen, $CO_2$, CO, and the like, may also be present, such as for determining leaks and/or for ensuring intra-modular environmental safety.

Particularly, the modular unit may include a controllable thermal, humidity, and pressurization system. Accordingly, in between the modules, its panels, and/or its attachment boarders, a sealing and pressurization mechanism may be provided, such as for sustainable, long duration flights and submergence, such as where the various boundary members are capable of being sealed, e.g., with a compressible sealing mechanism, and locked into place via a suitable locking, clasping, or latching mechanism. In such instances, the modules can be pressurized in a manner so as to reduce the effects of pressurization on the worker, and facilitate working environment longevity in a sustained, environmentally controlled working space. In various embodiments, each module may be adapted to include a global inventory and tracking system so that the MLU, its components, and its strategic capabilities may be tracked so that emerging mission capabilities can be readily supported and transported to where they are needed, such as at the edge of conflict.

Each module may have its own or a shared power, heating, and/or cooling module, with universal controllable interfaces and connections, such as fluid-flow conduits and power connections. For instance, the modules may include one or more auxiliary power units (APU) employing alternative means for extensive power generation and/or storage, such as fuel cells, photovoltaic cells, wind generators, and/or battery technologies. In this manner, the module can, but need not, rely on fossil fuel-based power generation and/or the power of a conveyance.

Likewise, in various embodiments, the sealing members between the various connection components of the modules, e.g., the interconnectable wall and/or window and/or door portions may include a unique tongue and groove configuration that may include a compressible sealing member between the connection interfaces, so as to not only make the connection waterproof but also efficient heat and cold exchange, as well as configurations that decreases the need for utility power while enabling alternative electricity generation methods. Particularly, in various embodiments, airworthiness and sea worthiness may be provided for, such as by making the module air and waterproof, such as by including the appropriate sealing mechanisms and pressurization equipment. In various instances, the module may be configured in such a manner as to reduce both ambient noise and vibration, thereby ensuring a suitable environment for work during transport, and at high altitude.

Each of the various MLUs may include networking and data connections for wired and wireless communications, and thus, the conduit or one or more other structural elements of the MLU may include high transmission rate wiring for rapid data acquisition and computing capacities and/or may include a LiFi databus connection, e.g., for the high transmission of data. For instance, the MMS modules may be configured with 4G/5G internal network connection capability such as for connectivity into an NIPR network. One or more network access switches, such as a fiber network, or the like, may be present and employed to move data and communications between different enclaves which may be made available to each workstation.

Where a workstation is provided, each workstation may include a WIFI, BLUETOOTH, ZIGBEE, or other router with multiple, e.g., 2 or 3 or more, access points. A VoIP connection with an audio bridge, switches for monitoring and speaking on multiple channels, audio interfaces with connectivity to multiple radios, e.g., with online tuning capability, headset connectors, e.g., for multiple headsets, may also be provided at each workstation. In essence, each modular unit may be configured as its own cloud computing hub. A variety of high powered, sensitive, sensor units, e.g., a UAV sensor, may be included. As indicated, in a certain instance, the flow through partition may be configured as a flush mount locking system, such as for counters, rack mounts, and the like.

Figure 20:
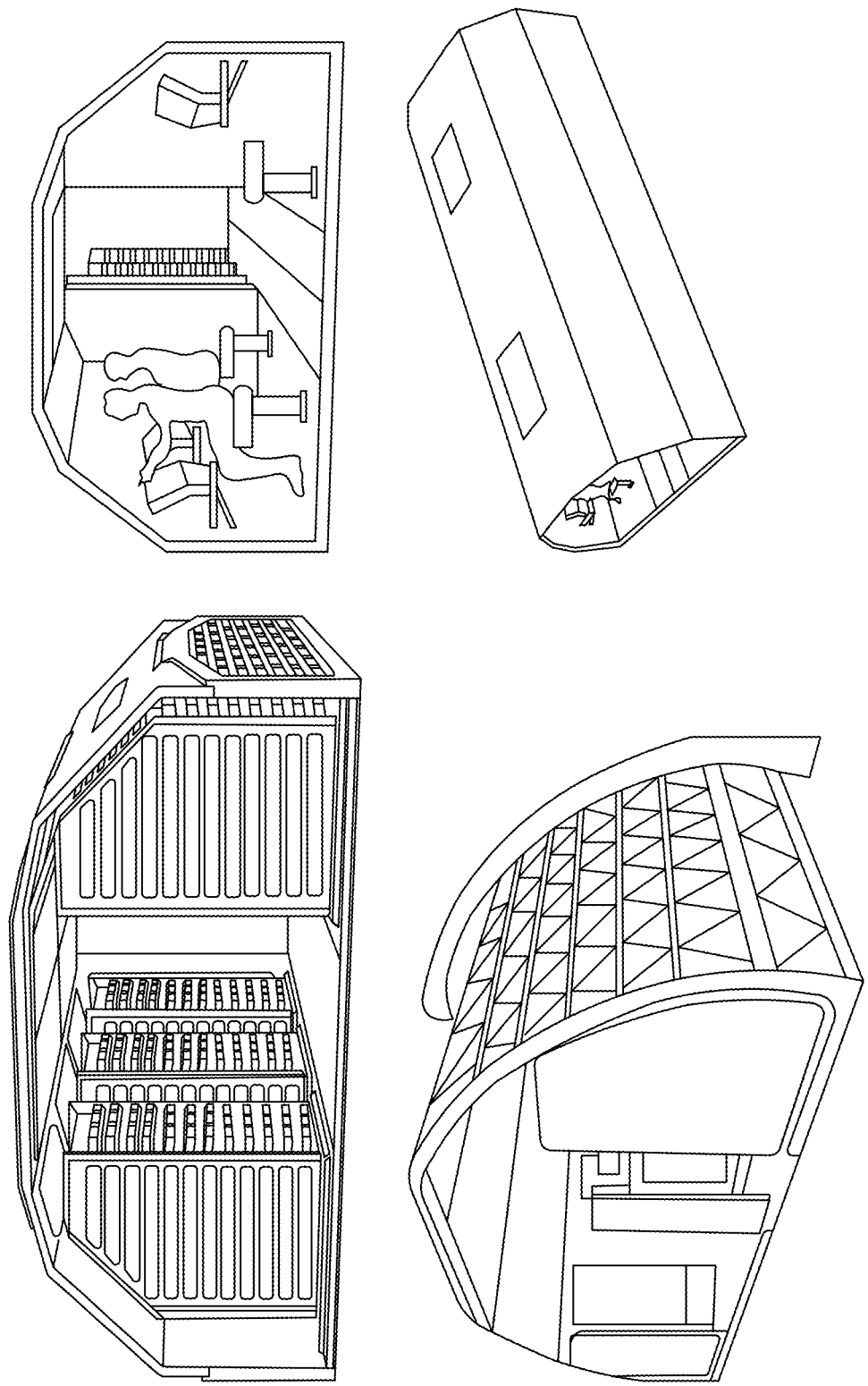
FIG. 20 depicts a plurality of partially configured module units, one configured as a work station MLU, and the other configured as a computer cluster MLU. Also depicted is an iteration where the two MLUS have been coupled together, and encased in a sleeve and partially inserted into a transport vessel.

Accordingly, as can be seen with respect to FIG. 20, a backbone of the distributed managerial, control, and communications platform is a modular mission system (MMS), in this instance formed as a MLU 1 that can be kitted out so as to be function-centric dependent on mission parameters and can be positioned near the edge of potential conflict. Specifically, as described herein, in one aspect, a modular, mobile, and scalable control and/or communications platform is provided. Particularly, the modular mission system MLU includes one or more work stations that may include or be associated with a plurality of communications modules, which modules may be configurable as to size and shape, and can be outlaid with a wide variety of components so as to make the MLU easily tailored to the mission and theater to which they will be deployed, and are adaptable so as to be transportable to the instrumentality of its mode of transfer.

A unique benefit of pushing the command, control, and communications MMS modules to the front edge of a confrontation is that it makes data collection, analysis, and decision-making control of operations easier and closer to real-time. Also, because pertinent electronics can easily be swapped in and out, the MLUs are capable of easily being fitted with communications systems that are high bandwidth, making clear, high signal strength communications more readily accessible to the average warfighter out on the edge. Generally, the average warfighter would not typically be able to access a communications pathway involving a satellite, but in this instance, forward processing and a communications infrastructure for accessing the same, even via voice command, may now be readily available.

The present distributed architecture, therefore, is useful for providing a communication platform to the average warfighter, which can make the difference between life or death in a combat situation, where the forward communications infrastructure is flexible, rapidly deployable, and easy to scale up or back. In various embodiments, the modules are capable of being delivered separately but capable of being coupled or seamlessly joined together in a manner, like building blocks, e.g., LEGOS®. Consequently, as necessitated by the demands of the theater, a plurality of inter-connectable modules may be provided such that they can form a wide range of sizes based on the number of units being joined together.

In such an instance, the MMS can easily become mission and theater tailorable, via this building block approach, and would thus be useful for bringing cloud computing and processing to the edge. For instance, where a module includes a computing architecture, such cloud computing components are configured for bringing forward frontline technologies to the theater of conflict so as to create high performing infrastructure. In such an instance, the modular mission system may include from 1 to 5 to 20 to 50 to 100, or even up to 200 to 1,000, such as from 300 to 800 or 900, including from 400 to 600 or even about 500 systems, which may include about 1 to about 100, such as about 10 to 25 units, such as about 2 or 3 to about 7 or 8, including about 4 to 6 individual MLU's.

Accordingly, the present MMS presents a revolutionary approach to providing a decentralized, modular command, control, computing, and communications (C4) infrastructure for effectuating the clear, secure, and rapid collection, processing, and transfer of communications and data across wide spans of time and space, and in forsaken environments. One of the benefits of the distributed communications platforms disclosed herein is that they are configured to meet the core needs of warfighters down range and in field including various different service personnel, including, veterans, aviators, flight officers, military program managers, and the like. Likewise, the disclosed MMS units are not only suitable for use on the edge of conflict, but they are also useful in other arenas of threat and conflict, such as areas during natural disasters, in need of disaster relief operations, and other areas in need of a central control and/or surveillance. Further, in certain instances, the MMS is applicable for use in a variety of commercial and consumer operations, such as where a secure, temporary headquarters for corporations and companies, such as where staterooms, lounge areas, and even gym facilities are desired.

As indicated, the dimensionality of the modules is highly adaptable and therefore highly variable. However, in certain instances, the dimensions may be pre-set and fixed. But, in other instances, the modules are adapted so as to be configurable, such as within a range of pre-set parameters and/or free-range. Particularly, in specific iterations, the interior dimensionality may be expandable or collapsible dependent on the mission needs, such a where any given module may be adaptably dimensioned to be able to fit within any unique assets that could be used to transport the MLUs, such as any known aircraft or vessel. Likewise, since, the exterior and interior dimensions are changeable, the area within the MLU varies dependent on the configuration, and thus, the dimensionality of any compartment or enclave within the MLU can also have reconfigurable dimensions, such as where the skeleton and walls may be reconfigurable so as to change their length, width, and/or thickness, and thus, the module itself and the compartments within the module may have a variable dimensionality.

Consequently, the height, width, and length of each individual module, as well as the different enclaves and technological wall panels may have variable dimensions. Specifically, as discussed, the frame and midsections may be expandable and collapsible, and in a particular implementation, the roof or sides may be collapsible so as to be fit within vessels and fuselages of various sizes. For instance, in various embodiments, for transport in a typical air-vessel, a module may have dimensions of about 80 to about 150, such as about 90 to about 140, including about 100 to 140, such as about 110 to 120 or 130, or even about 108 inches in length or more; and about 70 to about 130, from about 80 or 90 to about 100 to about 120, including about 88 inches wide or more, and may be about 4 to about 12, such as about 5 to about 8 or 10, including about 6 to about 7 feet tall or more.

Additionally, the thickness of each of the panels may be about 1 or 2 to about 8 to about 10 inches, including about 4 to 6, even about 5 inches thick. In one particular embodiment, the dimensions may be about 108"×88"×4' during transport, and then the roof may be raised to 8' to 10' or 12' during operations. Particularly, in various implementations, the dimensions may range from about 108" to 125"×88"×96", because this form factor fits within a cargo portion of most vessels.

Consequently, these modules may be configured so as to be increased and decreased in size and area, so as to ensure that they fit in all medium to large military transport aircraft, such as KC-135s, e.g., having a 108×88 base, but which can be made smaller or larger so as to fit within the vessel by which it is to be transported, including reducible sizing for being kitted and fitted within wide (e.g. KC-46) or narrow body cargo aircraft (e.g. B-737, B757, and KC-135). In any instance, the module may be made smaller or larger as some aircraft have greater height, and some are wide body aircraft that have greater width for the MMS. Likewise, the interior components can be selected and arranged to have a weight and balance that fits within the limitations of the transport vessel and may include vessel service interconnects. In such an instance, the electronic components can be shipped separately and inserted into the module upon positioning down range, or at any other site of integration.

So being, a particular embodiment for use with the AAY, like FINN FCE, may be about 125"×88"×84" with curved top, whereas the AAX based "half MLU" design may 125"×88"×96" and when connected to another AAX based MLU the total size may be about 125"×176"×96" unless an expanded option is utilized which would make the dimensions about 125"×272"×94". Particularly, with respect to the AMI concept, the entire sections of the MLU can be swapped out, e.g., a couple of operator consoles could be swapped out with processing modules including the exterior wall and all necessary cabling. Additionally, with respect to transformability, each MLU may be designed to be able to be connected to other MLUs by physically locking them together to include network and electrical connections, as explained herein below. Specifically, the framework and wall-like panels may be configured for retracting and expanding, and may be configured for being curvilinear, or cantilevered, so as to be fit within a narrow body (AAY) to wide-body (AAX) fuselages of planes and within ships, and submarines, and the like.

As indicated, in particular embodiments, the top or bottom portion of a modular unit may be configured so as to be retractable, or otherwise collapsible. As indicated, in various instances, the wall panels 4 of the modules 1 may be interchangeable and may include swappable components being positioned or otherwise built therein. For instance, in various embodiments, one or more of the walls of an MLU may be structured as a technical panel 4. The technical panel may include a variety technical features, which may include one or more computer racks, computer screens, computer workstations, and the like. These interchangeable wall units give the modules the ability to have one or more different operational emphases.

For example, as explained in detail herein below, in one embodiment, a given technical module may be configured as a computing facility and may, therefore, have 1, 2, 3, 4, 5, 10, or so racks of computer equipment, such as of one or more server cores. The racks may be of any size, but will typically be about 24 inches high, 40 inches in depth, and 108 inches long, and may be configured for retaining computing, power, and/or conditioning equipment, and the like. Other configurations for larger equipment are also useable, hence, each rack may also be of variable dimensionality.

Hence, any given wall structure may optionally be configured to include any of an assortment of technical features and may further include any of a number of structural features, such as a door or window or other opening, for instance, at both end portions, so as to allow for continuous connection of multiple MLU's with a walk-through, e.g., doorway or other passageway, therethrough. This flexible design layout permits the ability for multiple of the unit types to be mixed and matched with ingress and egresses built into the wall panels as throughways, ducting for air and gas transfer may be provided, as well as conduits for power and communication connectivity. For instance, fluid ducts, such as gas, e.g., air or oxygen or water ducts, may be provided for the transfer of fluids within and between units, such as for the transfer of cold or warm air and/or for the transfer of air in and the transfer of $CO_2$ and CO and the like out. Active noise reduction fans and ducts may also be provided.

Various of the modular units may include compartments, such as in-wall, floor, or ceiling compartments for storage, utility connectivity, and communication transfer. For example, as can be seen with respect to FIG. 21, ceiling compartments may be provided for upward-facing antennas and/or other roof top mounted equipment. In various embodiments, an array of configurable antennas and compartments may be provided, on the interior or exterior of the compartment, so as to include technical apparatuses. For instance, a variety of radios, transceivers, antennas, sensors, data collectors, and the like may be provided so as to receive different types of data, from different data and control planes, coming in at different directions in space.

Thus, different communication components may allow for receipt, decoding, translation and transcription of communication, regardless of their endogenous network, e.g., Link-16, CDL, TTFN, specialty networks, and the like. Particularly, a variety of ceiling and/or sidewall or floor compartments and/or configurable panels can be provided for retaining or otherwise housing useful equipment which may include a GPS module, INMARSAT, Link-16, TTNT, L, S, C band-SCISR, and the like. In various instances, one or more of the MLU units may be coupled to, or otherwise positioned on, a platform, such as a differential riser platform. In particular instances, the riser platform may include spacing for housing HVAC, communications, power, and/or networking equipment.

Accordingly, in view of the above, in one instance, a set of tactical modules may be provided. Such tactical modules may be combined in any suitable configuration and may include a combination of directed functionalities focused for different mission categories, such as operational tasking, cloud computing, communications and networking, as well as utilities, and the like. The tactical modules may be ruggedized, pressurized, and include their own environmental conditioning units to ensure comfortability regardless of in what terrain they are deployed. In certain instances, the wall and/or other structural features are adapted so as to be impact and/or ammunition resistant, and in some instances, can be configured to be air dropped.

In particular implementations, the module system may include MLUs, and/or PODS, which are built out so as to be mirrored one with another in order to build out redundancy within the system. Redundancy is a useful element employed by the present configurations of the system and its components. Particularly, the modular units may be configured so as to mirror one another. For instance, one or more of the modules may be built out and configured so as to correspond to one another and/or a central command unit, such as where each of the mirrored MLUs or PODS includes a database, or other features, that mirrors one or more of the other MLUs or PODS and/or central command databases. In a manner such as this, if one or more of the MLUs or PODS is rendered non-functional the data collected and/or analyzed by anyone module is not lost, but easily retrievable and/or transferable via one or more of the mirrored databases, thus, providing survivability to the information collecting infrastructure.

In a manner such as this, a ubiquitous multi-domain network may be configured and positioned on the forward edge, for the development, transmission, and execution of C2 mission orders, sector/theater operational-level decision making, theater UAS interactivity, and intelligence surveillance recognizance (ISR) database reconnection. Likewise, the modular communications platform is scalable, where each of the modules is capable of being coupled together both physically and communicably one with another within the same area, but also communicably capable of being coupled together across long distances of space. And as indicated, each communications module includes an internal module design that allows for individual components to be swapped in and out in an easily networked condition, so as to promote rapid upgrading and deployment, as necessary. In various embodiments, the processing functionalities of the modularized, platform units are configured to generate, receive, and to implement instructions that may be either closed or opened sourced.

Figure 22:
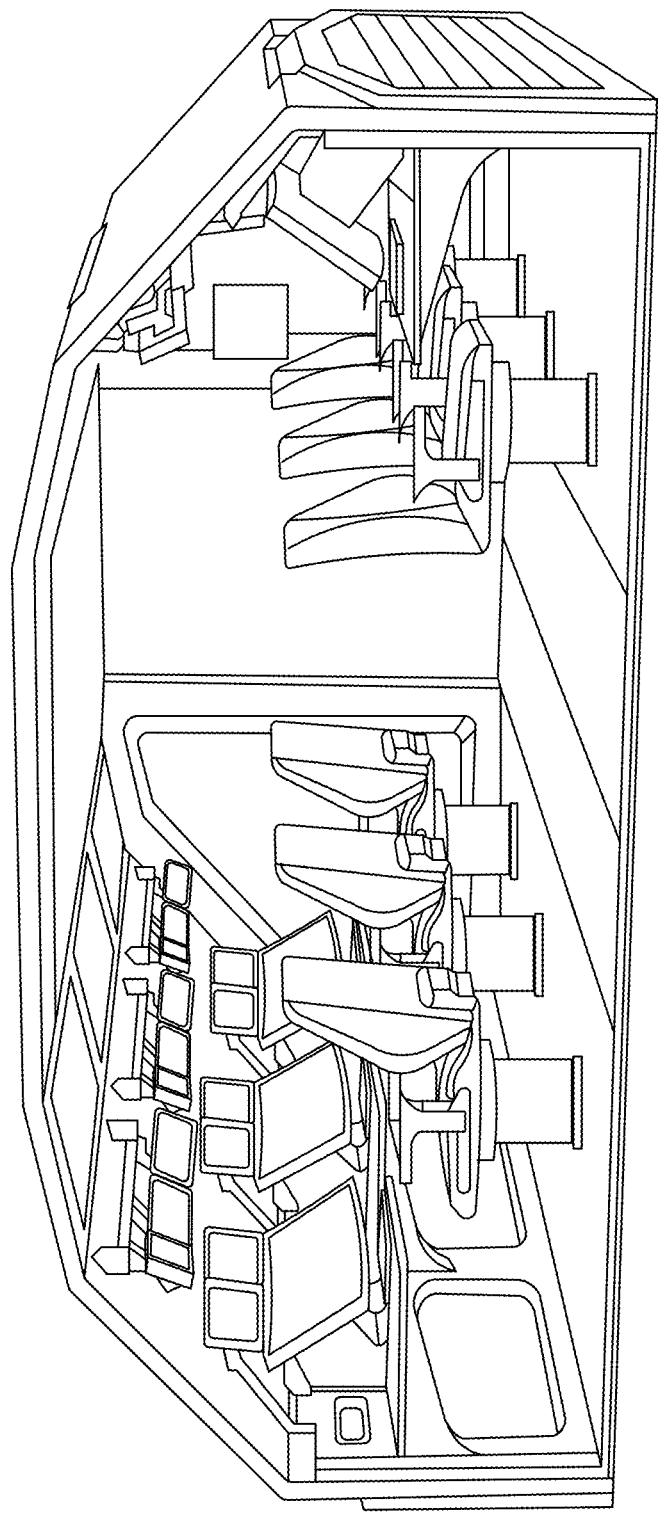
FIG. 22 is a depiction of a whole workstation MLU, where the MLU is only partially enclosed.

In particular embodiments, the MMS modules may have different concentrations, for instance, as can be seen with respect to FIG. 22, an exemplary work-station module is provided, where the module may be configured to host a variety of operators and thus, may include a multiplicity of work-stations that are adapted for providing a working environment for one or more operators. One or more of the MLUs may include one or more wall panels that include multiple display panels, TV screens, and/or computer monitors may be provided, such as where the monitors are ultra-thin, and may be placed in sync with one another in such a manner that a multiplicity of panels are capable of displaying the same or different images. In one embodiment, the ceilings and/or floors may also be configured with display screens. In various instances, the modules may be automated.

In such an instance, an operator can choose the look and feel of the environment in which they work to ensure functioning at full capacity. A variety of sensors may be provided, because it is expected that the systems may be placed in more austere locations, and so HD cameras and SIGINT sensors may be mounted on the outside to provide initial warning and then integrated with weapons engagement systems. There may also be multi-levels of security software provided, such as for receiving and processing communications as well as distinguishing between allied and foreign force transmission, as well as between open versus secret and top-secret communications. Software for managing the modules is also provided, such as where the software includes integrated voice & data, such as including SIPR, JWICS, NIPR, and the like. Utilities are provided, such as for power, cooling, quality atmospherics, consumables, and sanitation.

Figure 23:
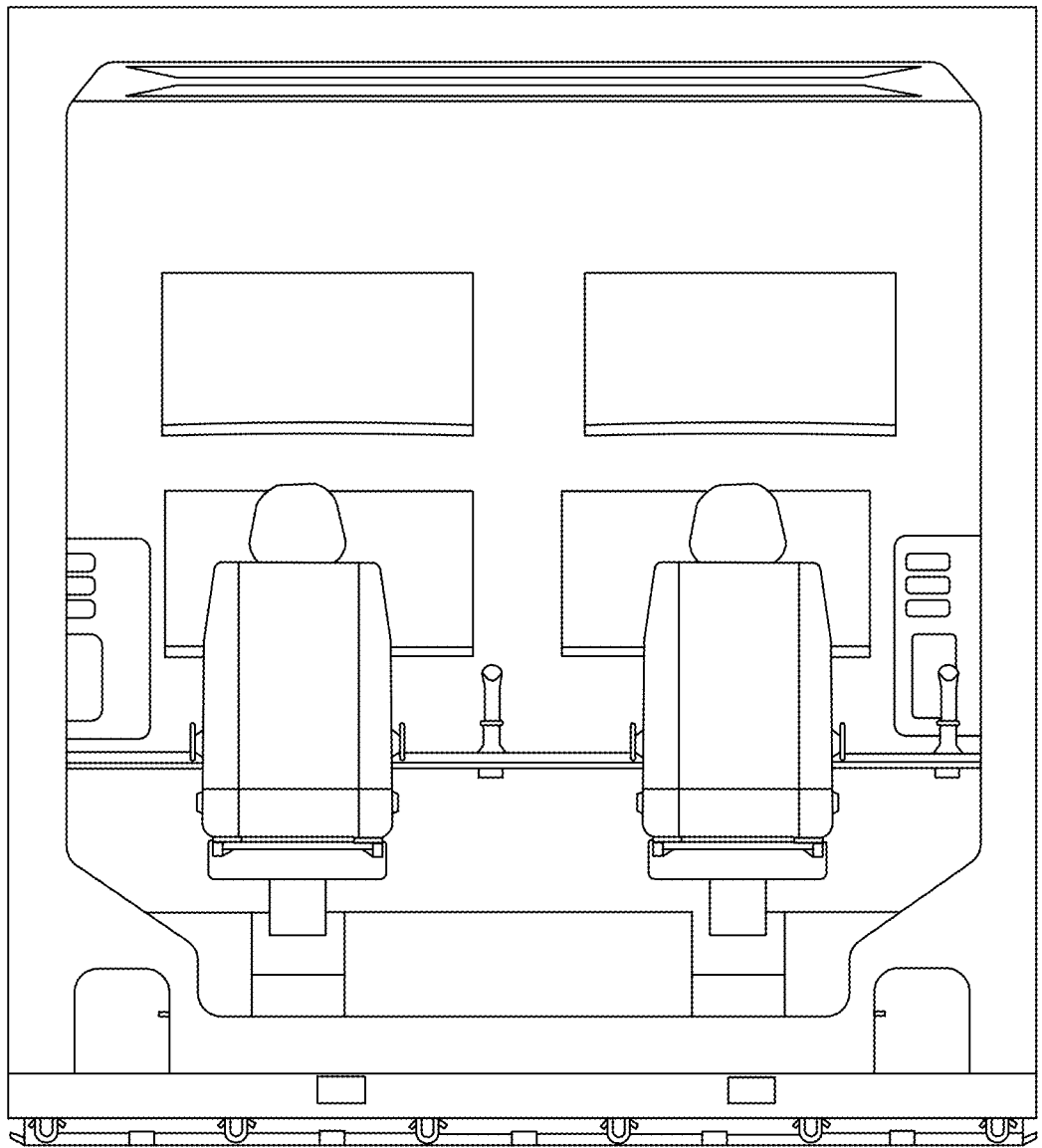
FIG. 23 is a depiction of a partially enclosed workstation MLU.

Accordingly, as set forth in FIG. 23, in various embodiments, the MLUs may be designed as an operator module that includes one or more operator workstations, which is outfitted so as to be focused on providing an operator a multiplicity of technologies for receiving, processing, viewing, and analyzing collected data. For instance, the operator module may include a plurality of operator workstations that are made to optimally house one or two or even up to five or ten or more lay-flat seats and workstations. In various instances, the workstations may be positioned within a single MLU or may stretch across multiple units, e.g., two or three or more, where the MLUs can be directly connected, and open through doorways placed in what will become the middle of the modules.

In particular embodiments, the module may include a workstation that may include one or more of the following componentry. Each unit may include a plurality of communications and data transfer connections, e.g., feeds, as well as various technology switch mechanisms, e.g., keyboard, video, mouse (KVM) switch, one or more processing cores, such as a CPU, GPU, or other integrated circuit, such as an FPGA, ASIC, and the like. Further, the workstation may include an interface, e.g., a graphical user interface, having an input mechanism, such as a keyboard, mouse, joystick, and/or voice activated control unit.

Particularly, the workstation may further include a multiplicity of clocks, for displaying time in multiple zones, as well as including a plurality of monitors, such as configured as a tactical monitor and/or an operator monitor, which may be a high definition, OLED, capacitive sensing touch screen module. In particular instances, the module may include a plurality of displays with advanced controls so as to provide an internal environment having an augmented and/or virtual reality ecosystem, which need not employ conventional mouse, keyboard, and/or other traditional input mechanisms, but rather can have a virtual input interface. In various instances, these interfaces can be configured so as to significantly reduce power and structural requirements. In such instances, the internal environment can be augmented to provide a holographic display for control mechanisms.

Furthermore, one or more power supplies, e.g., renewable, rechargeable power supplies, may be provided, which may be coupled to all of the electrical components requiring power. Interior lighting, electrical outlets and interconnects, and cargo storage and/or loading interfaces may also be provided. A personalized heating and cooling, e.g., HVAC, system, or a connection thereto, may also be provided, so that the modular unit may be deployed and used within more hostile environments of extremer regions of hot, cold, or humidity, including rain, snow, ice, dust, sand, and the like. As can be seen with respect to FIGS. 23 and 25, each MLU may be configured in the same or a different manner depending on the tactical requirements of the prescribed deployment.

Figure 24:
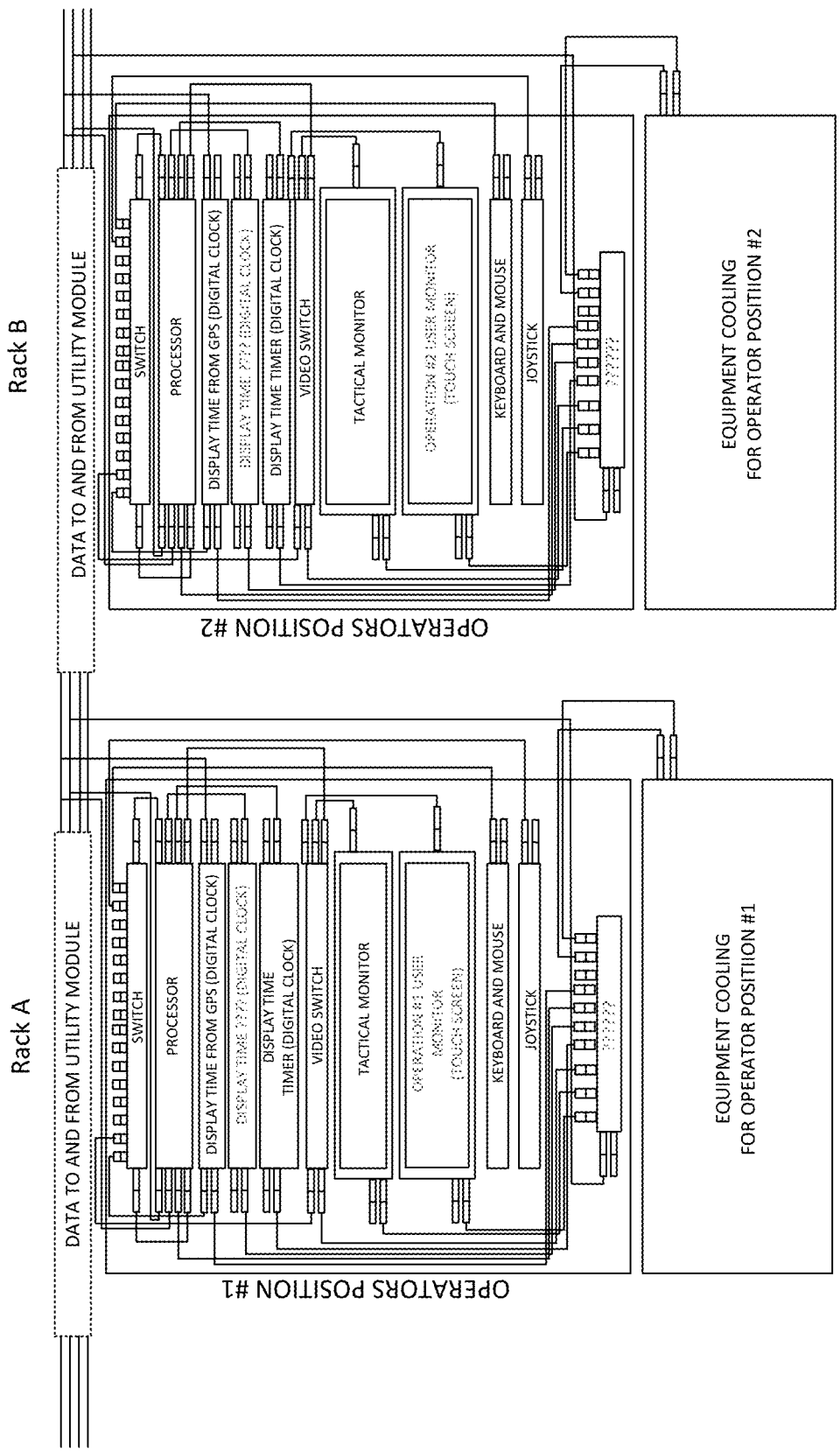
FIG. 24 is a depiction of an enclave within an MLU, such as a computer cluster MLU having one or more computer racks housing a variety of computing components.
Figure 25:
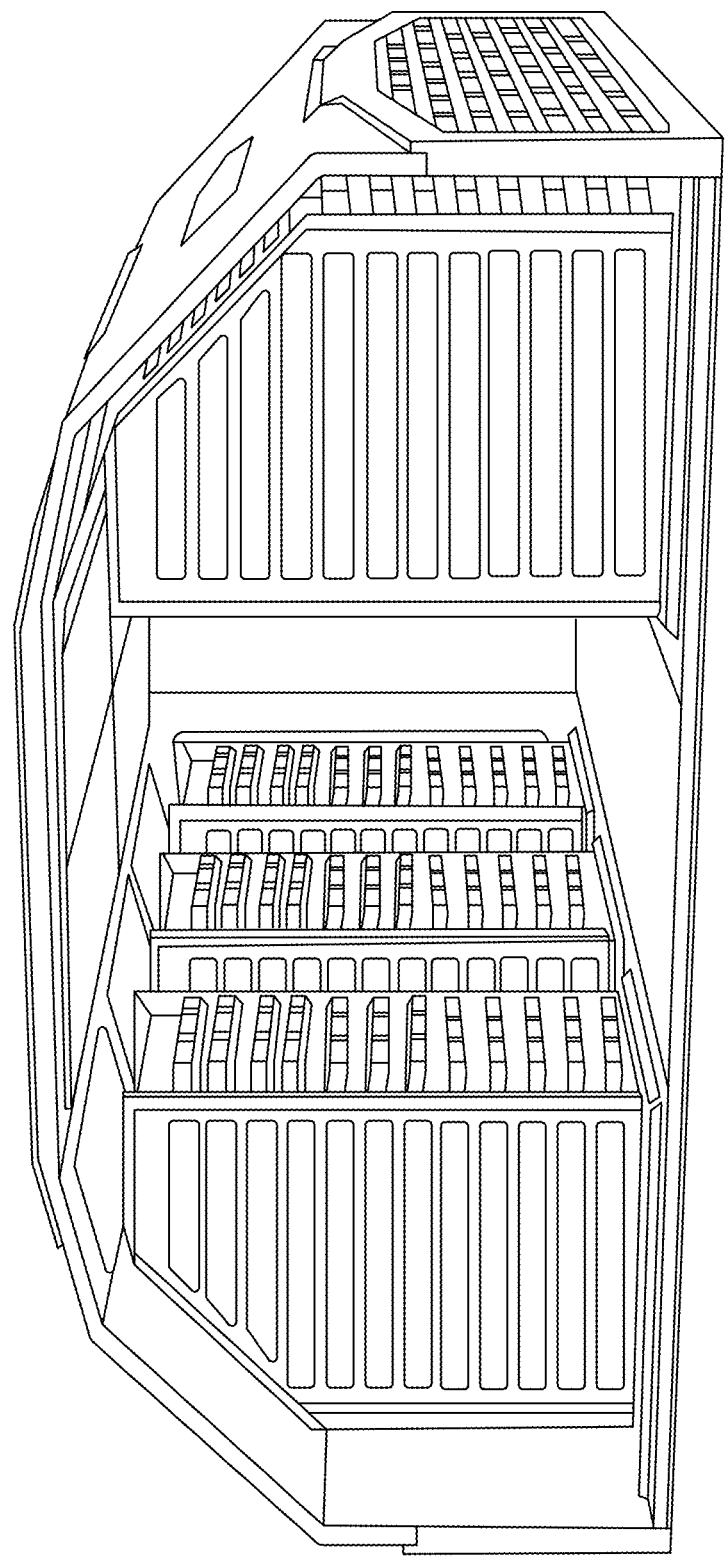
FIG. 25 is a depiction of a whole MLU configured as a cloud serve unit.
Figure 27:
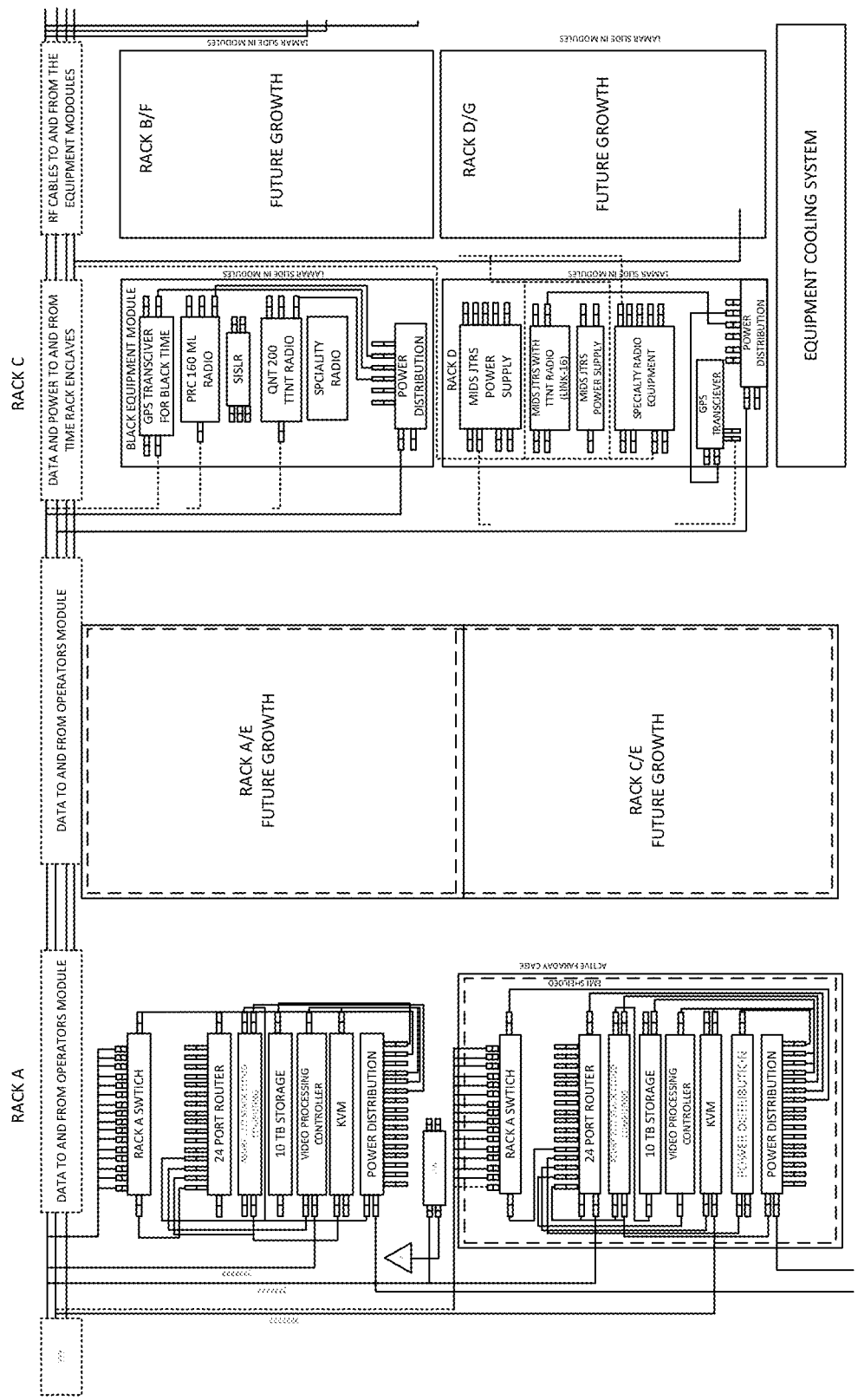
FIG. 27 is a depiction of computer units that may be housed within the enclaves of FIG. 9A.

For instance, as can be seen with respect to FIG. 23, the MLU is configured as a workstation, and with respect to FIG. 25, the MLU is configured as a computer cluster unit. In either instance, as depicted in FIGS. 24 and 27, either MLU may include one or more enclaves containing a variety of computing technologies, such as where the computing technologies can be housed, e.g., within the operator module, or may be otherwise associated therewith. In such an instance, as depicted in FIG. 24, the MLU may include an enclave having one or more computer racks housing a variety of computing components are provided, such as one or more switches that allow one or more users to switch between computing processing facilities, input and output mechanisms, monitors, and the like.

For instance, a MLU may be configured as a processing center, such as including one or more, e.g., a plurality, of cloud accessible servers. Particularly, FIG. 25 presents an exemplary MLU configured as a processing cluster having a processing module that may include a plurality of server stacks, where each server stack includes one or more CPUs/GPUs/FPGAs/ASICs, etc., which are configured for performing the analyzing and processing of collected data. In various instances, the processing functionality may be an open architecture to rapidly integrate most capable USG, Allied or Commercial electronic components, within the processing architecture.

More particularly, in various embodiments, a server system is provided such as where the server includes one or more, e.g., a multiplicity of, processing units having a plurality of processing engines. For example, in various implementations, the server system may be configured for receiving and analyzing collected internal and external sensed data, communications, and command instructions to produce analyzed result data. In such an instance, the set of processing engines may include a first processing engine configured for retrieving the collected internal and external sensed data, received communication data, as well as command instructions from a structured database. In particular embodiments, the sensed and collected data (and command instructions) may be parsed, such as via a natural language processing module, key elements may be identified, and data may be categorized in accordance with one or more classifications, such as for storage in and retrieval from a structured database, e.g., based on the classifications. For instance, in a specific embodiment, the collected sensed and communication data may include data pertaining to one or more exterior environmental conditions, such as for monitoring down range operations. In other embodiments, the data may pertain to interior workstation environment conditions and/or the condition of an operator working within a controlled workstation environment.

A second processing engine may be included such as where the second processing engine is configured for analyzing the results data, such as the exterior and/or interior condition data, the personal condition data, and the communication and/or classification data, and the like. Likewise, a processing engine may be provided for determining one or more relationships between the various different data, communications, instructions, and analytics, e.g., based on the identified classifications, so as to produce a first set of relational data. In certain instances, the relational data may be directed to a relationship between the exterior and/or interior condition data and the personal condition data.

A third processing engine may be provided, wherein the processing engine is configured for accessing, e.g., from the structured database, and examining the set of relational data, such as for the purpose of performing a first predictive analysis. For instance, in such an instance, the first predictive analysis may result in the server system making a plurality of predictions about the sensed data, the collected data, the communication data, the analytics data, and the like. For instance, in one exemplary embodiment, the prediction data may include a prediction pertaining to sensed data, e.g., exterior or interior sensed condition data, operator personal condition data, received or to be transmitted communication data, resultant analytics data, and the like. For example, the predictive analysis may result in a prediction being made pertaining to the exterior and/or interior condition data and one or more operator condition data. In such an instance, the various predictions may pertain to increasing functionality of at least one operator within field, e.g., down range, and/or within a controlled environment of an operator module, such as for determining a range of conditions, e.g., set points, by which a point of increased functionality may be facilitated by a change to one or more of characteristics, e.g., of the sensed conditions, such as a determined exterior and/or interior and/or operator personal condition.

Also provided may be a fourth processing engine that may be configured for automatically modulating one or more control conditions, such as within an operator external or internal environment, for instance, by changing a set-point control when one of the characteristics of the monitored conditions fall outside of a determined range of the set point. A fifth processing engine may be provided, such as where the processing engine is configured for receiving additional, particularized, sensed exterior or interior or operator condition data, such as from a forward sensing and/or communication component, where the data includes a plurality of raw data points.

In such an instance, a further processing engine may be provided and configured for analyzing the plurality of raw data points and determining one or more relations between the raw data points so as to produce a further set of relational data. Additional processing engines may be provided for examining the observed, generated, or received relational data, and a weight may be attributed to various respective raw data points associated with the set of relational data, and, thus, weighted relational data may be produced. One or more processing engines may be provided for evaluating and scaling the weighted relational data, such as by applying a mapping function to one or more of the raw data points, the determined relational data, and weighted relational data to produce a collection of scored data points. Further processing engines may be provided for the purpose of performing additional predictive analysis, e.g., based on one or more of the scored data points, such as where the set of predictive analyses may include a query to be run by the server system, such as where the query models the results of a proposed strategy. The result may be that the system makes one or more additional predictions, e.g., pertaining to the one or more of a military or habitability stratagem or its implementation.

Accordingly, in view of the above, the workstation may include one or more client computing devices that may be coupled to one or more data storage units, as well as to one or more server systems, e.g., via a network connection. In certain instances, the client computing device may be coupled to a display element, such as where the display element generates a graphical user interface (GUI) that is adapted for producing a project dashboard, having controls for allowing a user of the client computing device, e.g., a work station operator, to view, review, and direct the performance of the herein disclosed predictive analyses, and in view of the results thereof, a work station operator may analyze the data and determine, or otherwise select a determined configuration of the system, such as for implementing a determined stratagem.

Specifically, as depicted in FIGS. 23 and 24, the server system of the work station may be coupled to one or more sensor elements and one or more data storage units, such as associated with one or more forward operators and/or POD containing conveyances. In such an instance, one or more of the data storage unit, the server system, and the client computing devices may be configured for being coupled via a network connection to a forward sensing component, the forward sensing component being configured for detecting one or more conditions within the inhospitable environment and/or a forward operator operating therein so as to produce sensed exterior condition data. Therefore, the workstation may include a variety of monitors, such as a dedicated tactical and/or operator general use monitors, whereby one or more conditions of a plurality of operators and/or conveyances can be viewed by a work station operator. The workstation may include various input mechanisms, e.g., keyboards, mouse, joysticks, and the like, so as to allow the work station operator to monitor and/or control down range operations. These various electronics components may be separated one from the other in the rack via one or more faraday cages and a cooling rack may also be included.

Figure 26:
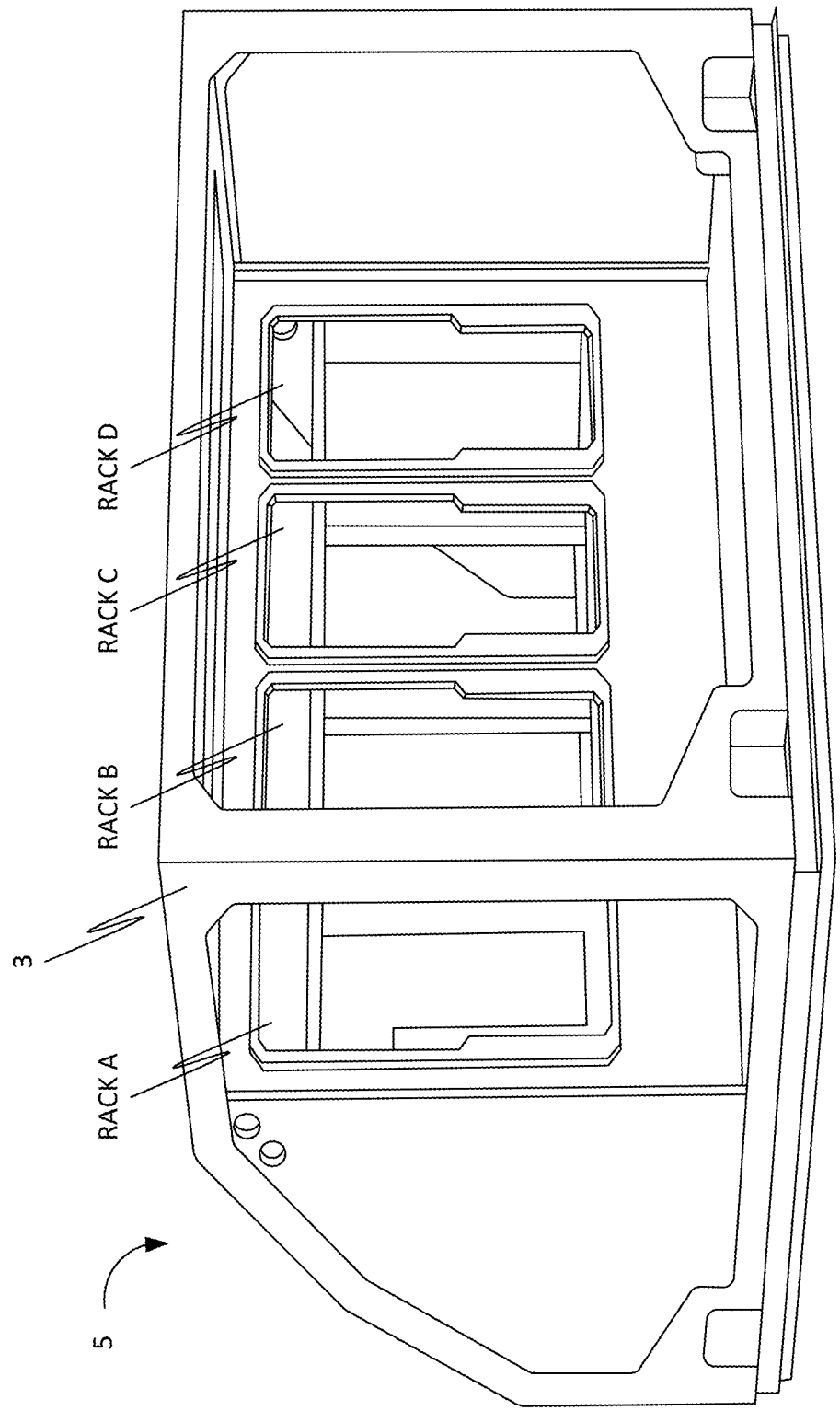
FIG. 26 is a depiction of a utilitarian support and/or equipment MLU having a series of enclaves into which various equipment, such as computer or other utilitarian gear, may be housed.

Additionally, as can be seen with respect to FIG. 26, one or more of these modules may be outfitted for the purpose of providing utilitarian support and equipment to forward operators, as well as providing advanced communications between ground troops and air and sea support. Particularly, in various embodiments, the utility module may be configured as an equipment module, which may include cloud computing and/or networking technologies, such as including one or more ethernet, cross-domain, and switching mechanisms, such as a KG-250X switch, as well as an iridium link, and one or more processing stacks, such as an Azure computing stack.

The equipment module may include one or more equipment spaces or cabinets, which may include one or more racks that are separated by an isolation panel so as to isolate one from the other against noise, vibration, power or electrical interference, communications interference, as well as EMI and the like. For instance, equipment spaces or enclaves may be employed for housing one or more computing systems and/or servers, such as for collecting, processing, analyzing, and/or monitoring internal and external environment data, or they may include other equipment for regulating the internal environment of the various different module types. One or more faraday cages may be provided, such as for EMI isolation.

The utility and/or equipment modules may further include sufficient storage capacity for arms, munitions, health and medical equipment, such as emergency medical and/or surgery kits (EMK), defibrillator kits, other safety equipment, fabrication and construction tools, firefighting and suppression accessories, and related life-support and maintenance items. Particularly, various of the equipment may include a variety of tools so as to allow operators and techs to configure, test, and repair the various different mission systems, such as provided at an operator monitoring and/or controlling consoles. Specifically, in various embodiments, the utility module may include tools and equipment so as to be configured to allow users to perform all internal and external mission systems, sensors, apertures, and related support system actions.

More specifically, the utility modules may be configured to provide full ops control for all sensor, radar, radio, and monitoring functions. In various embodiments, a MLU may include an array of several different types of both radios and antennas so as to receive and distinguish between a plurality of different data coming from different sources arranged in convergent or divergent areas of ground, sea, and space. Such radio components may include one or more of a QNT-200, SCISR, an EMS Antenna, MIDS-JTRS, e.g., with TTNT, Link-16, PRC-160 HF, and/or a MADL. Hence, the utility module, or other modules, may include sensor and/or communication units, such as one or more sensor/communications interface computing and/or display panels such as to monitor and control IR, Radar, UV, and EO/IR sensors.

Likewise, in various instances, a utility module may have a health and/or medical emphasis, and, therefore, may be configured for monitoring the health of one or more of the forward operators and/or the module inhabitants during the course of their duties or while sleeping or resting. In such an instance, the medical MLU unit may be configured to allow users to perform typical, standard, or even non-normal/emergency procedures of all internal and external mission systems, sensors, apertures, and related support system actions. The interior sensors of the system may be configured for monitoring the health and wellbeing, e.g., the vitals, such as heart rate, breathing, activity levels, sleeping, etc. of the users of the modules or the operators associated therewith. This sensed data may then be fed into the system computing architecture and be used to determine health trends and environment of the system and its users.

A MLU may also be focused to provide technical equipment and/or utilities for access and use by one or more of the other modules, such as one or more operator modules. For instance, the equipment module, as can be seen with respect to FIG. 27, may have a variety of different components, feeds, and/or configurations. For example, in various embodiments, one or more equipment modules, such as designated herein as Equipment Rack A and Equipment Rack B, may be coupled, e.g., physically and/or operationally, to one or more operations modules or workstations thereof, such as corresponding workstations A and B.

In various instances, the equipment modules may include various storage compartments or enclaves for housing or otherwise retaining computing, powering, switching, and/or radio technologies. Hence, in particular embodiments, the utility module may be configured for performing data collection and/or receipt, and thus, may include a communications enclave that includes satellite and microwave communications counsels, a plurality of radios, such as containing a MIDS, CDL, Link-16, TTNT, and the like, as well as data links for establishing a high-capacity backbone. Additionally, one or more enclaves may include a cloud computing cluster, which may be configured for high density computing, cloud storage, and predictive analyses. In such instances, a multiplicity of enclaves may be provided, with secure separation between them.

Accordingly, as discussed above, in various instances, a plurality of modules may be deployed together, so as to generate a mesh command and communications network in a manner so as to make the different MMS modules and their components synergize and work together, such as where compatible-unique combinations of elements that could not previously be coupled together and communicate with one another are now enabled to talk. For instance, in various instances, the communications networks herein can be modified to create an interface and an interchange that allows them to be combined and communicate with one another.

In particular instances, the various modules and communications components of the present disclosure may be coupled together such as for performing a chain, e.g., a pipeline, of functionalities, such as for collecting, receiving, and analyzing data from and/or pushing data to the one or more operator and other modules, forward operators, and/or data collectors, such as on a data or control plane. In such an instance, the operations module(s) and/or utility and/or equipment modules may include an overarching computing facility, such as for communicating with and controlling the operations of one or more of the other modules, where the various equipment and utilities may be housed within one or more enclaves or receptacles. In various embodiments, one or more of the walls of the modules may incorporate or be associated with one or more solar panels and/or may include mobile batteries.

Accordingly, in various instances, a plurality of modules may be combined together with interchangeable walls that when combined can form a complex of modular units, such as to form a modular missions command (C2/C4) center that can be positioned on the edge of conflict, such as depicted in FIG. 10. Each individual modular mission command center and system is configured for being loaded on to and taken off of a transport vessel, such as an airplane, a ship, a train, a truck, and the like, such as in a similar manner as a typical freight container. For instance, there are two typical types of shipping containers, e.g., wide and narrow body. However, because of the manner in which the MMS is configured, it may basically be operated throughout transport, e.g., save for on boarding and off boarding, and is thus, ready for operation within moments of deployment, which is a considerable savings in time and resources than the tent-city system currently being practiced, which can take months, even up to a year, to be fully set up during deployment.

Typical command post type tactical setups are in a tent shelter systems which are normally 30'×35-65' long. While spacious these systems are cumbersome and require a large, improved, footprint to setup and operate, and do not have walls and are not ruggedized. In addition, they are less shielded from the environment and advanced computer servers and systems are more susceptible to damage compared to an environmentally sealed MMS configuration. In contrast, the present modular communications platform is mobile, capable of being transported in vehicles, trains, ships, planes and the like, and then coupled together to form a complex of units, wherein each unit may perform a different function during deployment.

Accordingly, because a plurality of smaller modules can be dispersed throughout a region, a centralized communications facility being staffed by hundreds to thousands of operators is not needed. In such an instance, in running an air crew, because each crew is limited to 330 hours/month, two sets of crews of 30 staff and operators each are needed for functioning on a one day on and one day off work schedule, so 60 people are needed per plane, and typically 17 planes are being run at one time per theater. However, because of the modular based configurations of the MMS disclosed herein, instead of employing such a large burdensome number of resources and incurring their attendant costs, in the enhanced environment of the modules, a couple to tens of operators may be employed, such as 2, 5, 10, up to about 25 operators, rather than hundreds to thousands of operators, which would be required when running an Air Force based architecture. Thus, the present modular mission system can minimize staff needed to run modules and lessen flight crew burden, and thereby reducing in flight crew, costs, and infrastructure.

In various embodiments, one or more control and/or power connections may be implemented and used to link various of the modules together, such as in a control relationship. Particularly, in sharing a control relationship, such as a dominant/submissive relationship to one another, the modules, such as a flagship module disclosed herein may be configured as a control module, and may include one or more switches, routers, processing stack arrangements, such as CPU, GPU, or other cloud based computing stack, a memory stack, such as a high density storage module, e.g., having upwards of 10 TB or more of memory, a video processing stack, controller, an energy storage unit, and the like. Further, the computing configuration may include one or more input devices, such as a built in KVM switch along with a keyboard, video, and one or more display monitors. A power distribution board, EBU, may also be included along with a GPS/system time distribution unit.

As discussed herein, in various instances, a computing architecture, represented in FIG. 9B, may be repeated one or more times, such as depicted in this instance as both operations enclave panels A and B, with respective computing architectures, which may further be in communication with one or more server racks in other modules. Such modules may further be connected by one or more communication and/or data cables, such as WIFI, Bluetooth, an RF cable, and/or LiFi. Hence, the utility and/or equipment's module, may be in communication, e.g., RFID, LiFi, data, and power communication with one or more of the other modules, such as where the utility module may be in a control relationship over the computing facilities of the other MLUs and/or PODS.

An equipment and/or utility module may include one or more server racks including a series of switches for providing monitoring and switching between monitors, such as to allow an end user to view and monitor a variety of data collectors and/or transmitters and/or one or more forward operators, such as during engagement. Consequently, one or more routers, e.g., 8, 10, 12, 24, or more port routers, may be provided and associated with one or more computing, e.g., server, stacks, such as a MICROSOFT AZURE® or Amazon Web Services (AWS) cloud computing stack. One or more storage devices may also be included, such as up to a 10 TB or more dedicated memory device.

Likewise, one or more video processor units and/or controllers with a series of graphics cards may also be provided. A switch panel with a variety of switches and/or cross domain devices for accommodation of a multiplicity of electronic components, such as monitors, keyboards, and the like, as well as a power distribution board, GPS, and/or one or more clocks may also be provided. Further, as depicted, a plurality of rack module equipment receptacles, e.g., equipment enclaves, may be provided in the module for retention of a multiplicity of these utility racks.

Figure 28:
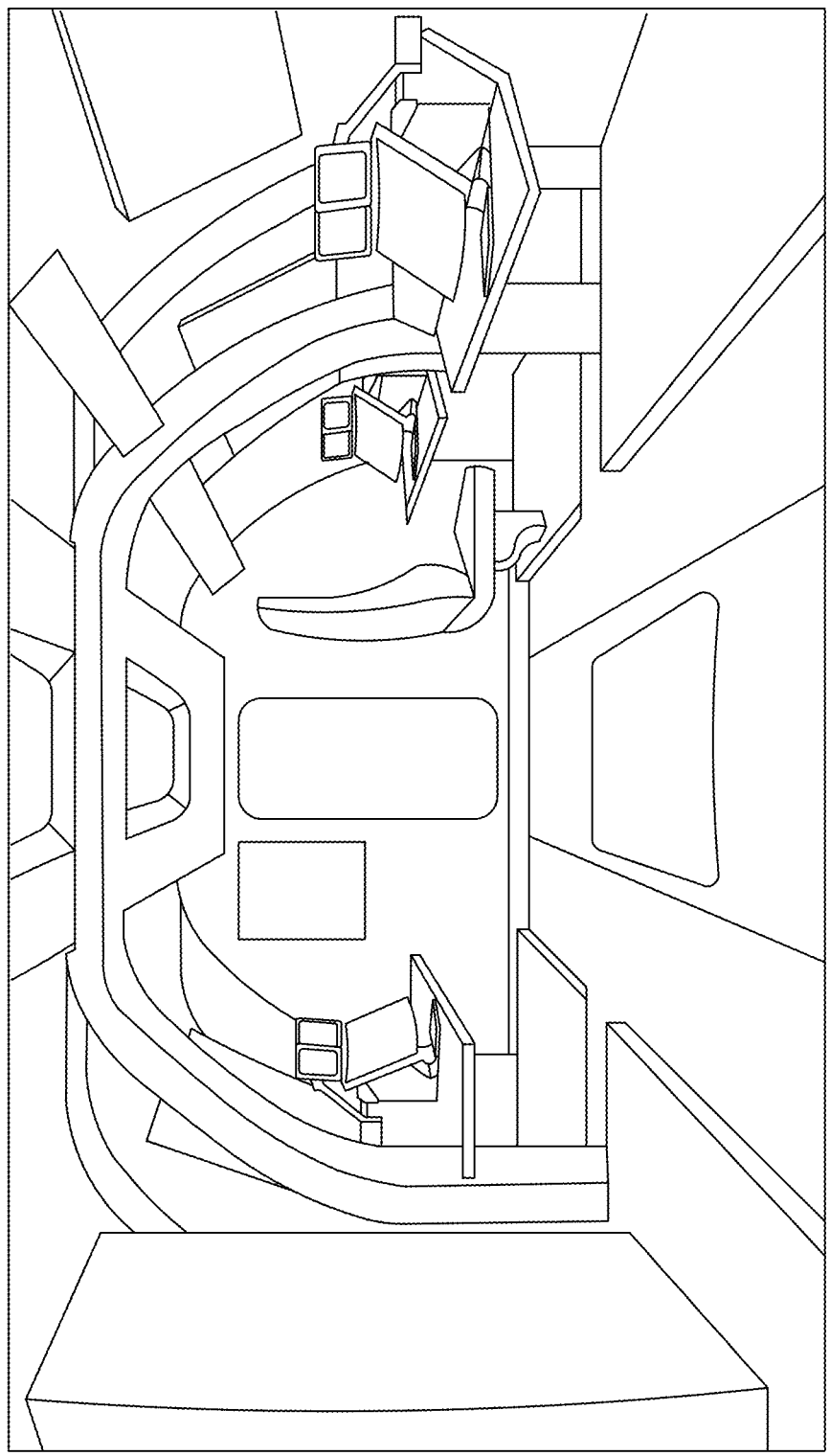
FIG. 28 is a depiction of a Flag Decision MLU.

As depicted in FIGS. 27 and 28, a data and power rack enclave, e.g., enclaves C and D, can also be provided, such as where, for example, enclave C includes an active signal transceiver and/or modulator, such as a GPS transceiver or other signal modulator, which may be amplified and/or focused by being coupled to one or more antenna arrays such as may be coupled to the exterior of the modular housing. Likewise, the equipment module C may be outfitted with a variety of different communications connections for connection not only with the respective operations modules but as well as with corresponding PODS, and therefore may include a GPS transceiver, a high frequency radio transceiver, e.g., a PRC 160 radio transceiver, a SISCR and QNT-200 TTNT radio, and a power distribution board. The equipment module D may additionally be outfitted in the same or similar manner, such as to include a variety of different radios being controlled by one or more different control operations, and thus, may include a MIDS JTRS with a TTNT radio and/or LINK-16, a MIDS JTRS power supply, a MIDS JTRS TEFA amp, and other radio/equipment. As depicted, a variety of other enclaves for housing equipment modules and/or MLU and POD communications and control architectures may also be provided along with an equipment cooling system.

In various embodiments, one or more of the modular units may be configured and outfitted as a crew habitability module. For instance, the modules of the disclosure may be configured so as to effectively, efficiently, and affordably meet the basic human needs of the occupant operators based on the platform that it is integrated into, to enhance mission accomplishment. For example, typical first-class airline seating may be used to provide both work and rest space. The unit may include efficient lavatory and rest facilities. Operator health and effectiveness monitoring may also be provided. Particularly, depending upon the platform that an MMS is integrated into, the MMS may provide a complete work/rest/refresh environment for the crew and knowing crew member performance capabilities will be instrumental in an optimal mission result. Crew monitoring systems, both physically attached and those that survey an area, can provide individual and team cues for performance enhancement.

In particular implementations, this module may be built to provide an additional configuration for crew resting and recuperation, such as during longer missions and deployment. For instance, in various embodiments, the sitting at one of the operator units, or at a crew habitability module, may be configured as a typical lay flat configuration, where operators can rest at their workstations via their lay-flat seats. Hence, during long duration flights and ground operations, the operators, staff members, pilots, and information technicians can utilize the sleeping modules that are specially designed to provide a comfortable sleeping environment. In various embodiments, a module or a portion thereof may be configured as a sleeping module, outfitted with one or more racks and beds. This module may also provide for a galley, such as for food preparation, cooking, potable water supply, and toilet.

A network enterprise module may also be provided, such as where the module provides a backbone for directed and enhanced networking capability for the various other modules that form a series or complex of modules. The network enterprise module may provide one or more racks for server space for mission critical subsystems as well as an interface to a communications module, such as including one or more, e.g., a series of, routers, such as LAN and/or WAN routers, CT, TS, Secret, Unclassified, and the like. For instance, one or more servers may be configured to provide more permanent services for the mesh web-based communications, data transference, and/or analysis components disclosed herein, and may additionally provide commonly used communication mechanisms that include local email, chat protocols, such as direct messaging, and COP (potentially Solipsys®), as well as DCGS, Joint Automated Deep Operations Coordination System (JADOCS), and other core software suites.

Particularly, the server system may be configured to provide the capability to monitor, access, and repair communications stacks/networks using an OFFRAMP system that may include a network COP with detailed drilldown information. Voice servers may also be provided, e.g., VoIP, analog audio, RoIP, voice bridge, and the like. In one instance, an OFFRAMP networking solution may be provided so as to embed multiple components into a single device that reduces SWaP-C requirements, which may include a router, switch, wan optimization, network monitor, firewall, encryption and decryption coding and monitoring, and type 1 HAIPE.

In a manner such as this, a network enterprise module may be outfitted so as to be capable of determining and zeroizing loads, accessing, monitoring, and maintaining all necessary mission crypto codes so as to monitor and engage in all communications coding, decoding, encoding, and translating, and may further be configured to access and repair all communications functionalities, including messaging. In various embodiments, the network enterprise module may be configured for allowing system operators, or the system itself, to monitor, access, and repair communications stacks and networks, such as using the OFFRAMP system on each respective enclave including a network COP with detailed drilldown information.

Accordingly, as can be seen with respect to FIG. 28, in various embodiments, one or more modules may be configured to collectively form a Flag Decision Module (FDM), such as where the module(s) is configured and outfitted so as to enable leadership to convene briefings, conferences, working sessions, council meetings, and the like, in a workspace tailored around a multi-input conferencing capability. In one implementation, the FDM may include additional, e.g., two, three, four, five, or more modules that are companions to one another so as to enable each MLU to be loaded and/or transported separately but mate to form the complete Flag Decision Center, which can act like a miniaturized version of a forward command center.

Particularly, in one embodiment, a built-in collapsible, multi-seat table, which may include built in computing resources, in-table display surfaces, and touchscreen interfaces, which is configured to put multiple staff members in direct contact with one another, either live or via video conference. The configurations may include a power and/or technology wall of smart energy storage units and/or touchscreen monitors, such as display screens. One or more image capturing devices, such as a VTC, e.g., a JWICS, system may be included with multiple selectable camera angles. A large video or knowledge wall may be provided so as to provide one or more tailorable display screens for all to see with space for data from COP/CTP/Intel/ATO/news/briefings and other sources. Camera and video management and control systems may also be provided, such as for receiving and controlling image acquisition, capture, playback, and analysis, such that one or more cameras of forward operators and/or operations vehicles can be controlled from this central interface.

Figure 29:
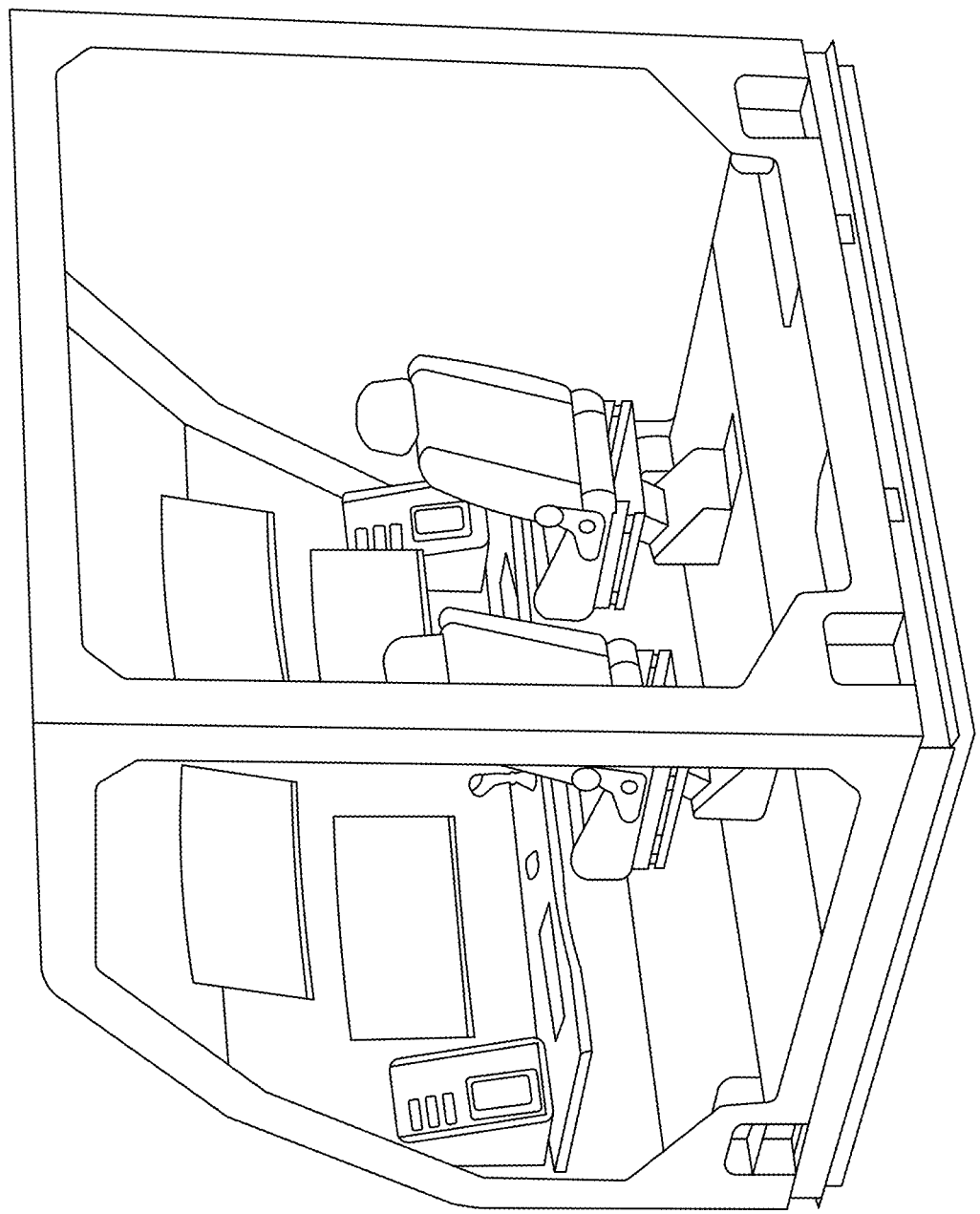
FIG. 29 is a depiction of a LHS workstation MLU showing a workstation having a plurality of computer displays and/or TVs.

One or more of the modules may be outfitted with a variety of interior hardware or software enabled components. For instance, as can be seen in view of FIG. 29, the various modules may include one or more workstations, which workstation may include a plurality of computing and processing devices, such as an Azure or other processing stack. Specifically, the workstations may be network connected and may have multiple screens that can provide touch access to the various computing devices and other networked enclaves, as well as providing visual and audio interfaces, for this and other modules. For example, each workstation may include one or more communication and/or data transfer networks, which may include various switches, such as an ethernet switch, such as for switching between devices, networks, modules, and/or workstations thereof. Particularly, a cross-domain and KG-250X Iridium link may be provided.

In certain instances, one or more of the modules may form part of a utility cloud network, such as including a cloud computing utility and/or equipment module. For a visual interface, the workstation may include various display screens, e.g., a screen wall display, may be provided such as where the wall is configured as a giant display. The display wall may include one large display or multiple, e.g., one, two, three, four or more, large format HD, OLED, flat screen monitors, which may be large, medium, and/or small format flat screen monitors. Electronics cradles with power and NIPR connection for tablet devices may also be included. Power conditioning equipment may also be included, and in certain instances, a Faraday cage for isolating EMI may also be provided.

The workstations include highly designed operator seats, which may be configured to lay-flat, stowable work desk, input devices, such as one or more of a keyboard, touch pad, trackball, mouse, and the like. Likewise, each workstation may include an audio panel, which may include directional speakers for operating without a headset. The workstations may further include various sensors, cameras, and/or other image capturing devices, which devices may be provided on the interior or exterior of the modular unit. One or more wireless networking devices, such as a RFID, WIFI, LiFi, BLUETOOTH, LE-BLUETOOTH, and the like, may be provided as well. In various embodiments, the modules may be configured so as to include high-speed, high bandwidth gigabit WIFO connectivity and coupling, which may also include high reliability data bus connects, such as a data bus, a fiber bus, a serial bus, and/or a WIFI bus.

Of course, storage space for personal effects and equipment may be provided, such as for retention of electronic flight bag insertion (via Electronic Tablet) for mission manuals and other related electronic documents that provide additional resource information. The workstations, and module as a whole, may be provided with lighting, which may be in communication with a variable lighting control panel and a microcontroller so as to adjust the lighting cycle to accord with outside ambient environments, which may be programmed to slowly shift the light cycle to correspond with the outside world so as to reduce jet lag, and/or to coincide with an outside environment of choice regardless of where the actual module is positioned. Each module may also include armaments, such as a weapons system, which may be deployed on an inside or outside part of the module. Appropriate interfaces with the host installation may also be provided, and electrical power and conditioning equipment may be included.

The module units may include an environmental maintenance system, which may include Heating, Ventilation, and Air Conditioning (HVAC) systems, as well as climate control equipment to regulate airflow between MLUs and/or into and out of any particular operations module. In various embodiments, the environmental maintenance system may include pressurization equipment, which may include: High loading on panels due to pressure differential 2 psi differential: ≈18,000 lb force on side panels, and may include a bleed air pressurization interface.

Other equipment can also be included such as oxygenation and ventilation equipment, e.g., for continuous-flow and/or demand-flow, internal environment or operator condition sensors may also be included, such as a CO emissions detection and removal system, a pulse oximeter, and the like. Fire suppression and impact resistance equipment may also be provided. A LiFi network connection may also be provided between modules so as to allow for a lightweight connection, e.g., with reduced electromagnetic interference, switches are also provided within each MLU.

Particularly, in various implementations, one or more mission load units (MLU) may include a connection interface, such as for the transfer of data and information, whereby the connection may be a Giga-bit Data Bus Li-Fi Coupling, which can be used to connect one MLU with another, such as for the transmission of data. Specifically, this LiFi coupling may be employed to connect data buses in individual MLU's without any actual physical connection, such as through the Li-Fi Coupling Interface (LCI). This coupling is useful because it avoids potential physical damage to the coupling mechanism, such as a traditional pin and hole coupling of typical data connectors. In this regard, the LCI may include a highly modulated light source that acts as a transmitter, e.g., employed as a data connection link in one module, and a highly responsive light receiver, as a data link connector in a second module, such as within an enclosure on an edge of the MLUs, which may have one side covered by transparent quartz.

Each LCI includes control and processing electronics to convert conventional data bus signals into highly modulated light. Additionally, each LCI has control and processing electronics to convent highly modulated light into digital data that connects to a conventional data bus. Thus, when two MLU's are brought into proximity and locked together, the LCI's from each are placed in direct proximity, which enables giga-bit data communications without physical connections through conventional connector plugs. This significantly improves MMS reliability because it eliminates the use of metallic pins that have high failure rates. This also increases the data bus security because no emissions are allowed to escape the coupling.

Accordingly, each MLU may have multiple LCI components so it can connect with other MLU's with data buses at various security levels and with varied purposes. Likewise, each LCI can also be remotely controlled such that MLU-to-MLU communications can be enabled or prevented by the MMS security system/workstation operator to increase levels of security. Hence, in various embodiments, presented herein are MMS Digital Interfaces with Host Platforms using LCI.

Another application for the referenced LCI is connecting one or more MLUs within a MMS to a host conveyance, e.g. aircraft, without the need of a physical interface, such as during transit. The LCI on an MLU can be directed at an LCI installed on the host aircraft to enable very rapid MMS loading and operations. Another application is when the MMS is loaded within standard shipping container to provide battle management and command and control functions aboard special mission or commercial ships, trucks, or other vehicles. The LCI's on individual MLU's can be configured connect with LCI's within the conveyance structure or shipping container. Other LCI Applications include connecting data buses within HCB modules and/or creating standardized digital data interfaces for spacecraft.

Figure 30:
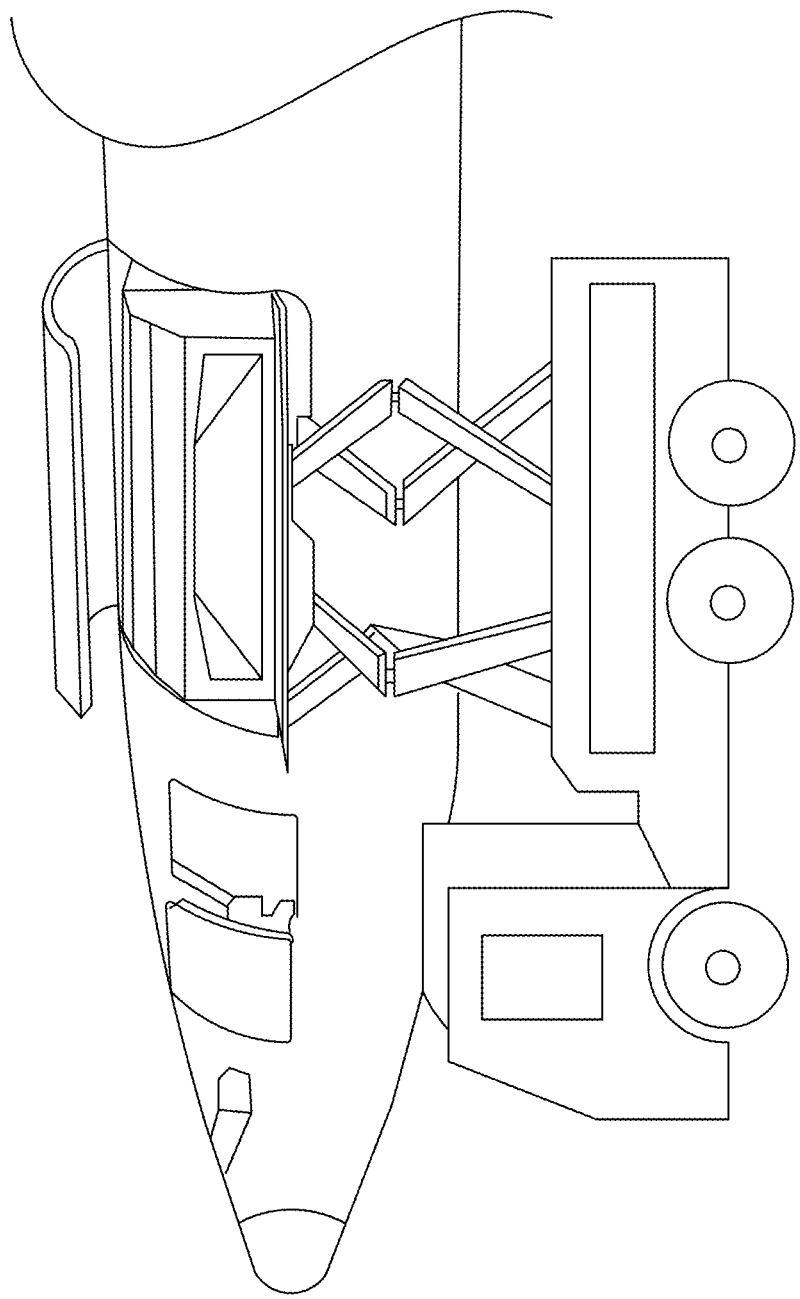
FIG. 30 is a depiction of a MLU being inserted into an airplane.
Figure 31:
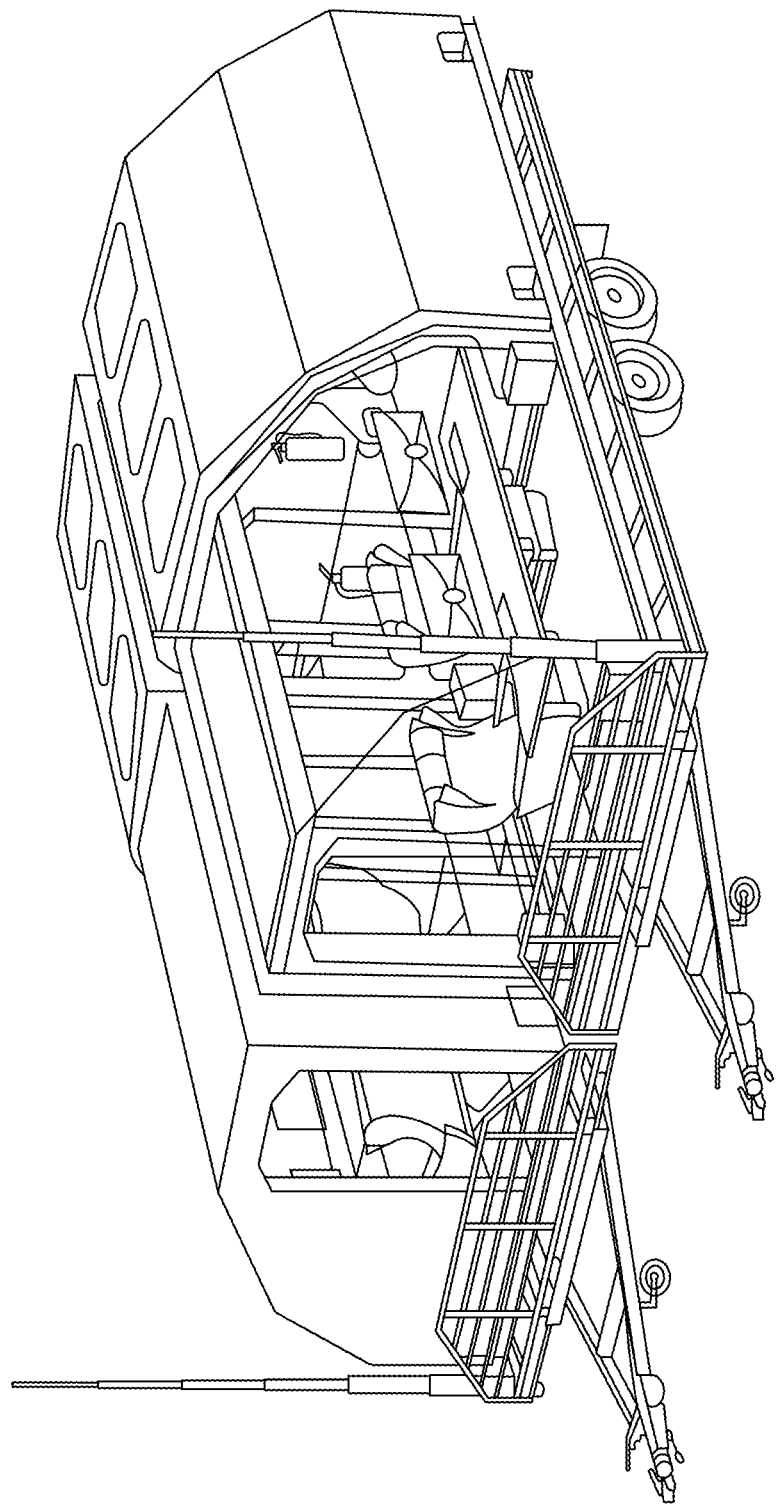
FIG. 31 is a depiction of a transportable MLU positioned on a moveable platform.

As indicated, the modules are configured so as to be easily and rapidly deployable, and thus, may be configured for ready transport, while being serviceable for use while being transported. The modules may be configured for terrestrial use, use in the air, on or under the water, and during transport, such as in fusel loges of aircrafts or within submarines or ships, in shipping containers, and on trains and trailers. For instance, as can be seen with respect to FIG. 30, the modules may be configured for being transported by itself, such as by being fitted within the haul of a military or commercial airplane, or by means of one or more additions to the unit and/or by an outside conveyance. Likewise, as can be seen with respect to FIG. 31 the module frame may include wheels or may be configured for being attached to a trailer portion or other conveyance, such as with the appropriate loading and/or securing interfaces. Particularly, in various instances, the modules may be configured for being easily transported, such as on a trailer, and may include built in wheels, may be forklift compatible, and the like.

Figure 32:
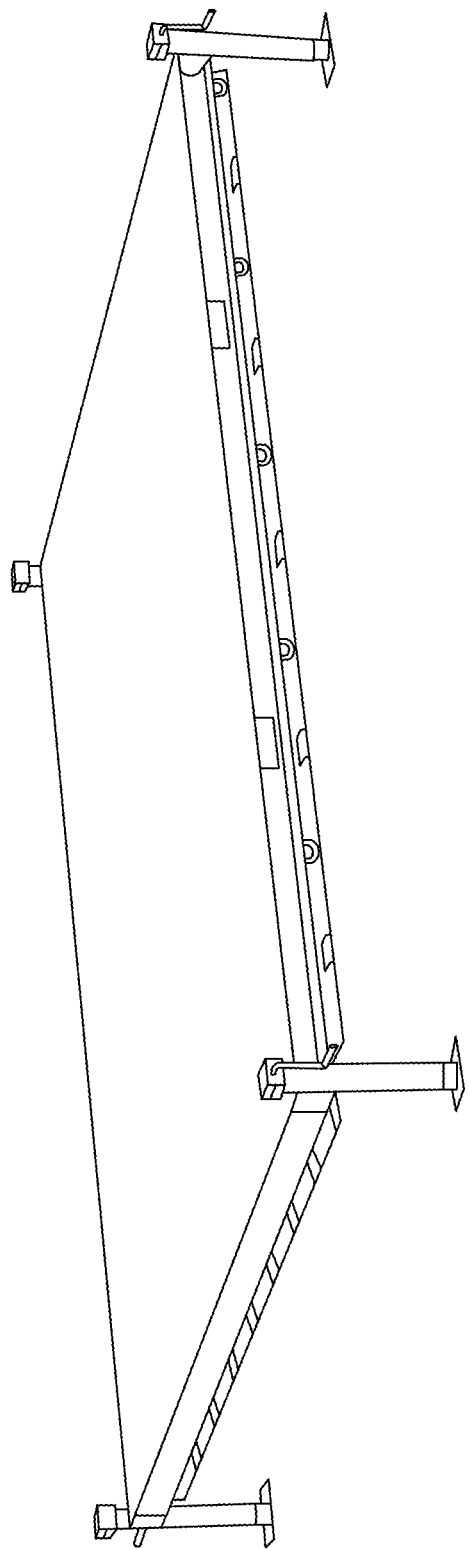
FIG. 32 is a depiction of a platform upon which an MLU may be positioned or otherwise coupled.

Once deployed, as depicted in FIG. 32, the modules may be positioned on the terrain, in the air, or on water, and, in some instances, may be configured for being deployed on a platform that is configured to level the module regardless upon the terrain, such as where each corner or side of the platform includes a jack for adapting the module to uneven terrain. Particularly, each module may include a built in or separate logistics pallet, e.g., with leveling jacks, wheels, tow-points, and the like. In such an instance, the height may be adjustable such as from 2-12 inches, such as from 4 to 8 inches, including 6 inches, which may provide for a level alignment on uneven terrain. Hence, the modules may be operational from ground, e.g., while deployed, but also while on a transportation platform, such as on a trailer and/or delivery conveyance, such as on or within a shipping container, e.g., a standard 20-40-foot industrial shipping container, or in the cargo haul of a specially designed plane or ship.

In another aspect, provided herein is a lightweight assembly modular rack system, referenced herein as a POD. The PODS described herein are configured as modular sensing, processing, and/or communications hubs. The PODS provide a platform for interchangeability of data collectors, e.g., sensors, communications equipment, e.g., radios, and/or analytics devices, such as one or more processing units. Accordingly, a useful feature of the present methods and devices is that using the modular communications systems with their ubiquitous data collection mechanisms, their methods of use can be configured as un-manned or manned data collectors that are configured for easily being deployed and used to collect data in a more efficient manner, requiring less bandwidth and resources, and being capable of communicating one with another regardless of any one particular, specialized radio unit.

For instance, in one implementation, a modular, pod-mounted communications system is provided. Specifically, installation, certification and isolation of radio antenna apertures has traditionally been one of the most difficult and costly aircraft integration issues. Consequently, the present pod-mounted radio communications and networking systems greatly reduce aircraft integration efforts, A-kit requirements, and reconfiguration timelines.

Particularly, in one exemplary use model, the POD may be configured and deployed as a communications relay, or node, for a mesh network of communications and data transfer, as described in detail above. For instance, as can be seen with respect to FIG. 33, the POD may be constructed as a housing 20 having a cavity within which one or more sensor and/or radio and/or processing elements 29 may be positioned. As described herein the POD structure may have a skeletal infrastructure 25 that may be composed of a metal, a metallic alloy, a composite, such as a polycarbonate, and the like. The framework 25 may have reconfigurable compartment members 27 that may be adaptable such that it can easily be configured and reconfigured depending on the mission particulars as to how the POD will be used, and what electronic components will be necessary to perform and carry out those mission particulars. Hence, the skeletal framework 25 is re-sizable, and thus can be organized to fit one or more communications and/or processing units 29, such as a GPS unit, one or more radios, other transceivers, one or more CPUs, GPUs, and the like.

Likewise, because the framework 25 is scalable, the POD housing 20 may also be made scalable, such as based on the components it is to house and the use to which it is to be put. In various instances, the POD may be configured for being aerodynamic, and thus, may have rounded or conical end portions. Particularly, the POD may be configured for being fitted to a warplane, such as underneath the body or wing of a fighter jet, e.g., B-52 bomber, AWACS, or other aircraft, such as a reconnaissance or even a commercial airplane, but can also be positioned on the top or side of the plane, or on any other vehicle, such as through the proprietary connectors described herein.

Figure 34:
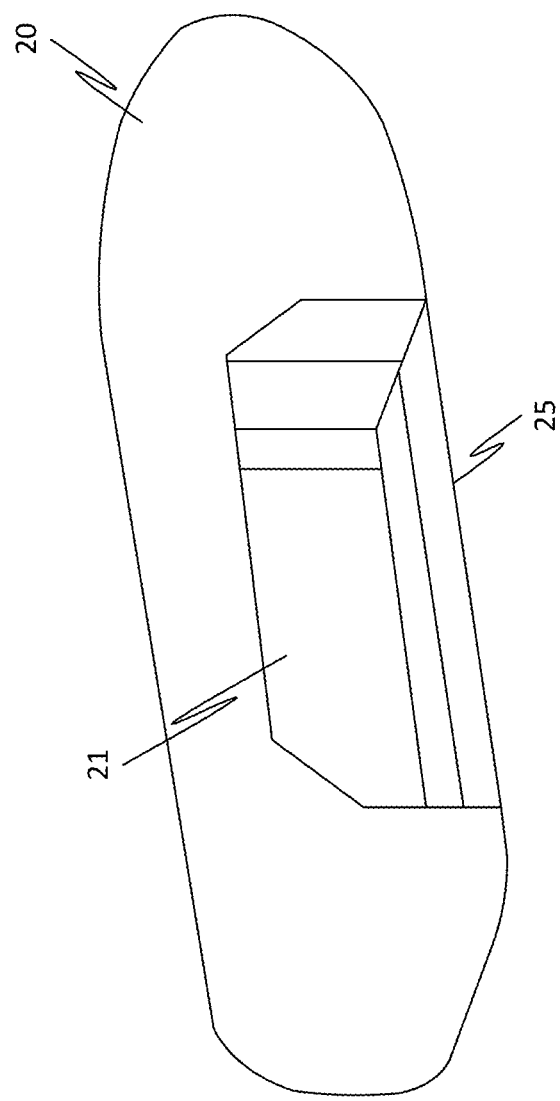
FIG. 34 is a depiction of the partially built out POD of FIG. 33.
Figure 35:
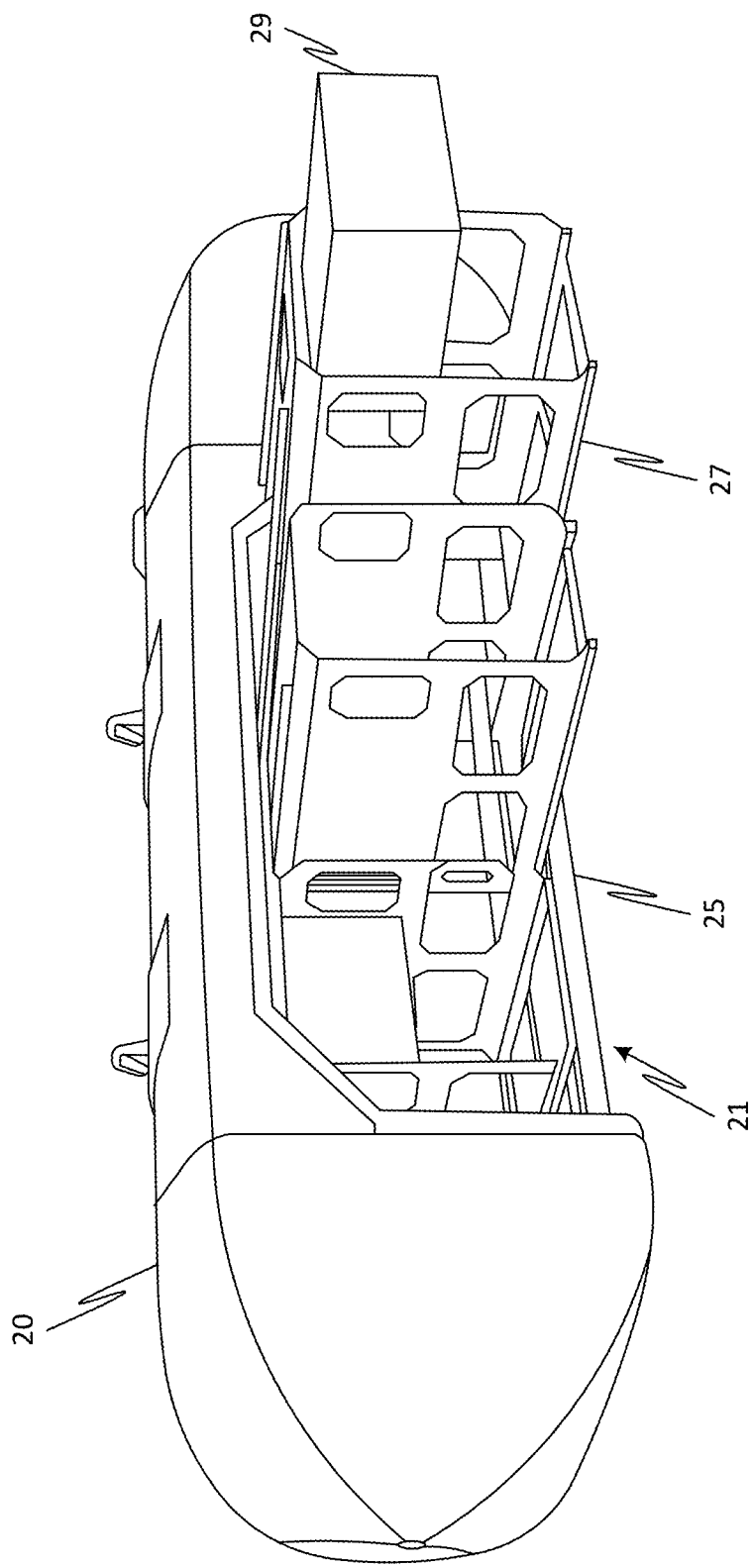
FIG. 35 is a depiction of the partially built out POD of FIG. 34, having an electronic component being inserted therein.

In various instances, as can be seen with respect to FIGS. 34 and 35, the skeletal framework 25 may be formed as a modular rack system 27 that can be adapted for retaining the uniquely configured sensing and communication systems 29 of the disclosure so that the components can easily be swapped out and exchanged with one another, such as in a mission dependent manner. These systems and the components that make up the systems can be configured so as to be interchangeable in a manner to build out distinctive, customizable communicating and networking systems. In a manner such as this, each POD may be configured and reconfigured as necessary to meet the sensing, collecting, communications, analyses, and transmission needs of the system operators, without having to build out completely new aircraft per mission parameters. This is useful especially in situations where the built in communications units of the aircraft, or whatever conveyance to which the POD is attached, are designed to receive data and information, which can be communicated in one language, e.g., with a first set of signal characteristics, such as with respect to a pre-set modulation, frequency, wavelength, and standard and with a given encryption, where the POD may include the processing ability to interpret that data, re-configure it, and re-transmit it in another such language and with other different signal characteristics. Hence, the POD may include components for taking one set of signal characteristics and converting them into another set of signal characteristics, which may be in a different form, so as to better enable the mesh communications network to communicate with other communication recipients, such as foreign operators within an alliance of operators.

The fully outfitted POD, therefore, allows rapid sensing, attainment, analysis, and transference of sensed conditions and communications, such as between forward operators down range, and one or more mission oriented modular communications units, e.g., MLUs, and/or mission control centers, as described herein. It is noted that given the modular nature of both the MLUs and PODS described herein, their adaptable configurations allows for various components within each to be swapped in and out, and exchanged one for the other as needs require, such as where due to the nature of the theater into which a given MLU or POD is to be utilized, the components can be selected to have a particular focus, such as a collection, sensing, analyses, communications, and/or weapons focus, which can be easily and readily reconfigurable as needs and/or mission parameters change. In this manner, forward analytics and decision making can be pushed close to the edge of need, e.g., toward the heart of conflict resolution.

Such configuring with mission unique components and outfitting can be performed in a rapid manner, thus, allowing for edge-based command and control with communications capabilities anywhere in the world, in a plug and play manner, within a very short time frame. In various instances, the communications systems can be configured for encoding and decoding as well as translating communication forms from one to another depending on need. In particular instances, the PODS may be configured for being attached to or otherwise associated with commercial based conveyances, such as planes, e.g., commercial aircraft, trains, ships, vehicles, and the like.

Figure 33:
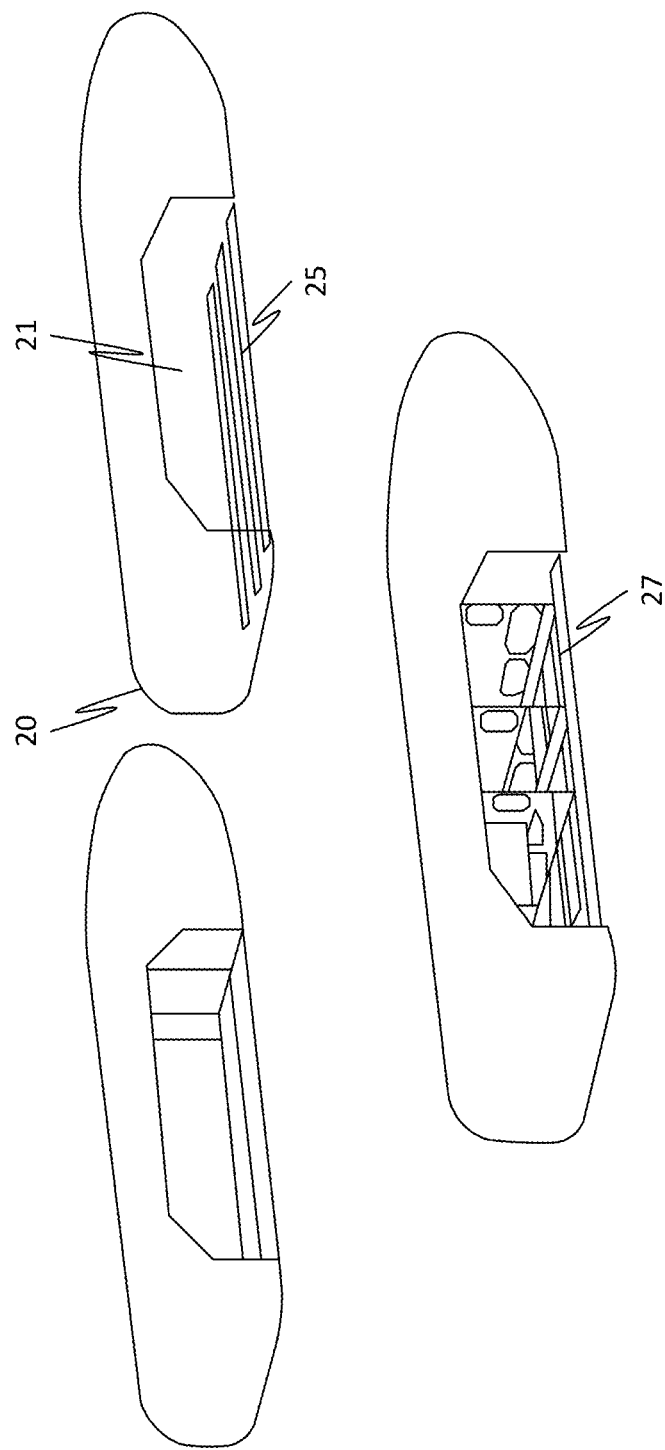
FIG. 33 is a depiction of a communications POD of the disclosure in various iterations of buildout.

As can be seen with respect to FIGS. 33, 34 and 35, the PODS may be of variable dimensionality and weight, dependent on the size of the components they are to carry, the conveyance to which they are to be attached, and the type of functionality they are to perform. The PODS may include an exterior housing 20 that boarders an expansive interior compartment or cavity 21 into which a skeletal rack system 25 may be fitted. The rack system 25 may be configured and reconfigured for retaining various different mission variable equipment 29, such as detection, collection, analytic, and communications equipment.

For instance, as can be seen with respect to FIG. 35, the housing shell 20 may be built first, e.g., dependent on the aerodynamic requirements of the carrying conveyance, or it may be built last, based on the size of the components required by the mission, such as where the racks 25 are assembled and then the housing panels 20 are associated therewith so as to complete the outer and inner shells of the housing. In such an instance, the housing shell may be a singular unit or may be comprised of a plurality of separate panels that are coupled to the skeletal infrastructure 25 that forms the interior portion 21 of the housing 20, such as on a panel by panel basis, where each outer panel may be added to a corresponding internal framework portion of the skeletal infrastructure, such as where the skeletal infrastructure further forms the internal equipment compartments, which may then be populated with the mission critical electronics. In various instances, the skeletal infrastructure that forms the rack system 25 may be generated in a uniform manner so as to be easily reconfigurable and interchangeable, such as with prefabricated pieces designed to retain specified equipment and communications components, such as where the components 29 can simply be fitted within a rack 25 and slid into place and/or swapped out by changing interlocking rack members, e.g., arm and leg brackets, and the side panels may then be added to form the shell.

As indicated, the components can be mission dependent and swapped in and out via a common rack structure. For instance, various mission dependent components may be exchanged based on the use to which the conveyance, e.g., airplane or other conveyance, containing the POD is to be put. This may be determined on a software defined model-based engineering process. For example, based on mission demands, the system software may determine the size of the POD and type of attachment and carriers that are required to perform the mission, such as by determining what components are needed to successfully carry out the mission, e.g., given the mission parameters.

The PODS may, therefore, be outfitted with a variety of different components such as sensors, data collectors, radios, transceivers, processors, signal processors, and the like, such that each POD can be specialized as a sensing, data collecting, analyzing, communicating, and/or fluid, e.g., air, oxygen, or fueling POD, or they may include a combination of components so as to be multi-functional. A multiplicity of PODS may be carried by a single conveyance and/or multiple conveyances such as to form a variable and configurable mesh communications network that can blanket a region in data collectors, analysis, and communication/transmission, and even analysis capabilities.

Once the POD configurations have been determined, the shell 20 and racks 25 can be fabricated, the housing assembled, and the components inserted 29. The PODS can then be attached to the specialized or commercial conveyance and be sent on their way to perform their selected and focused function. In this manner, the modular POD system may be coupled with the modular MLU system to create a mesh communication network that is fundamentally reconfigurable, rapidly deployable, and highly specialized so as to be arranged for swift information and communication acquisition, analysis, and transmission in a hostile environment that are always changing in a moment's notice.

Accordingly, in order to accommodate to an ever-changing need of demands, the present system has been configured to be adaptable in a manner to allow for rapid assembly, configuration, and reconfiguration. As can be seen with respect to FIG. 36 part of the assembly that makes this possible is the skeletal infrastructure of the rack system 25, e.g., the component harness, to which the various side panels can be attached to form the compartments within which the various components can be positioned. The skeletal infrastructure, for instance, can be assembled out of prefabricated parts, and sized based on the dimensions of the components needed, and the internal infrastructure can be built and sectioned to from modules or compartments into which the components can be inserted, as set forth in FIG. 35.

Figure 36:
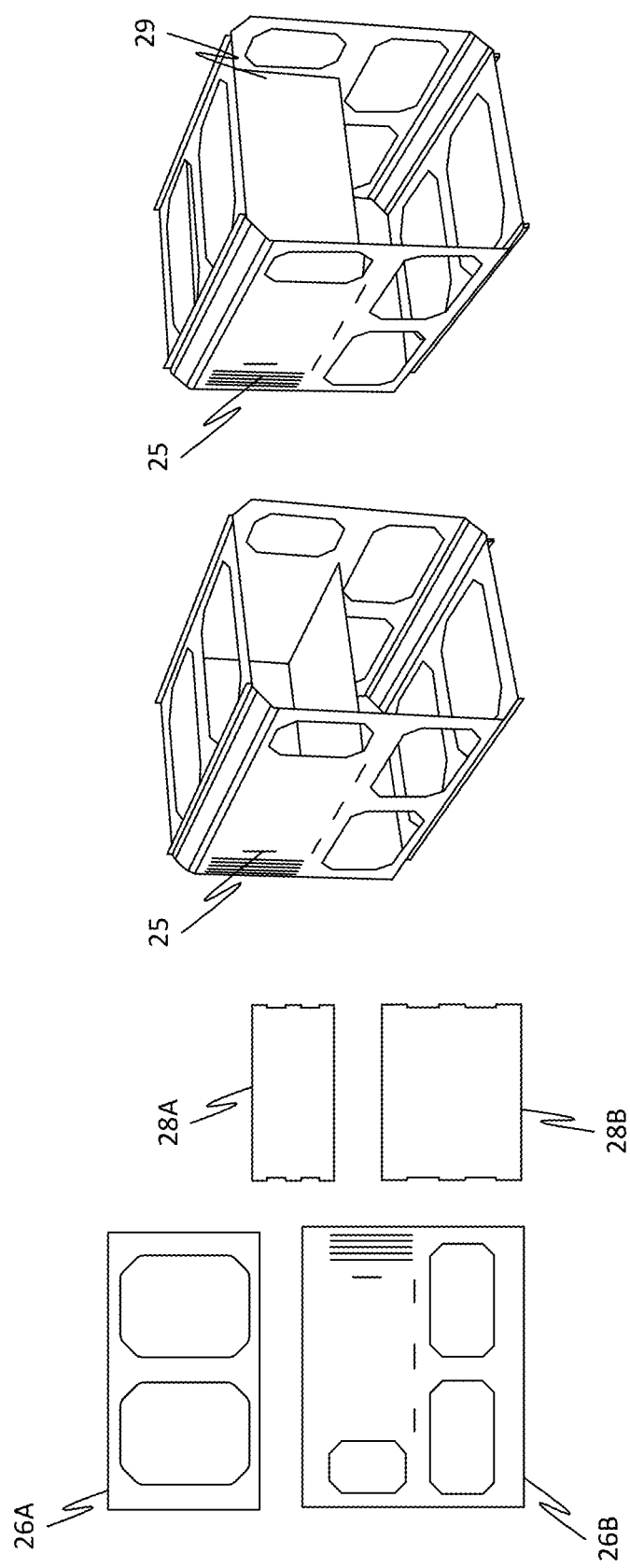
FIG. 36 is a depiction of a framework architecture for use in a POD of the disclosure, where the framework architecture is in various stages of build out.

Particularly, with respect to FIG. 36, in certain embodiments, the skeletal framework 25 may be composed of boundary members 26 and 28 that themselves are composed of boundary segments that are moveable in relationship to one another much like as described with reference to the MLUs of FIGS. 13 and 14. Thus, in certain embodiments, the POD can be assembled in like manner as to the MLU, but on a much smaller scale. Hence, in particularly exemplary embodiments, the POD may be formed of an internal skeletal framework 25 and may include a first set of opposed extended bounding members 26a and 26b that may be coupled to a second set of opposed extended bounding member 28a and 28b to form the skeletal framework 25. More particularly, the skeletal framework 25 defines an interior space and an exterior space, such as when the extended boundary members 26a and 26b and the extended boundary members 28a and 28b are coupled together as depicted in FIG. 36.

Specifically, the skeletal framework may be composed of or otherwise include a plurality of side panels 26a and 26b, such as where the side panels 26a and 26b are positioned so as to be opposed and offset from one another by a distance determined by the length of the opposed side panels 28a and 28b. More specifically, the skeletal framework 25 may be configured to form two or more, e.g., 3, adjacent compartments as depicted in FIG. 35, in this instance, including three side by side compartments. As depicted in FIG. 35 the three side by side compartments are composed of the same skeletal framework, and are sized to interchangeably receive an electronic component therein. However, in other embodiments, any number of compartments may be outlined by the skeletal framework, including 1, 2, 3, 4, 5, 10 or more.

Hence, in various instances, the skeletal framework 25 may be configured for providing a structure for the POD unit, as depicted in FIG. 34. Additionally, as depicted in FIG. 34, this skeletal framework 25 may include interfaces for receiving or otherwise being coupled with wall panels so as to entirely enclose the POD unit, once fitted and built out with the required electronic components. In particular instances, the skeletal framework 20, is capable of being increased in length and/or width, and thus, the POD itself, can be extended or retracted both longitudinally and latitudinally, e.g., in length and width, such as depending on the number and type of components it is to carry.

More specifically, together the side boundary panels 26a, 26b, 28a and 28b are configured to be coupled together to make the basic internal framework of the POD and to define a receptacle into which an electronic component may be fitted. In various instances, a back-side panel and a front side panel may also be included. Together, the four side panels, which may further include a back-side panel may create a receptacle boundary that is adapted for receiving at least one electronic component. Additionally, the internal framework 25 may include POD panel interfaces so as to be capable of receiving exterior interchangeable wall panels so as to form the outer boundary of the POD and enclose the interior of the POD from the exterior environment. In such an instance, the size of the wall panel is determined by the size of the various boundary members, and thus, may be larger or smaller. In such an instance, the at least one interchangeable wall unit is configured to join, or otherwise be coupled with the receptacle boundary in a manner so as to at least partially enclose the housing thereby separating the interior space from an exterior space.

A unique feature of the POD is that in some embodiments, the interior space defines an internal area, such as depicted in FIG. 34, that is variable, such as where the housing is adjustable in a manner where the internal area may be increased or decreased. For instance, the POD unit may be of variable size and may be collapsible, such as where the internal skeletal structure 25, as well as the side wall members are extendable and/or collapsible, or of preset variable sizes that can be mixed and matched. Specifically, in specific embodiments, internal skeletal boundary members 26 and 28 are configured for being lengthened, shortened, or bent thereby increasing or decreasing the framework and thereby increasing or decreasing the internal area.

More specifically, the components of the POD unit 20 may be configured so as to be extendable or collapsible in a variety of different manners. For example, one or more of the opposed boundary members 26 and 28 may include a plurality of segments that are configured for collapsing in on one another, such as by being bent or by having internal cavities that are of different sizes (areas), such that one segment is capable of translating with respect to the other longitudinally, e.g., telescopically. In particular instances, one or more of the opposed boundary members 26 and 28 include a plurality of segments that are configured for rotating and/or pivoting with respect to one another in a manner so as to increase or decrease the area of the POD unit 20. More particularly, in particular embodiments, the plurality of segments may be coupled one with another by a hinge member, such as a hinge member that is configured for allowing one or more of the plurality of segments to pivot with respect to one another in one or more of an X, Y, or Z plane. In certain instances, the hinge member may be configured for ratcheting, such as in accordance with a defined arc or preset degree of an angle such as from 1 or 2 or 5 degrees up to about 180 degrees, including about 10 or 20 or even 30 degrees to about 120, 140, or even 160 degrees in a positive or negative direction, for instance, from about 45 or 60 degrees to about 90 or 100 or 110 degrees.

As indicated, skeletal framework boundary members 26 and 28 may be composed of segments that may be coupled together so as to form 90 degree angles with respect to one another, but other angles are also possible such from 45 to 120 degrees with respect to one another, more or less, such as where the boundary members, and/or segments thereof, are joined by a hinge member. In certain instances, the boundary members form a square boundary outline that includes a plurality of offset side members, where each side member 26a, 26b, 28a, and 28b, is normal to its adjacent side, such as where side 26a is coupled to side 26b, but is normal therewith, but opposed to side 26b, and likewise side 28a is in opposed relationship to side 28b.

Likewise, as indicated, in various instances, the boundary members 26 and 28 may be composed of segments that may be configured so as to be lengthened or shortened in a manner to increase or decrease the distance by which the opposed boundary members are separated from one another. In such an instance, the length and/or width of the skeletal framework, e.g., the skeletal outline bounding member, of the POD unit 20 may vary. For instance, in various embodiments, the boundary members may be composed of 2, 3, or 4 (or more) bonding segments, where at least one, or one set, of opposed bounding segments are offset from one another by one or more of a third and/or fourth bounding segments, where, in some embodiments, one or more of the bounding segments is configured for being extended or retracted, e.g., in length. For example, in one embodiment, the skeletal framework may be composed of at least two sets of opposed bounding segments that form squares, which squares form the side by side skeletal outline bounding members of FIG. 33.

In such an instance, the squares of formed by the various the bounding members may be coupled together at their corners by 2, 3, or 4 extended joining members, such that the skeletal framework forms a cube. In certain instances, one or more, e.g., each of the bounding members may be composed of bounding segments that translate one with respect to another, e.g., telescopically, such that their lengths may vary independently from one another or collectively, such that the interior area of the cube may be increased or decreased in an X, Y, or Z plane. In certain instances, various of the bounding members may be coupled together by one or more hinge members that are configured for allowing one or more of the plurality of segments to pivot with respect to one another in one or more of an X, Y, or Z plane. In certain instances, the skeletal framework may further include extendable electronic component receiving members that extend outwards for receiving the electronic component but then can be retracted when the electronic component is loaded and pushed back into the cavity of the POD structure 20.

More particularly, a software defined model-based engineering platform, as described herein, may be employed by the system for determining the shape and size of the assembly racks as well as the shape and size of the PODS into which they may be inserted, which assembly can also be used in a MLU for the same purposes. As discussed herein, the configuration and ratios of the entire assembly can be determined based on mission objectives, which determine the various components needing to be employed, which in turn informs the size and shape of the MLUs and PODS to be used. Hence, the various mission platforms can be rapidly sized, configured, and assembled, based on the determined objectives to be achieved.

Specifically, as depicted in FIG. 36, the elements of the assembly infrastructure are provided and shown as individual panels that can be cut or pre-cut in a manner that allows them to be rapidly fit together so as to form the infrastructure assembly, such as by being bonded and cured, glued, and welded together, or otherwise coupled together, e.g., with rivets, screws, latches, and the like. During the assembly process, the panels may be selected so as to form compartments sized to fit the desired components to be inserted into the assembly, and once assembled the electronic components can be inserted and coupled to the assembly. Hence, in this manner, the various assemblies and the POD itself can be designed, shaped, and configured based on the size and shape of the electronic components, e.g., sensors, data collectors, signal generators, communicators, and the like, it is to house.

For instance, as can be seen with respect to FIG. 36, the software of the system can 3-D model the various prefabricated and labeled panels, framework components, and electronics, based on predetermined measurements, such that upon assembly, the correct components can be identified, e.g., by scanning associated labels. The communications POD elements can then be fitted together and corresponding parts, as designated by the results of the scanning, e.g., presented at a display screen for displaying how the assembly should occur, can be assembled one with the other so as to fabricate and assemble the POD, in view of the visual instructions. Hence, in a manner such as this, the assembly can be constructed, first by assembling the infrastructure and then by adding the panels, and finally by inserting the components. Once assembled, the POD can be assigned to a particularized aircraft for use.

A variety of materials can be used during the fabrication process, such as steel, aluminum, carbon-fiber, and the like that can be laser cut and bonded or wielded together. In particular instances, the various parts to be assembled can be classified, labeled, and stored, e.g., for particularized assembly, or the assembly can be prebuilt and stored prior to use, such that only the components need be added prior to attachment to a designated conveyance for use. As such, there may be a variety of POD units that are prebuilt and ready for use, such as 1) Models:
   a) Agile Pod 26—AFRL 26" pod system b) Agil Pod 30—AFRL 30" pod system
c) B52 UTL—In development
d) Livewire RT1, RT9—In development A POD type may be assembled or prebuilt to be employed as an analytics POD, which may include a plurality, e.g., rack, of processors, such as a server rack. What processing equipment is to be employed may also be defined by the needs of the mission and Service. A further POD type may be assembled as a data collection POD, which POD may include a variety of sensors and data collectors, e.g., dependent on the mission parameters, such as electronic surveillance measures, synthetic aperture radar, and LIDAR.

Figure 37:
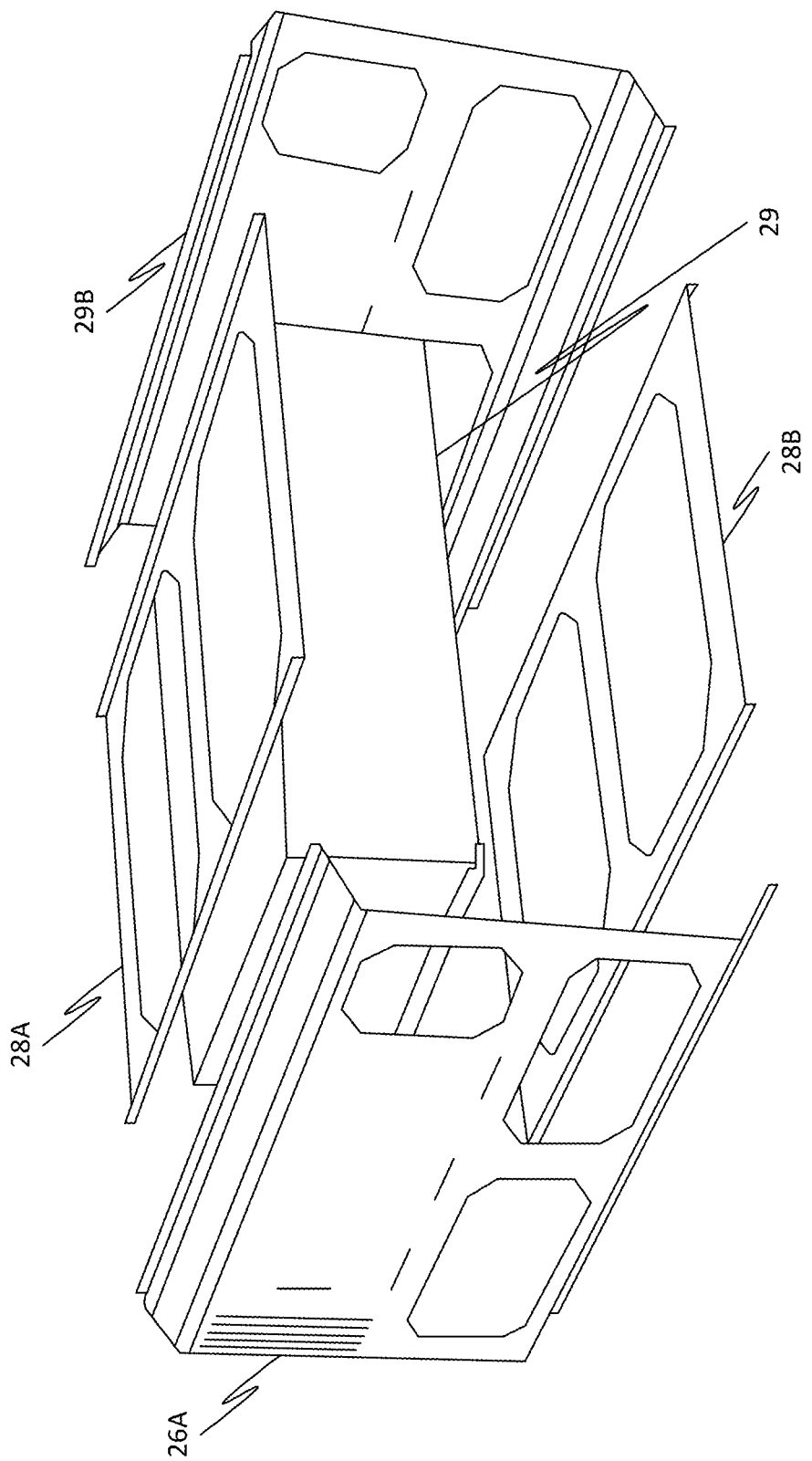
FIG. 37 is a depiction of the POD framework architecture in partial build out, along with an electronic component.

Hence, as can be seen with respect to FIGS. 36-37 the skeletal POD architecture may include a component module assembly into which assembly various different components can be inserted, and which assembly may then be inserted into skeletal architecture. In this manner the various POD infrastructures can be used to retain a variety of electronic components, such as by swapping them in and out of the skeletal architecture. These POD based communications units, when assembled to a variety of conveyances to be positioned within a defined region allow for a fluid mesh communication network that is itself highly configurable, and can be rapidly configured, outfitted, and deployed anywhere in the world, within hours.

Figure 3:
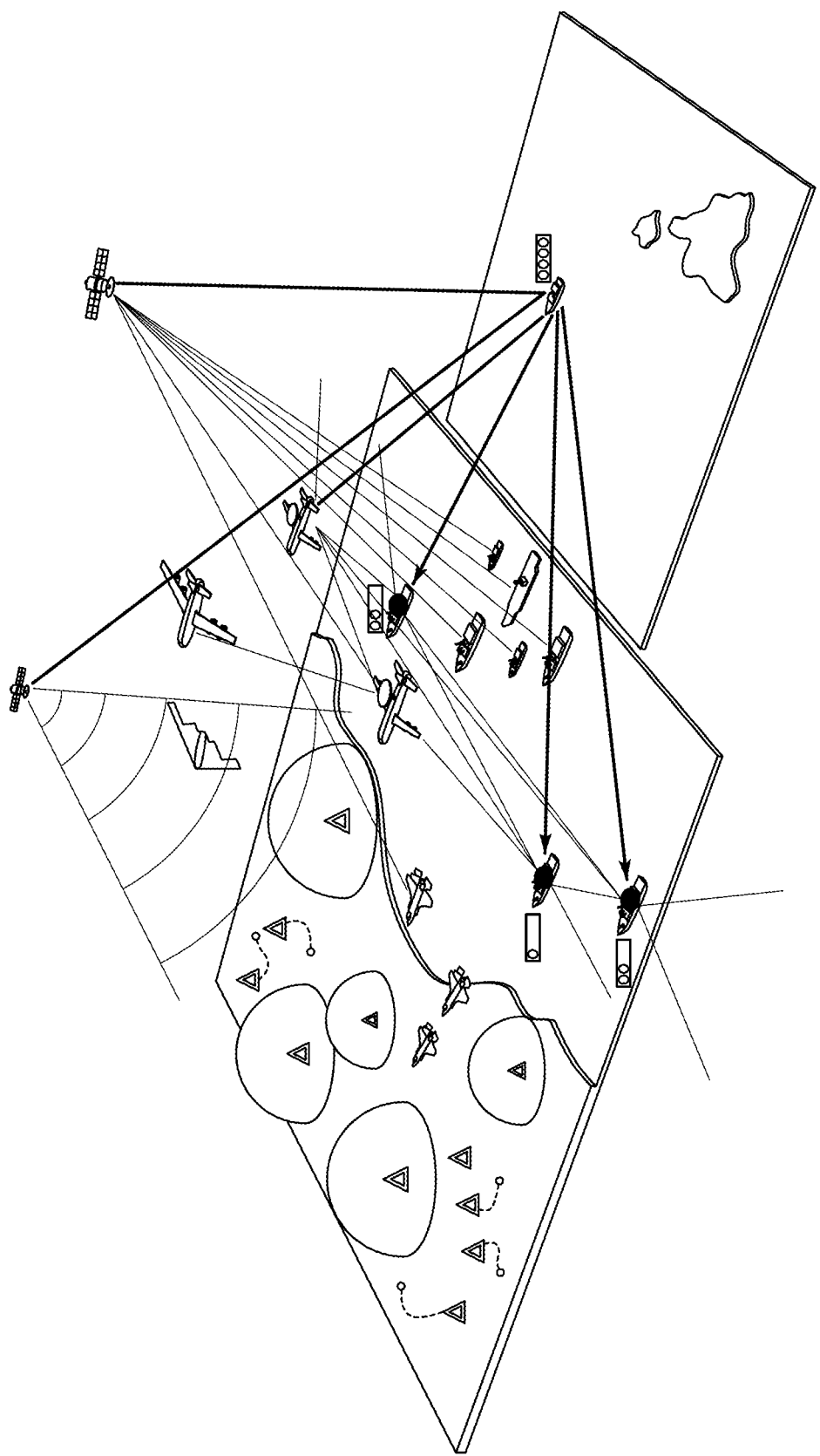
FIG. 3 is a representation of a C2 flexible, far-ranging, redundant, data collection and communications web overlaying a theater in conflict, where the C2 web is composed of multiple platforms with MMS installed and operating and the resilient JALN communication architecture in place.
Figure 38:
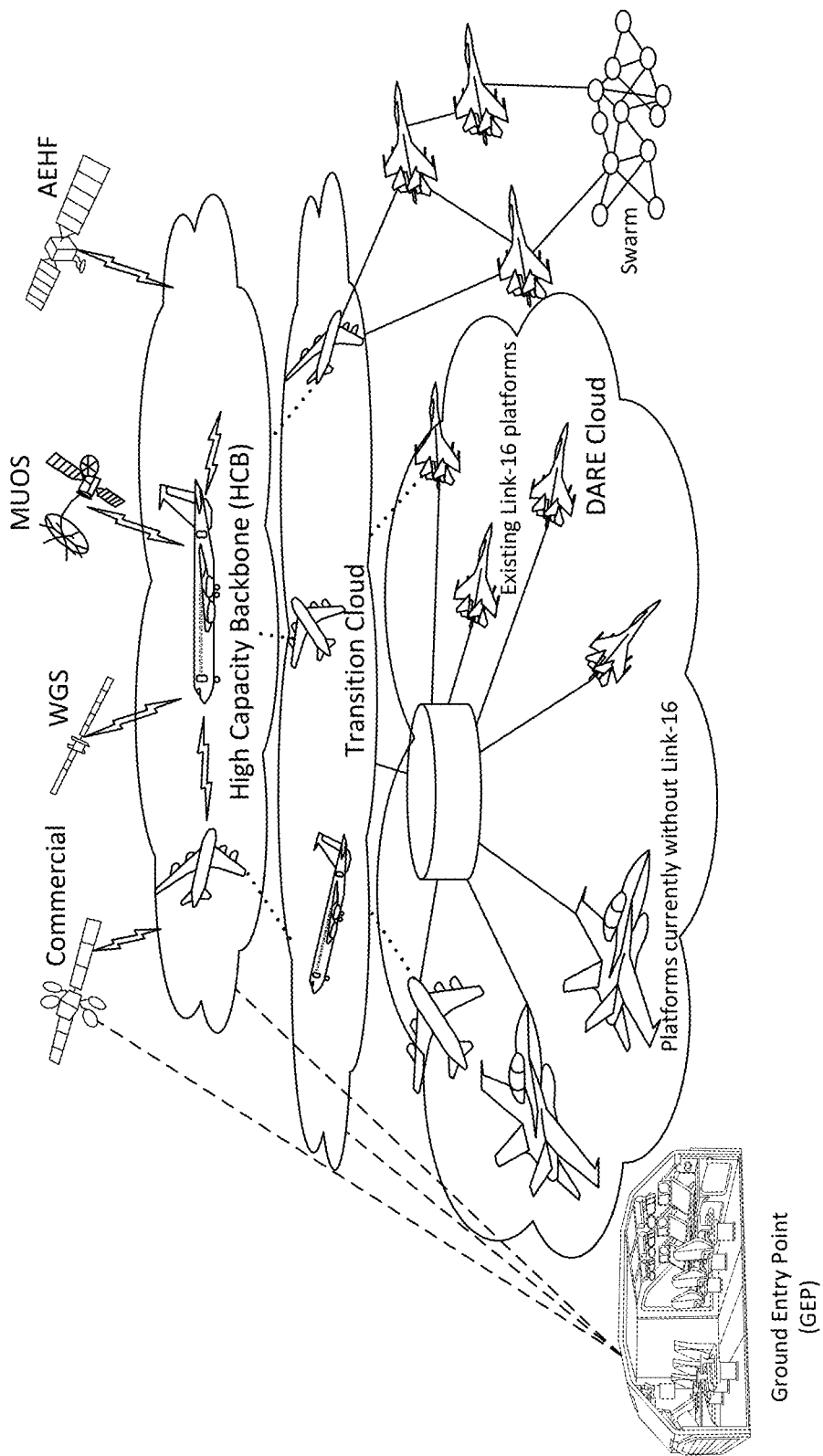
FIG. 38 depicts an exemplary use model for the POD communication and conveyance systems set forth herein.

For instance, as depicted in FIG. 38, an exemplary use model for the POD communication and conveyance systems set forth herein is to provide a flexible mesh communications network that covers a large distance, such as by blanketing a field of potential conflict with cloud based communication MLUs and PODS that are attached to a variety of different types of vehicles, e.g., military and/or commercial conveyances, such as airplanes, that span across hundreds to thousands of miles, by tens upon tens of aircrafts and/or ships or ground units. Typically, these vast number of different aircraft, vessels, and vehicles, outside of being coupled to the data collecting and communications MLUs and/or PODs disclosed herein, wouldn't typically be able to communicate one with another because of their use of a variety of different communication protocols, e.g., they would typically use different communication platforms employing different languages. For instance, for transmitting communications, these planes would typically send their communications up through a satellite, the satellite would then translate and process the data, and then would send the communications back down to one of the other planes and/or to SATCOM for cross communication therewith, such as through the intermediary of the satellite, as depicted in FIG. 3.

Specifically, because various different types of planes, utilized by different types of operational forces, employ different radios, transmitters, and communication modalities, such planes would otherwise not be able to communicate with one another. More specifically, because the conveyances are formatted with different radios and transmitters, and are run by different communication platforms, sending different codes and propagating different signals, without the present POD and/or MLU based infrastructure, having a variety of different communication modalities, the conveyances would otherwise not be able to directly communicate one with the other. However, as depicted in FIG. 3, with the present MLU and POD communication system, each communication plane, and the vehicles that inhabit them, e.g., airplanes, etc., can now communicate one with the other regardless of the various radios they carry and despite the communication protocols they employ.

Particularly, as depicted in FIG. 38, an area in potential conflict can be divided into communications at a DARE level, is provided and configured as a data collection plane. In such an instance, the data plane may be inhabited by a plurality of data collection conveyances, all of which include one or more MLU or POD based communications unit, that is configured for blanketing a region in data collectors for collecting data about the region, the operators positioned therein, and the operations taking place.

This data may then be transmitted to a second, transition plane, that is itself inhabited by a set of data collectors and communication units, that may also include one or more computing architectures, which can perform analytics and routing on the collected data, which can then be transmitted to one or more control planes, such as implementing a high-capacity backbone (HCB), that can be employed in directing functionalities of the transition and data collection planes. In various instances, the control plane can include a variety of communication exchange units functioning on a HCB that includes typical airplanes, data collecting balloons and drones, as well as satellites, and the like. In particular instances, the communication blanket may include a variety of both PODS and MLUs.

In this manner, even despite each one of the different communication modalities and platforms, the PODS act like a cell phone tower capable of receiving, interpreting, amplifying, and re-transmitting received signals, coded messaging, and data. In such an instance, there could be a transition plane that includes dozens to hundreds or even thousands of other conveyances, e.g., aircrafts, ships, MLUs and PODS, all communicating within a defined region. Hence, without the PODS these divergent elements might not be able to connect and communicate with one another. However, because of the PODS they are now able to mesh together to form a communication cloud so as to be able to cross-communicate through this pod-based communications system. Such data can be sensed, collected, interpreted, aggregated, analyzed, and transmitted, e.g., via a HCB, in a forward manner, such as at the edge of conflict. In such instances, the mesh communication network can be formed from a mixture of MLUs and PODS that are attached to a variety of different conveyances and/or stationary units, such as aircraft, ships, submarines, trains, automotive, and modular mission units.

This mesh communications network provides a strategic communications lattice that is both function in the presence and in the absence of SATCOM communications. Thus, this communication platform is equipped so as to allow both land, sea, and air connectivity and move data around in a similar fashion as if they had satellite communication connectivity. Hence, the present systems provide for a dynamic communications network to be established, where the network components are capable of rapidly changing based on signal strength and connectivity through a variety of changing connections over time despite regional topographic differences and distance.

Particularly, as the different conveyances travel throughout space and communications connectivity changes over distance and time, the mesh network can also be changed based on strength and coherency of signal. In such an instance, the elements that form the mesh network are constantly changing over time in a predictable manner, such that the system can determine and select which elements to include or not include, e.g., in the network, how to amplify the signals, and determine in which form and format to transmit the signals from one node to another.

These various communication platforms can be configured for use in unique, defined tactical missions, in a manner so as to improve the movement of tactical communications, information, and other data between the various MLUs and PODS, e.g., aircrafts, ships, and other conveyances to which the PODS and/or MLUs may be associated and/or with SATCOM, so as to push strategic decision making closer to the region of conflict. For instance, these configurations may be arranged for direct or indirect engagement with conflict such as on the edge, or may be arranged so as to play a more logistical support role in any engagements, such as with regard to enhancing troop movements, reconnaissance, and/or strategy formation. Particularly, a suitably configured analytics unit, e.g., an AI component, of the system can analyze mission objectives, available assets within the arena, including available MLUs, PODS, and the equipment they carry, and can determine how best to deploy them in the arena so as to most efficiently achieve the mission objectives.

In such a manner as this, the system may determine how to configure the MLUs and PODS, determine what components they will carry, how they will be positioned and staffed, and how they will be deployed and for what purpose. In this way, the mesh communications network may be stitched together by using each one of these assets as a node in a constellation of data collectors showing how the assets can be placed, or otherwise positioned, so as to both collect and analyze data real-time, thereby pushing operational command closer and closer to the edge of where deployment meets conflict, so as to reduce the time from informed decision making to direct strategic implementation. Hence, the MLUs and PODS of the system allow for the unique ability to push decision making to the edge, which can be uniquely assembled and configured based on the needs of the operational parameters required by the various mission objectives, such as where various of the assets are brought online and taken offline through ever changing connectivity patterns, as needs require, rapidly, moment by moment, so as to effectively keep up with the necessities of data sensing, collection, and analysis, regardless of the ever changing circumstances of the theater of potential conflict.

For example, in use a POD may be fabricated and assembled, and coupled to an airplane, so as to provide an automated communication and translation system that can be deployed in a data collection or control plane of the system for seamless data exchanges, e.g., on a tactical network. For instance, in various instances, the various PODS provide for a radio independent network of capable readily repositionable nodes. In such an instance, the system may provide a plurality of specialized network centric links that form nodes in a constellation of nodes, all of which include a variety of radios and transceivers that can then communicate with one another regardless of the communications protocol, such as CDL (common data link network), therefore making the communications network dynamically and remotely configurable. Hence, not only can the nodes communicate using a CDL link, they can also receive specialized data from specialized radios (radio and network parameter knowledge), translate the data, reconfigure it, and re-transmit it to determined recipients via other communications protocols, such as CDL, Link-16, TTNT, and/or other message/data exchange links.

Thus, regardless of the terrestrial topology, data and communications can be exchanged through a variety of nodes forming the communication web dependent on the position and navigation data of the underlying conveyance, e.g., airplanes. The PODS and MLUs of the system may also include one or more, e.g., several antennas, that can be configured and positioned as needed to create, establish, and maintain the meshed communication networks, whereby any given conveyance can be added or dropped as nodes, e.g., based on positioning, tuning of the antennas, and signals they are capable of receiving, the various connections they can make, and the data and specific communications they are authorized to receive, translate, and transmit. Accordingly, in this regard, the PODS may be configured to retain a variety of radios, transceivers, amplifiers, and antennas to receive and translate data from a large number of sources communicating at different frequencies and with different transmission qualities and characteristics.

Having such antennas and radios being positioned within the POD framework is useful, in part, because it avoids interference by the various different portions of the plane, such as the fuselage when typically positioned on the top of the plane. As indicated these PODs, the radios they carry, and the communications they take part in can be part of a data collection and/or a control plane that serve different purposes in the mesh communications network. In this manner the various conveyances that carry the PODS and/or MLUs disclosed herein, can define and determine the functional support level to which their functions are to be put to use, such as in various tactical frameworks.

Hence, any given POD or MLU carrying conveyance can be made to be discoverable by the communications control management software and be brought into or dropped from a communications linkage as determined would be best for maintaining patency of a communications network. Therefore, the constellation of communications nodes is ever evolving real time so as to adapt to the needs of the communications system, whereby new nodes may be discovered, new nodes may be needed and added, old nodes may be dropped, and inactive nodes can be activated, such as based on determined strength of signal and node linkage capability and functionality, such as based on the various platform characteristics, needed versus included antenna and/or router patterns, and/or airframe profiles. Hence, in these regards, the system may include a data link management system that functions to determine the composition of the mesh communications network and which nodes to bring on and when.

Specifically, the data link management system may be configured to initialize and operate the various net gateway equipment so as to build and configure the network, including radios, routers, switches, antennas, and processors that form the various communications links, regardless of the changes in position due to the conveyances, such as based on determined navigation data and/or determined direction of travel, e.g., comparing flights plans to actual GPS data, all of which together support real-time messaging processing. Consequently, the DLMS may configure and set up both a control plane, transition plane, and a data plane employing different assets so as to accomplish various tactical needs of an evolving situation that may be in conflict.

For instance, in one embodiment, a control plane may be organized, such as where the control plane is configured for performing four different, major functions for seamless communications and data exchanges, such as on a tactical network. As indicated, in particular embodiments, the control (including a transition and/or a data) plane of the communications network may be a radio independent instantiation of a CDL network management that can employ a variety of different radios, Link-16, TTNT, etc. Accordingly, the control plane may be a radio independent instantiation that may include a CDL Network Management unit that implements four functions that allow network capable nodes and resources to be dynamically and remotely configurable. For example, the control plane management system may determine what assets will and won't be included in the mesh network, e.g., organization and membership in the various different plane domains, which may include discovering, adding, and removing nodes, as needs be.

The control plane management system, therefore, determines what is in the network, and dynamically adapts the network when some asset moves out of the network, e.g., an airplane lands or is taken offline, and when some asset is available to be included in the plane, such as when a POD enabled plane or ship or vehicle moves into the plane. The POD communication technology and software enables any conveyance with a POD or MLU and associated software to be made available as part of a network and/or gateway of communicators such that they may be controlled by the control management directing it to form part of which gateway and which network of which system, and who will be the peer group leader and who the subservient in the chain. In this manner, a dynamic web of communications is organized and one or more peer group leaders having priority of communication can be selected and used to direct other downward nodes. One or more subservient nodes can also be selected.

Specifically, the management system may determine a peer group leader (PGL), election of assets, as well as loss detection, and can respond to the direction of travel based on the navigational profile of the included assets. The network management system of the control plane, therefore, can determine the topology of the mesh network, such as based on node capability, linkage understanding, and radio and network parameter knowledge, so as to develop a platform of strong and secure communications that is constantly maximizing signal strength based on radio composition, antenna patterns, as well as shadowing and airframe profiles. In order to perform these tasks, the control plane may access the navigational data, directional details, and/or flight plans of the nodes that may be or become part of the mesh network, so as to track the movement of nodes, e.g., assets, as they change and/or exchange positions throughout the topology as node links are created and broken and/or based on antenna positioning, e.g., point to point connectivity, so as to detect and predict antenna disruption so as to avoid any breakdown in communication by generating new travel or flight patterns so as to ensure signal strength and avoid communication disruption due to broken links.

For instance, one or more of the processors of the system, can access an artificial intelligence module of the system, whereby a selection, e.g., all, of the assets of the network, their build out, and their travel plans can be accounted for, and using that information the various links in a communication gateway can be formed so as to determine the composition of the network at any given time based on actual or predicted navigational data. Therefore, the control plane leverages the position and navigation capabilities of the various different radios carried by the vehicles of network and can select which radios to employ in which contexts, such as CDL, Link-16, TTNT, or other specialty radios as the primary means for discovery, data collection, and message exchange.

As indicated, in various instances, the data link management control system (DLMS) may automatically create a data collection and/or control plane for the seamless exchange of communications and data on tactical networks, whereby communication links can be set up and communications exchanged, regardless of the radios employed, such as CDL, Link-16, TTNT, and the like. The DLMS can build the network gateway, grant or deny access to the network, and can control transmission of data and communications, can determine which assets to deploy for communications, and which vessels will serve as nodes and when, and for what form and types of communications. These nodes are flexible and feed into the data plane, which in turn feeds into the control plane, in such a manner that generate and promote the sharing of situational awareness between currently incompatible platforms, with a high emphasis on doing so in the most secure manner possible, while at the same time as identifying and leveraging assets so as to achieve mission objectives securely.

Accordingly, in one aspect, provided herein is a system for evaluating and determining how one or more communication conveyances can be outfitted with communication equipment and deployed in a field of potential conflict. In various embodiments, the system may include a first and a second client computing device, such as where each computing device has a display screen, such as an interactive touchscreen display. In particular embodiments, the client computing devices may include a downloadable application that is configured to run, or otherwise direct, one or more operations of the client computing device. For instance, the application may be adapted for generating a graphical user interface at the display of the client computing device, such as where the graphical user interface is configured for one or more of entering, retrieving, evaluating, and manipulating data.

Specifically, in various embodiments, the first and second client computing devices may be configured for receiving operational details, strategic parameters, and available mobile assets, as well as a list of available components by which to outfit the assets, e.g., conveyances, so as to meet the strategic parameters based on the operational details. In particular embodiments, the first client computer may be configured for determining whether a particular proposed strategic deployment involving the utilization of the assets will be sufficient to achieve the strategic goals. For instance, the system may include a server that includes one or more processing engines that are configured for retrieving instructions from an associated database, whereby the instructions direct the processing engine to evaluate the strategic goals with the operational details and to thereby determine the extent to which a proposed configuration of outfitted mobile assets will be sufficient to reach the strategic goals.

In such an instance, the server, or a system operator, may at first propose an initial deployment of assets, configured with a first set of communications units, and may assign the assets to one or more planes of a theater in potential conflict. In such an instance, one or more models may be run, whereby one or more predictions about an outcome may be made and/or tested. The results of the testing may then be displayed to the first or second client computing device. For instance, in one exemplary embodiment, the first client computing device may be used to enter mission details, objectives, goals, as well as the parameters and assets available by which to configure the deployment, and the results of the model may then be transmitted to the second client computing device for evaluation of an operator thereof. Once implemented, actual results data may be evaluated, and may be used to weight the various variables employed in generating the strategy, and based on the weighting, a new strategic deployment may be evaluated and/or proposed, e.g., by the system or its operators.

In various embodiments, the server system is configured for generating a graphical user interface that presents a dashboard workstation at the display of the first client computing device. In such an instance, an operator may utilize the dashboard interface to generate and/or configure a first instance of a proposed strategy. Likewise, the server may present the proposed strategy, such as for approval, to the second client computing device, whereby a second operator may evaluate the strategy and approve, disapprove, or make changes to the proposed strategy. Once approved, the system may then generate operational instructions for implementing the proposed strategy.

The system may also include one or more databases for storing mission parameters, such as location, geographic, and topological data covering the area, e.g., field, of interest. The database may also include a listing of assets available for use in carrying out the mission objectives, which assets may include the MLUs and PODS disclosed herein, as well as the conveyances, e.g., airplanes, ships, vehicles, etc., that are configured for carrying the assets. Such information may also include location or position information of the asset with respect to the geographical area of the field. The database may also include flight plans and routs of travel through the field, either terrestrially, over sea, or in the air. Additionally, the database may include a number of electronic components, including a number of sensors, radios, transceivers, processors, and the like, as well as their characteristics, use profiles, and a categorization of which assets can or do carry which electronic components. Mission parameters, objectives, and operator characteristics, such as identity, health and physical characteristics of the forward operators may additionally be stored in the database. In various embodiments, these various characteristics and conditions can all be parsed and classified into various categories, which categories may form libraries of content, and the content can serve as nodes in a structured and/or relational database. The database may also use such data to generate or otherwise detail instructions pertaining to the rules of engagement with respect to meeting mission objectives during deployment of the assets. In various instances, the one or more rules may be directed at facilitating the assessing and/or determining of whether the characterization and/or building out of the assets provided corresponds with the one or more mission objectives of a proposed stratagem and/or construction of a layered communication platform(s).

A server system may also be included. In such an instance, the server system may be in communication with one or more of the first and second client computing devices as well as the database, such as via a network connection. In particular instances, the server system may have one or more processing engines, such as where the processing engines may be configured for receiving, e.g., from the first client computing device, the mission parameter, objective data, as well as proposed strategy and deployment information. Other various condition data, such as environmental, weather, machine based, and/or operator health and condition data may also be entered into or otherwise collected by the system server.

The processing engines of the client server may then compare that data to the stored asset data, may weight the various data points, and propose an evaluation of the strategy, including a proposed build out and asset allocation, and/or run a model of how the proposed strategy may be implemented, and thereby provide a predicted result thereof, all of which can then be provided to the second client computing device for review and approval thereof. The server's processing engines may then receive approval and/ or authorization of the proposal and may then send control instructions via the communication web to a set of third client computing devices carried by the forward operators for the building of the communication web and the implementation of the strategy. As indicated, the system may be configured for generating a comprehensive deployment strategy, such as ab initio or from a previous system generated series of earlier run strategies, such as where the strategy may be based on the requirements of the various mission parameters, objectives, and characteristic and condition data.

The system may then track the process of implementing the strategy, including the tracking of which assets are carrying which assets and are deployed in what area for what purpose. The degree of success or failure of each particular asset in meeting their mission objectives can then be analyzed and compared with the collected sensed condition data so as to determine the degree of success or failure, to attribute that degree to the variables involved, and to weight the various variables for use in scoring objective and overall mission success. This scoring and weighting may then be employed by the system in generating and evaluating future mission parameters, objectives, proposed build outs, and deployment of assets. If data is inaccurate or missing, the inaccuracy may be flagged for required data entry.

More particularly, where a strategy succeeds or fails or a given part thereof succeeds or fails to perform to a predicted or otherwise expected level, or there is a missing data feature, the system, e.g., a suitably configured Artificial Intelligence (AI) module thereof, may be configured for searching a database of the system for previous strategic configurations and implementations and/or condition data entries that match the same or similar mission characteristics. The results of the strategic implementations between the missions can be compared and the variables thereof can be weighted one against the other, so as to determine elements critical of mission success or failure. Critical elements of success or failure can be identified and weighted and used in determining new build outs, new deployments, and new strategy implementations. Further, such critical elements can also be flagged for operator and/or managerial review.

Particularly, once generated, e.g., via the first computing device and/or server and/or approved by the second computing device, the strategy may be transmitted to forward operators for deployment and implementation. For instance, once generated and/or approved the strategy can be parsed into a series of instructions and transferred to and from the server, e.g., via the interactive dashboard, and may then be transmitted to those responsible for building out the various MLUs and PODS with the designated electronic components, as well as to the conveyance operators who are to direct the positioning of the MLUs and PODS within the field of engagement for implementing their part of the mission objectives. Results data may then be collected by the system and used for evaluating elements of success or failure.

More particularly, the strategy, once approved, may be broken down into a series of instructions. The instructions may direct how various assets are to be built out, what plane of the fluid communications web they are to occupy, what their direction and rate of travel is to be, what data they are to collect, and what operations they are to carry out. Critical elements of mission success can also be determined and used to evaluate mission performance for each asset. In this manner, the strategy may instruct the deployment of the nodes and how they will function, will evaluate their functioning in the prescribed manner, and will store the results thereof in the structured database.

Specifically, along with determining the instructions to be implemented, the system may generate rules by which the operations are to occur, and the degree to which performance corresponded to the determined rules can be evaluated and categorized. The elements of success and failure in these regards can then be weighted and scored and used to generate new strategies, which new strategies may include changes to component buildout composition and/or deployment configuration as well as changes to relevant operational parameters. Any conditions outside of the predictive parameters may be flagged for further breakdown and analysis so as to further identify critical elements of success, which may then be used to update the rules to be further generated. In such an instances, the structured database may include a rules library, which categorizes which rules should be applied in which situations, and where the database is a graphical database, such as a knowledge graph, the rules may dictate what weight various relationships between the data points in the graph are to be attributed, such as where the datapoints may include what assets are carrying which electronic components, as well as how they are deployed and in what conditions.

Consequently, the system may be configured for generating and/or receiving the rules, strategies, operational parameters, objectives, and procedures, and the like, e.g., from the control and/or managerial plane, and generating a set of instructions by which to implement and evaluate the proposed mission and its objectives given the environmental and other conditions of the theater of engagement. The system may further be configured for using those rules to make predictions regarding outcomes of the implementation of the instructions and determining if the conditions result of the implementation of the instructions meet the mission parameters and predicted results. The system may then determine if future strategies should be implemented or not, or changed, such as if the conditions precedent for receiving approval and success are present the strategy should be approved, and where such conditions are not present, they should be disapproved, and where disapproved, a reason for disapproval, e.g., which condition precedent is or is not present should be highlighted, and suggestions for correction can be suggested by the system.

Accordingly, in view of the above, the modular communications and analyses systems disclosed herein provides several useful benefits. For instance, an important feature of the present communications platform is that it is configured to facilitate the central planning and employing of a combination of joint and/or coalition forces, such as through a robust collection of intelligence data, rapid processing, exploiting and disseminating such collected data, so as to allow timely decisions to be made across entire theaters of conflict. However, as indicated above, there are a variety of adverse actors that will seek to disrupt such communications collection and dissemination platforms.

For example, there are several areas of potential disruption so as to dislocate and interrupt the efficient transmission of communications and data. Particularly, adverse actors are constantly seeking methods and devices for preventing access to information and data transfer, area denial capabilities, new weapons, including hypersonics, and capabilities to disrupt global communications and deny position, navigation, and timing. To overcome these potential threats, the modular technologies disclosed herein are configured to provide a distributed and survivable communications module that provides for large data collection, fusion, analytics, and transmission. Particularly, the present modules and systems provide for high performance processing and enhanced command and control (C2/C3/C4) capability in a forward environment, despite potentially coordinated attacks on these communications, navigation systems, and centralized communications analytics, e.g., managerial, facilities.

In order to overcome these threats, the technologies presented herein employ advanced, integrated applications providing breakthrough improvements in offensive and defensive operational level strategizing and planning that advances tactical level engagements, and is further suitable for forward basing and logistics operations, while protecting against adverse confrontations, such as employing hypersonic weaponries. Specifically, the presently disclosed technologies provide a meshed and networked command, control, communications, and computer (C4) technologies platform that provides a secured, multi-level, cloud computing framework that may be configured so as to be placed in a forward position and distributed. As discussed above, the Hyper C2/C3/C4 web includes a plurality of electronic components, such as radios, transceivers, radars, sensors, GPS devices, attended or unattended and sensors, as well as a network that is configured for interconnecting them all together. In various instances, one or more of the sensors may be configured as small unit level, very high quality, high-definition data collectors that have a communications module adapted for transmitting data in an efficient and regularly consistent manner so that data can be continuously collected and transmitted to the system for analysis.

More specifically, the C4 platform allows for intelligence surveillance recognizance (ISR) that may be implemented for battle management (C4ISRBM). A benefit of this forward and distributed communications platform is that it enhances the critical speed of decision making, especially with respect to time-critical targets, extends the reach of centralized C2/C3 command centers, such as, Maritime Operations Centers (MOC), Air and Space Operations Centers (AOC), Tactical Operations Center (TOC), and the like, and provides for multi-domain capabilities. A further benefit of the communications platform is that it is advanced, integrated, and in some instances may be autonomous, including an artificial intelligence analytics module that may include a machine learning driver as well as an inference engine, as explained below.

Accordingly, the C2 Web disclosed herein provides several benefits from the archaic communications infrastructure currently being deployed. For instance, a first benefit is that the technologies disclosed herein provide a platform as a service (PaaS). Particularly, the present platform as a system is founded upon a modular communications system that is integrated into the disclosed MLUs and PODS, their transportation and delivery instrumentalities, and the computing systems and data collectors, e.g., sensors, that form a frontline information modality.

Particularly, in addition to the communications sensors integrated into the disclosed MLUs and PODS, the system may include specially designed or commercial vehicles that have been configured for transporting the MLUs and PODS, which in some instances, may be fully useable in transport. For instance, the system may include one or more of planes, trains, trucks, ships, and automobiles that have been configured so as to be able to removably fit and transport the communications MLUs and PODS while in use over long distances and to remote engagements. More particularly, these transportation vehicles may have fuselages, hauls, or other containerized portions that are configured for being fit with one or more PODS for transport and can further unload and/or deploy the MLUs or PODS at a target site of use. In particular instances, the vehicles configured for use in transport may otherwise be used for private or other commercial uses until called upon for use in accordance with the present methods, whereby the pods may be positioned within the vehicle for transport.

In various embodiments, the modules may be ejected from the vehicle in transit and without the vehicle having to be stopped. In certain instances, the modules are capable of being used during any of these processes. In this manner, the system provides components that are not limited to a single mission, single purpose, and which are not otherwise useable for other uses while not being deployed. Particularly, the mode of transportation can be easily tailored to best accomplish delivery in the region in which the modules are to be operated. In particular embodiments, the transportation vehicle is an unmanned vehicle.

A further benefit is that because the MLUs and PODS are modular, moveable, and are associated with conveyances, and thus, can be positioned and repositioned throughout space. Hence, the communications platform is adaptable in a manner so as to generate a redundant mesh network of sensors and communication units that may be layered one on top of the other so as to blanket a region in a data collection and communications gateway. In this regard, the present devices, e.g., MLUs and PODS, and the systems formed of them, are configured for establishing a network of nodes of sensor units and communication components that are adapted to bring together vast amounts of tactical data from the plethora of sensor units provided by the distributed modules, aircraft, ground, and maritime units.

Particularly, the transportable and forward deployable modules may include and/or otherwise be associated with a multiplicity of sensors in a manner so as to form nodes of data collection and analyses elements. For instance, the vehicles for transporting these modules may be commercial or military focused, such as F-35s, and may be manned or unmanned vehicles, and/or may include manned and unmanned ground sensors, including radars, cameras, and the like. In this manner, the modules may form a web, e.g., a hyper C2/C3/C4 communications web, of forward data collection units that because of their agility, closeness to the theater of operations, and ability to communicate with one another in a redundant manner provide for a more efficient communications stream over traditional SATCOM. Further, because the radio units can be segregated and separated from the conveyances that carry them, it is possible to segregate the kind of communications they transmit so as to keep data and communications in respective different levels, such as based upon one or more classifications, such as secret, top secret, encryption, and the like.

An additional benefit is that the Modular Mission System (MMS) including MLUs and/or PODS provide a variety of centralized building blocks that may form decentralized control centers in a manner so as to generate a backbone of data collectors and analyzers for the synergistic combination of both artificial and human intelligence. In this manner, the most pertinent data can be collected, identified, and rapidly employed for the analysis, categorizing, and/or flagging of information, whereby the most relevant and/or time sensitive data is categorized and presented with respect to ongoing concerns in field and/or down range.

In particular embodiments, the modularized, transportable control centers are capable of being rapidly configured and deployed so as to have a size and configuration that is adaptable to fit within the bounds of a containerized transportation vehicle, such as the fuselage of a plane, the bed of a truck, a car of a train, or within a sea going vessel such as a ship or submarine. In various embodiments, the communications modules are mobile and can be transported by one or a plurality of vehicles, and once delivered can be joined both physically and/or communicably, such as being in wired and/or wireless communication network. Each module may perform several different and/or unique functions, such as for the purpose of collecting data, analyzing the data on the spot, and forwarding the data to a distanced command center. Accordingly, various of the modules may be configured for conducting in field, e.g., down range, data collection and communication receipt, analysis, and transmission.

In certain embodiments, the modules are configured as mini, distributed control centers that are not only adapted for collecting and/or analyzing the collected data, e.g., automatically and/or autonomously, such as via an analytics unit, e.g., AI module, of the system, but also for displaying the information, e.g., either raw or processed data, to one or more users operating within the communications module, such as within a workstation thereof. For instance, the communications module may include a series of workstations, whereby each workstation may include an interface for accessing the system directly.

Specifically, each workstation may include client computing devices having an input device and a display for generating a user interface by which to access one or more system servers and/or databases or libraries, whereby the collected data may be reviewed and analyzed. In such an instance, sensed or otherwise collected data may be presented to a system user, e.g., at a workstation, via a suitably configured graphical user interface of the system, e.g., presented at a generated dashboard display associated with the workstation's client computing device. In this manner, the user may review sensed and/or collected data and analytics thereof so as to review and/or perform further analytics on the data such as prior to transferring that data to other distributed communication pods and/or central command.

Figure 4:
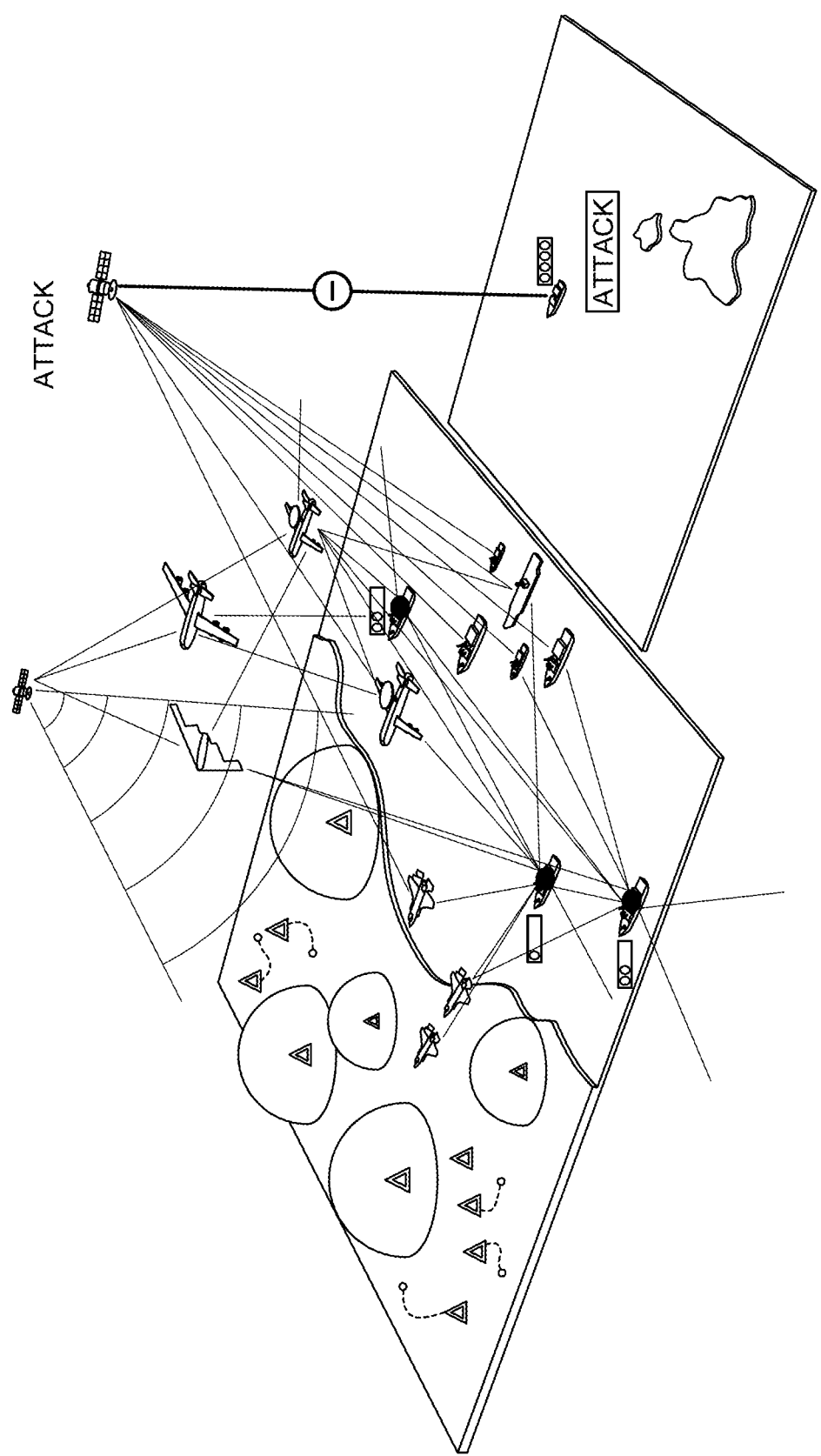
FIG. 4 is a representation of a how the C2 Web continues to provide robust command, control and communications services despite enemy attacks on CCC Center and global communications.
Figure 5:
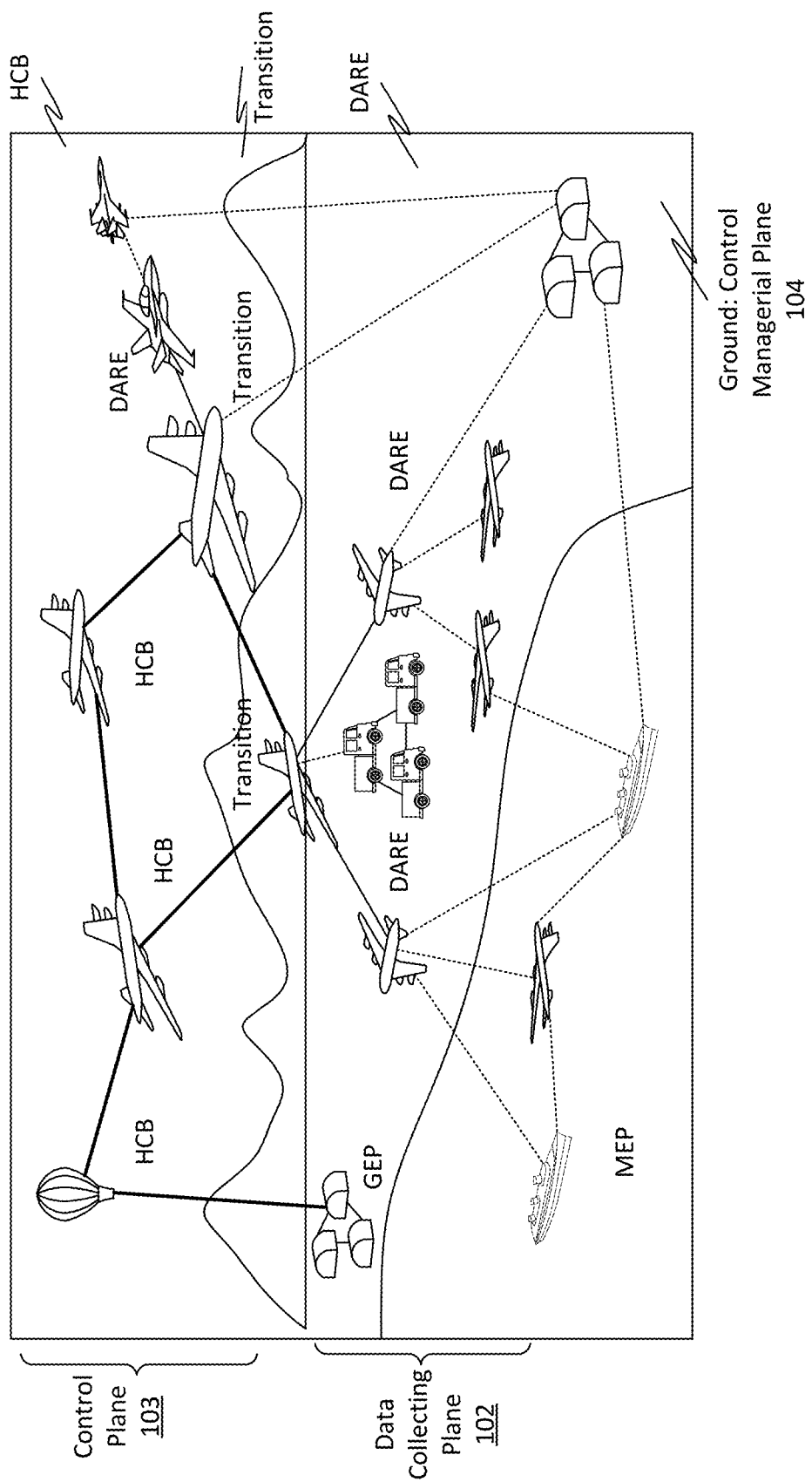
FIG. 5 is a depiction of the JALN architecture enabled by MMS and POD.

As can be seen with respect to FIGS. 3 and 4, in this regard, the infrastructure provided by these communication modules allows them to be positioned in a multiplicity of locations and can be efficiently manned in such a manner so as to be operated by a mere handful of users that can create a communications network that covers entire regions while requiring but a few operators that is far less than the typical number, e.g., in the thousands, that have formerly been required to operate the communications infrastructure as practiced prior to the Applicants' work in this field. In various instances, the MIMS disclosed herein form the infrastructure of a malleable command, control and communications web that can be strategically positioned in various different locations in-theater in a manner so as to be fully functional upon deployment, and positioned to make communication collection and processing seamless and adaptable to the environmental and physical conditions of the theater in which they operate.

Particularly, as depicted in FIG. 3, employing the present MMS units allows down-range command officials to plan out a flexibly arranged communications network, composed of individual, self-sustaining, communications MLUs and PODS, each forming a node in a communications web that can be shaped to the particular strategic needs of the operations to take place within the theater in which they are positioned. Hence, the present MIMS is a communications web that is capable of being rapidly extended as needed, and the size of which can be rapidly reduced as called for, dependent on the conditions and the strategy that is fluidically determined by command officials, which communications web may be fully functional with or without satellite connectivity. Additionally, because all of the depicted assets include either a MLU and/or POD data collection and/or communication buildout, all of the available assets I field can communicate directly with one another.

Further, as depicted in FIG. 4, the distributed module system is both spread out and redundant such that even if one or more nodes in the networked web is disabled, such as a satellite node, there are still layers and layers of nodes that can be employed in assuring efficient and effective transmission of communications. A unique benefit of the system is that in view of the module computing architectures and forward positioning of the web communications network, data analyses can take place in a much more rapid manner and with use of fewer resources. In some instances, instead of the typical 1,200-2,500 persons that are needed to run a functioning command center, given the efficient configurations of the distributed, edge-based MMS, a mere 12-25 people need be deployed, per module cluster, when implementing the former modalities. In such an instance, a typical deployment may include 2 to 25, such as 5 to 20, including 10 to 15 manned clusters, thus, reducing the number of operators necessary to run a command center by ten-fold. Likewise, in particular embodiments, the modulated pods enable rapid deployment of open mission system software/applications/services and tailored to mission demand, thereby resulting in lower life cycle costs.

Particularly, a further benefit of the modular communications and analytics platforms is the forward nature of the computing architecture, which provides for the rapid exploitation of big operational data. For instance, the modular communications platforms involve the collecting of data within a central repository, and the application of analytics, e.g., via a suitably configured artificial intelligence (AI) component, to the collected data for the purpose of analyzing the collected data. More particularly, an additional facet of the system AI is that it is configured to not only monitor and analyze collected sensor data, but to also tag and categorize that data into intuitive data collections for making stored data easier to search and identify the data of interest. Hence, a central hub of the infrastructure is the acquisition, logical categorization of acquired data, and storage of that data, as well as mechanisms for searching the stored data and presenting relevant results to an entered search query in a manner that makes the most pertinent results more readily available and easily accessible.

The system, therefore, can provide a multiplicity of gateways, whereby all the communications of a theater in conflict can be dynamically controlled, such as by the control intelligence, e.g., AI, of the system. For instance, the system control management software, e.g., a suitably configured AI module, may determine the configuration of network elements, e.g., on the control plane, can route communications, such as by bringing in and kicking out nodes, can determine communications types, and what antennas and PODS to be utilized. In such an instance, not only are the nodes discoverable and known, but what their assets are, and what their capabilities are, e.g., what radios are carried by what conveyances, and what radios to employ, e.g., whether to use CDL or Link 16, or TTNT etc., and when, are also known or are at least determinable.

Particularly, in one embodiment, the AI may perform the function of configuring and organizing the various different communications planes of the platform and can determine what nodes to bring on and utilize even though the nodes may be moving. In such an instance, the pattern of movement of the vehicles in a gateway, e.g., their path, may be known, or may not be known, e.g., but predicted. Therefore, the AI will know when there will be a change in direction of travel, e.g., flight pattern, such as a turn, and therefore can determine who is going to be in and out of a gateway and when. Thus, the AI can predict based on travel trajectory the best nodes to be utilized and can therefore determine what switching and/or routing will need to take place to ensure secure and patent message communication and/or data transfer.

For instance, the AI may access the data link management software of the system, so as to enable rapid switching and routing on a moment-by-moment basis between assets carrying different radios, e.g., CDL vs. Link 16, vs TTNT, etc., which may have different signal strengths and/or communication capabilities within the network. Likewise, the management system can determine which assets and radios to employ in any given situational context, such as based on signal strength, antenna directionality, course of travel, and the like. For example, the AI can determine how the route of travel, topology, and other potential sources of interference can affect signal strength and can then predict how to maximize signal strength despite travel path, which may include the bringing on assets, e.g., radios, changing their configuration, and direction of travel to ensure a consistently strong signal strength.

The AI can also determine which networks to utilize and which components of which networks to use, e.g., how to orientate antennas and/or to switch frequencies. System users can also give feedback based on whether the communications are clear or broken up, and based on such feedback, the system can reconfigure the system assets and components in a manner so that data transmission rates and clarity do not go down. The system can also determine the priority of which assets to employ and when, and can change priorities based on situational demands.

In various instances, a behavior model may be simulated outlaying all of the functionality available to a data and/or control plane, and based on the determined functionality, a situational scenario can be run to determine the best route of communication, with respect to what data to be communicated by what assets, and given the speed of transmission, what the dynamics of implementation of instructions will be. Based on these models, a strategic plan can be formulated, e.g., on the managerial plane, for communication and implementation by the control plane, and various simulations may be run, and based on the simulations a decision may be made as to which assets to employ to effectuate which strategy. Using these models a switching pattern can be identified, predicted, and communicated beforehand, and then it can be generated into code form, and be implemented as a series of instructions.

For example, instructions can be encoded, can be transmitted via the PODS and MLUs, received by vehicles, which can then be told where to go, how to go there, and when, and in which configuration, such as via the analytics processors of the POD and/or the MLU. Additionally, not only may the assets be allocated, but problems due to a proposed allocation can be predicted, conflicts identified and corrected, and strategies implemented. In various instances, the communications platform may be open or closed, and information can be compiled and processed by both software and hardware in a manner that ensure safe, strong, and analytical decision making.

As described below in greater detail with regard to the analytics and/or artificial intelligence system employed herein, the system may track and learn from the strategies being generated and implemented by the system in a manner to determine acknowledged rules that may be applied with respect to configuring a communications platform in a theater in conflict. In such an instance, the system may determine the factors leading to the achievement or failure of mission goals, and evaluate how those goals and achievements, or their failure to be achieved, can be enhanced or rectified in the future, and the like. These and other such factors can be supplied to a learning engine, e.g., a machine learning component, of the artificial intelligence module, whereby one or more of the goals and rules employed to meet those goals and instructions for their implementation, as applied in practice, can be compared to the rules as proposed and/or previously implemented.

The results of their implementation, including any deviations therefrom, can be analyzed, based on how actual results of their implementation corresponded to a predicted level of success or failure. Where a deviation is identified, the conditions and/or variables leading to that deviation can be determined, and the system's rules may be updated based on how they are implemented in practice. Particularly, the system may be configured for determining one or more trends that affect the rules-based implementation of a strategy and can update or otherwise change the system and/or mission parameters based on the determined trends, so as to more predictably achieve successful results.

Specifically, the system may be implemented as a rules-based platform that functions for the purpose of configuring and deploying one or more of the MLUs, PODS, and other assets disclosed herein, as well as determining their level of utilization, and their positioning during deployment. In this manner a fluid, multi-level web of communications can be generated and deployed to cover a region of interest, such as a region in threat of conflict. In such an instance, the communications web may be made up of several tens to hundreds or even thousands of MLUs and PODS, and/or the conveyances containing them, which may be operational and/or moving throughout the region. Hence, the system may be configured for directing the movements and/or utilization of all of these separate and individual assets, which when in communication with one another form nodes in a communications gateway.

The system may therefore be configured for being dynamic, and is capable of evaluating the rules and results of the configurations and deployments to be applied so as to make the overall configuring and deployment processes more efficient and effective. Particularly, the system may evaluate the overall processes being run by the system, with respect to generating a stratagem in accordance with mission parameters, and may further evaluate the implementation of the various strategies involved with regard to achieving mission objectives, overall as well as on an asset by asset basis. In these instances, one or more characteristics affecting mission achievement, e.g., with regard to asset build out and deployment, may be evaluated so as to determine if one or more trends can be identified whereby a change in the rules may result in a greater efficiency and effectiveness being observed with respect to the observed trends and/or one or more operations of the system, and/or one or more implementations of the determined buildout, asset allocation, and/or deployment strategy. For example, where a rule has become outdated, and the system flags a discrepancy between an expected or predicted result and an observed result, such as by a rule no longer being followed or a new rule being required, the system can automatically modify one or more of the set of rules being applied in the process in a manner so as to accommodate the new practices, or the system may flag the instance for manual review.

Particularly, a computing device such as a server of the system may be configured to include, or may otherwise be associated with, an artificial intelligence module. In various embodiments, the artificial intelligence module may include a machine learning component and an inference engine component. For example, the machine learning engine may be configured for receiving the individualistic characteristic profile for one or more mission objectives, the assets available for use, the components that can be included in the asset, and/or the mission operator of the asset, accessing an individualistic characteristic profile library for the asset elements and individuals involved, and/or determining one or more conditions for each asset, the components thereof, and/or individuals involved. Likewise, the machine learning (ML) engine may receive information related to one or more mission parameters and/or conditions, e.g., personal or environmental conditions, that are known or have been determined to be related to the characteristics and/or conditions necessary or useful for achieving mission goals and evaluating whether the same contributed to mission success or failure. Further, the ML engine may also receive one or more data points that are expected to be related to the characteristics, conditions, component configurations, and deployments.

One or more rules may then be identified and be applied by the ML module to define one or more potential relationships between one or more, e.g., all, of these data points, which relationships may be used to make one or more predictions. In various instances, the predictions may be with regard to determining one or more mission objectives and further determining a likelihood that the one or more mission objectives will be achieved and to what extent by implementing a determined build out and/or deployment of assets, e.g., given the conditions of the theater of threat and the operators operating therein. These determinations and/or predictions may then be tested by the ML module so as to better evaluate the rules of the system, and consequently, to make better determinations of which implementations will be effective in which environments.

In such an instance, the ML and/or the inference engine may be configured for generating one or more correlations pertaining to one or more data points within an asset buildout, allocation, environmental, and/or personal characteristics libraries, a conditions library, a mission parameter, and/or a stratagem library to generate unique individualized mission parameters for present or future use by the system in generating and implementing a proposed strategy. For instance, the machine learning component may be configured for generating and/or receiving search results from one or more of an asset buildout, allocation, and/or deployment library, which data may be linked to a given previous mission success or failure, and in view of the same, the ML component may further be configured for modifying a weighting of one or more relationships between the various linked data points within the structured database, based on the respective success or failure, which change in weighting may be in response to receipt of the search results. Particularly, the machine learning component may be configured for receiving results from a first set of a series of interrogatories, and based on the received results thereof, selecting a number of interrogatories from a library of interrogatories for inclusion in the generation of a second set of interrogatories that may be presented to a user of the system, e.g., an operator or operations manager, which can then be used to generate and/or evaluate a user entered, or machine generated, strategy and/or for seeking an approval thereof.

In various instance, the recited interview may be an interactive, intuitive interview that may be administered as an iterative process whereby the analytics and/or machine learning component structures the interrogatories to be included in a set of interrogatories to be administered to a system user for the purpose of building a communications network and/or determining the use thereof in developing a deployment strategy. These interrogatories can be used by the system so as to propose an asset buildout and/or allocation and/or method of deployment with reference to developing and/or implementing a strategy that may involve the generation of the fluid communications webs discussed herein. More particularly, as described herein below in greater detail, the system may include an artificial intelligence (AI) module that reviews one or more data points forming one or more datasets that may be derived by the system to make predictions as to mission outcomes and can then modify various rules of the system so as to more efficiently achieve predicted outcomes for mission success. Likewise, the system may identify a trend, and in identifying the trend, the system can identify that a change in determined rules, e.g., regarding asset build out and deployment, is useful in accounting for a more efficient or effective achievement of mission goals.

Accordingly, with respect to the artificial intelligence part of the system, in one aspect, a local or cloud accessible artificial intelligence module is provided. The AI module may be configured for being communicably and operably coupled to one or more of the other components of a processing facility, e.g., processing pipeline, disclosed herein. For instance, the AI module may work closely with a suitably configured workflow DLMS of the overall system platform so as to efficiently direct and/or control the various processes of the systems disclosed herein.

Accordingly, provided herein, is an AI module that is configured for acting as an interface between one or more characteristics of a strategy and/or an asset and/or an individual responsible for implementing the strategy, such as with respect to one or more conditions within a theater of interest. The AI module may further be configured for determining or predicting the achievement of one or more mission parameters and/or objectives in addition to one or more factors that will facilitate the successful achievement of those goals, such as where the goal may be to generate and/or receive one or more sensed conditions and/or instructions that are to be used in efficiently and effectively implementing the determined strategy.

For instance, in various instances, the system may be configured for receiving input data, e.g., environmental and/or individual characteristic and/or condition data, as well as asset position relational data. Such data may be collected by the system and/or be entered into a graphical user interface of the system, e.g., by a workstation operator, which entry may be in response to one or more interrogatories presented as an interview to the operator. The results of the interview may be data that includes an operator's responses pertaining to various mission objectives and/or parameters, such as pertaining to a strategy for deploying a variety of assets within a region of interest.

In such an instance, the system may include a workflow manager, whereby the workflow manager of the system may be configured for receiving and analyzing the input data, and other such data, and may further be configured for performing one or more analyses on the data so to determine one or more correlations there between, such as to build and configure the above referenced knowledge graph. For example, in various embodiments, the methods and/or systems herein disclosed may be adapted for correlating mission goals with asset build out and deployments, and further be configured for determining the extent to which the results of those buildouts and deployments lead to the successful achievement of mission goals. These data, evaluations, and results may be stored and compared with a database of previous proposed or implemented strategy data, and/or with a database dedicated to one or more mission parameters that resulted in effective mission accomplishment or failure.

Specifically, as described herein, the system may be configured for generating an interview, such as an interactive, intuitive interview, whereby the interview may include a number of interrogatories that are configured to elicit responses from a user with respect to the objectives of a mission, the parameters for the mission, and which assets and/or components thereof that are available to be build and/or deployed for implementing the mission. Data and/or characteristics pertaining to personal operator conditions, physiological or biological or medical background, psychology, and/or theater environmental conditions may also be elicited by the interview. In various embodiments, the system may prompt a user, e.g., system operator, to upload, e.g., via a secure, encrypted network connection, the requested data. Accordingly, presented herein is a system for searching a database, such as a structured database that may be configured as one or more libraries, identifying one or more results fitting the search criteria, and correlating data, such as correlating mission objective with available asset and operator and/or environmental condition data, e.g., biological or psychological health data, with proposed strategy data, and the like, which may then be further correlated with one or more rules databases.

As indicated above, in various embodiments, components of the system may include one or more of a server, having a processor, a database, such as a structured database, one or more sources for subject related data, a graphical user interface for generating and/or presenting one or more operator or manager interviews, and the like. In particular embodiments, the system may be configured to encrypt data files as that data is uploaded, or otherwise entered into the system, so as to ensure the maintenance of secret, e.g., top-secret confidentiality, where necessary. The files, e.g., records and/or index files, may be transmitted from each source of generation or storage to a repository using any suitable transference protocol, and may be searchable, such as via a browser. The GUI may be configured for searching the plurality of files, such as via use of one or more index files. The server may be a plurality of servers.

In various instances, the system may be configured for running a plurality of workflows, e.g., pertaining to a plurality of mission objectives, and may, therefore, include a workflow manager for implementing one or more of the analyses described herein, which in some instances, can be implemented in a processing pipelined configuration. Accordingly, as disclosed herein, the system may not only be configured for receiving mission, asset, component, and/or operator data, e.g., condition and/or environment data, but in various instances, the system may further be configured for correlating the received data with a database of stored data and/or rules data. For instance, the workflow manager (WMS) of the system may be configured for implementing one or more deterministic rule systems, so as to derive results data pursuant to its analysis of the mission data, rules data, and effects data.

For example, in certain embodiments, the system may include a variety of different databases or libraries, which various databases may be configured so as to have a relational architecture, which may further be adapted to include one or more constructions. These constructions may be represented by one or more table structures, trees, or graphs as described herein below. A series of tables, for instance, may be employed by which correlations may be made by the WMS in an iterative fashion. Particularly, in various use models, a first correlation may be made with respect to operation goals and parameters, asset and/or component, and/or operator characteristics, and/or sensed or entered environmental condition data, which may be included in one or more tables. Another table may then be employed to correlate relative sensed or determined condition data with a database of proposed strategy data that may be predicted to improve one or more of the conditions or elements that can lead to mission success or failure. Likewise, with the appropriate feedback entered into the system, e.g., sensed results or effect data, a further table may also be included and used to correlate the progress of the mission with respect to meeting mission objectives within mission parameters.

A key may be used to correlate the tables, which key may be accessed in response to question prompt or command. The key may be any common identifier, such as a code name, a number, and the like, by which one or more of the tables may be accessed, correlated, and/or a question answered. Without the key, it becomes more difficult to build correlations between the information in one table with that of another.

Accordingly, an important aspect of the present technology may be a data structure for answering a query, wherein the data architecture may be structured and searched in response to a query, such as a query pertaining to configuring a mission and making a given mission successful. In a typical architecture the database may be a relational database, such as a Structured Query Language (SQL) database, which may be implemented via a relational database management system (WMS). For example, in one implementation, the SQL database may be a document-based database, such as where one or more tables, e.g., look up tables, form a structure wherein data may be stored, searched, relations determined, and queries answered. Particularly, in various embodiments, a document or table-based database may be presented, searched, and used to determine relationships from which answers to one or more queries may be determined. For instance, typically, SQL databases have a relational architecture.

These constructions may be represented by a table structure. A series of tables, for instance, may then be employed by which correlations may be made in an iterative fashion. For example, with respect to the proposed mission analyses discussed herein, a first correlation may be made with respect to a mission objective and with respect to the proposed assets to be buildout and deployed in carrying out that mission. Another table may then be employed to correlate the mission parameters in accordance with a determined strategy to be implemented, with one or more effects of having implemented that strategy. These tables may then be correlated one with another so as to define any and all relationships between them, and the relationships can be weighted and scored based on individual contributions to mission success or failure results.

From these correlated results, one or more rules for strategy development and implementation may then be generated, stored within a database of the system, and used in determining new strategies, buildouts, and deployments for the future. Likewise, as indicated above, a further table may be generated and used to correlate mission objectives with asset buildouts and deployments for implementing a strategy for achieving the mission objectives, such as for use in future areas of conflict. As indicated an encoded and encrypted key may be used so as to access, search, and correlate data from the one or more of the tables such as in response to a query or question entered by the user, or generated by the system.

A further data architecture that may be used to structure a database is a data tree, where various data elements may be stored in a compressed, but correlated fashion, and/or in a hash table, as described herein above. In certain instances, the database to be deployed by the system may have a graph-based architecture, which database may be structured and used to determine the results for one or more queries. In various instances, the graph may be configured as a knowledge graph. Particularly, a knowledge graph architecture may be employed to structure the database, so as to enhance the performance of computational analyses executed using that database. In certain instances, the sophisticated algorithms disclosed herein, are adapted for structuring the infrastructure of a relational database so as to enable more efficient and accurate searching such as via performing graph-based analyses, as well as for performing table or tree-based analyses.

Consequently, in one aspect, a device, system, and methods of using the same to build a searchable, relational data structure, such as described herein, are provided. For instance, in one instance, the machines and methods disclosed herein may be employed so as to generate and/or otherwise collect data, such as for the evaluation of one of more strategies pursuant to mission objectives and parameters. Specifically, the machines and methods disclosed herein may be used to generate a searchable data structure for storing that data in a relational architecture. In various instances, additional data may be generated or otherwise be transmitted into the system, such as via a suitably configured network connection, e.g., the communications web disclosed herein, which data may also be configured for being stored in the relational data structure.

For instance, in another aspect of the disclosure, the system may include an artificial intelligence (AI) module that may be configured to provide a more comprehensive analysis on sensed, communicated, generated and/or provided data. For example, the AI module may be configured so as to implement one or more machine learning protocols on the data attained by the system that are devised to teach the AI module to perform one or more correlations, such as between various conditions affecting the determination and/or implementation of a strategy, the elements to be used in performing that strategy, and the results of that performance, such as with respect to the successful attainment of mission goals within mission parameters. Specifically, the AI module may be configured for receiving one or more inputs and may be adapted for building and structuring a database.

In certain instances, a machine learning protocol, as disclosed herein, may be employed so as to determine relationships between data points collected by and/or entered into the database. Such relationships may be determined based on known facts, and as such the learning may be supervised learning, e.g., such as where the data entered into the database is categorized in accordance with one or more categories and/or labels. Particularly, known factors may be used to label, categorize, and store data, which may be informed by the query being sought to be answered.

Hence, knowing factors by which to label and categorize the data being stored makes building the storage architecture more efficient.

In other instances, the learning may be inferred, such as in an unsupervised learning. For instance, in certain instances, the data to be stored may not be known, relationships between the data may not have been determined, and the query to be answered may also not be identified, and in such instance, the system may be configured for finding answers to all of these questions. In such instances, the data to be stored is unsupervised, and as such, patterns in data to be stored and their relationships, such as commonalities between data points, may be determined, and once determined such patterns may then be used in forming the architecture that structures the data storage.

For example, in various embodiments, the AI module may include programing directed at training the system to more rapidly, e.g., instantly, recognize how an output was achieved based on the type and characteristics of the input, e.g., sensed data, received. The system, therefore, may be configured for learning from the inputs it receives, and the results it outputs, so as to be able to draw correlations more rapidly and accurately based on the initial input of data received. Typically, the input data may be of two general types.

In a first instance, the data may be of a type where the output, e.g., the answer, is known. This type of data may be input into the system and used for training purposes. The second type of data may be data where the answer is unknown, and therefore, must be determined. This data may be any form of data. However, in various instances, this data may be data pertaining to a description of one or more mission objectives, conditions details of a theater in conflict, assets available for use in achieving those mission objectives, components available of use so as to outfit the asset, and the environmental conditions characterizing the field of conflict, collectively called "condition precedent data". This condition precedent data may be analyzed such as to correlate the conditions, or one or more of their effects, with one or more proposed strategies for achieving mission objective attainment. In such an instance, a strategy may be proposed, and a model run, where the conditions precedent are based on any previously known outcomes. This process may be used to train the model such that it can then be used to predict one or more outcomes where the relationships and/or predictive results of the conditions precedent are not known.

Accordingly, effect data which is known or unknown may be used to train one or more models, whereby one or more strategies may be tested, and based on the results thereof, one or more asset buildouts and/or allocations can be proposed, and a prediction as to their effect at achieving mission objectives, e.g., within mission parameters, may be determined. Hence, these effects data may be used to enhance the AI module's ability to learn from the first type of input data, known condition precedent data, so as to better predict the outcome for the second kind of input data, inferred proposed condition precedent data, so as to better correlate conditions with those agents that can affect those conditions, such as in a positive or negative manner.

Specifically, based on historical evidence, e.g., from a plurality of operations having previously been run, the AI module may be configured to learn to predict outcomes, e.g., based on previously observed data, such as with respect to determining various of the conditions precedent that may be implemented in asset buildout, allocation, and deployment, when facing future situations that are the same or similar as past operations. More specifically, a flexible communications web development platform is presented herein, wherein the platform is configured to correlate descriptions of various conditions precedent, such as asset buildouts and deployments, with data pertaining to an environment in which those assets are to be deployed, so as to generate a communications and analytics framework that is largely impervious to disruption. In such an instance, one or more strategies for building out a communication web, based on the use of transportable assets, may be generated for various of the users of the system, which strategies may be generated by subjecting one or more of system operators or managers to an interview process designed to elicit answers pertaining to one or more of mission objectives and/or parameters to be conducted in the theater of potential conflict.

Particularly, in combining these various datasets, the AI module may be configured for determining the various interrelationships between them. Accordingly, at the heart of the AI platform may be a structured architecture, such as a graph based database, which may be configured for receiving data from a plurality of different sources, such as from user entered responses to the one or more interviews described herein, or other user entered data, and/or sources of information pertaining to sensed conditions data collected by the deployed assets, and any type of other data useful in accordance with the systems and methods disclosed herein. As indicated, the system may be configured for employing the received data in one or more learning protocols, such as for machine learning.

For instance, machine learning takes place by training the system to instantly recognize how an output was achieved based on the type and characteristics of the buildouts of the assets deployed and the resultant inputs received. The present system is configured for learning from the inputs it receives and the results it outputs, so as to learn to draw correlations more rapidly and accurately based on the initial input of data received. The system, therefore, receives a first set of data wherein the outcome is known, and this data is employed by the system to generate one or more rules by which a result may be obtained, and once obtained compared to the known outcome, which can then be used to predict one or more results when the effects are not known.

Consequently, the system may be configured to train itself to better recognize correlations between data points within databases more accurately, e.g., with less false positives, and more efficiently, and to make predictive outcomes. In such a manner, the machine learning algorithm may learn environmental conditions, operator behaviors, determine accuracy, which may be used by the artificial intelligence module to analyze further sample sets with respect to answering one or more search queries, such as a query requiring the AI module to infer correlations between nodes or datasets. Hence, once the AI machine learns the behavior, the learned behavior may then be applied to a second type of data processor, such as an inference engine, that is used to answer one or more unknown variables.

The more the machine learns from the first type of input data, the better the inference engine becomes at predicting the outcome for the second kind of input data. Specifically, based on historical evidence, the artificial intelligence module may be configured to learn to predict outcomes based on previously observed data. With respect to the operational goals, environmental condition data, and/or characteristic data of the system assets and operators, the present data and communications collection and analysis platform is configured to correlate the conditions being experienced down range in a theater of interest with a proposed implementation of a data collection and communications web, so as to effectuate a strategy for carrying out successful operations within the theater. The sensed effects that result by the implementation of the data collections and communications web implementation, may then be used to more effectively configure and implement data collection and communication in a manner that is less likely to be disrupted. Particularly, in order to combine the various data collectors and data being collected and communicated in a fluid environment, their interrelationships are capable of being determined by the system.

Accordingly, in a first step, a database, e.g., a table, graph, or knowledge graph based database, may be constructed. For example, in this instance, the knowledge graph may be composed of three typical elements, which basically include a subject, a predicate, and an object, these may form data nodes, and the relationship between the data nodes must be determined. Any particular data point may be selected as a data node, and data nodes may vary based on the queries being performed. There are several different types of relationships that can be determined. For instance, relationships may be determined based on their effects, e.g., they are effect based, or they may be determined based on inferences, e.g., relationships that are unknown but determinable.

Particularly, each effect and/or relationship may be characterized by different properties or characteristics, which characteristics may be used to generate weights, probabilities, make assumptions, and the like. Such properties may be used to populate the knowledge graph with data points that may form the data nodes of the graph. More particularly, to better determine causal and/or predictable outcomes the various different relationships may be weighted, such as based on the degree of certainty, number of commonalities, number of instances sharing the node, number of common relationships, and the like. In various embodiments, a schema may be formed, such as where the schema is an architecture that is used to give structure to the graph. Hence, the construction and implementation of a dynamic knowledge graph may be at the heart of the data collection and analysis platform described herein.

For example, with respect to constructing the knowledge graph, any particular data point may form a data node. For instance, on one side of the graph a condition within a theater of interest in need of resolution may form one set of nodes, and on the other side of the graph a set of proposed assets available for deployments may form another set of nodes. In between these two nodes may be a third set of nodes, e.g., a series of third nodes, such as one or more rules, including: mission objectives, mission parameters, available assets, electronic components, courses of travel, and the like. Additionally, in between these nodes are the relationships that may be determined.

Specifically, when building the knowledge graph, condition precedent data may be input into the system, such as from an individual's responses to a set of interview questions, uploading, and/or detection by one or more sensor elements of the system, such as where the condition precedent data may include, e.g., asset and electronic component, radio and transceiver data, environmental and/or operator condition data, and the like. One or more proposed configuration nodes may be formed, whereby one or more configurations for building out and/or deploying the assets within the field of interest for generating a flexible data collection and communications web can be proposed and used to populate a second set of nodes within the knowledge graph. Further, one or more mission objectives for how the communications web is to be implemented for the performance of a strategic operation may entered into the system and used to populated one or more second sets of nodes as well.

Once these sets of nodes have been established one or more queries may be input into the system, from the presence of which the relationship(s) between the various nodes may be determined. Particularly, from these nodes series of relationships may then be determined by analyzing various points of connection between these various items. Likewise, this process may be repeated for multiple assets, or asset classes, having the same or similar characteristics and/or experiencing the same or similar conditions, and/or having the same or similar asset build out and/or deployment allocations. Hence, in a manner such as this, the correlation between theater conditions and the proposed asset buildouts and/or deployments that affect the ability to collect data and transmit communications in that theater environment may be determined.

Accordingly, a step in building a fluid data collection and communication platform graph is to define the anchor nodes, these anchor nodes represent bounding elements between which all the various relationships, e.g., commonalities between the conditions precedent, may be defined and explored. A further step is to define all the possible known correspondences between the anchor nodes, which may be represented in the graph as a further node, such as a rules node. These known correspondences may be built around detailing the effects caused by and/or the characteristics of one node on the other. These may form the known and/or observable relationships between the nodes. From these known relationships, a second type of relationship may be explored and/or determined which relationships may be built on inferences. Further, to better determine causal and/or predictable outcomes the various different relationships may be weighted, such as based on the degree of certainty, number of commonalities, number of instances sharing the node, number of common relationships, and the like.

Hence, in various embodiments, the construction and implementation of a dynamic knowledge graph may be at the heart of configuring the communications web, including which assets are deployed, where, and when, along with what components they will carry, and what operations they will perform. As indicated, in this manner a data collection and communications web may be generated and the various processing platforms of the global system may be coupled together, so as to collect and seamlessly transfer data between its various components. For example, as indicated, the receiving and transferring of sensed data and instructions may be performed in a substantially seamless manner, such as via a hyper wireless-interconnect, and this data may be streamed into an analytics, e.g., AI, module of the system such that data relevant to the configuration of the communications web and/or strategic implementation of the mission, can immediately be processed and used to reconfigure the web as necessary to ensure the fastest, strongest, and most accurate communication of data.

Particularly, the AI module may be configured for receiving the interview results from the query generating engine, and for taking the results data and using it to generate one or more proposed asset buildouts and deployments for the creating of a flexible data and communications web. These assets, buildouts, and proposed deployments may form one or more first nodes within the knowledge graph. Further, as indicated, the AI module may be configured for receiving input data from one or more other sources, such as from sensed asset or operator experience data, e.g., where the sensed data represents one or more conditions, e.g., environmental or personal conditions, within the field of deployment, which input data may be used to generate one or more second set of nodes within the knowledge graph. Furthermore, the system may further be configured for receiving and/or otherwise retrieving data about one or more mission objectives and/or a mission strategy, which data once collected may be used to generate a further set of nodes within the knowledge graph. Other data, such as asset and component availability data may form an additional node within the graph. Additionally, once the knowledge graph architecture has been constructed, it can continually be updated and grown by adding more and more pertinent data, from one or more deployed data collectors, into the knowledge structure, building more and more potential nodes and/or relationships. In such an instance, the bounding nodes may be of any combination of nodes, and as such, in certain instances, may be user selectable.

For instance, in various embodiments, the system may be configured for being accessible by a third party, such as by mission managers overseeing the administration of the strategy and the deployment of the mobile data collection and communication assets, and the like. In such an instance, the managing operator may access the AI module, e.g., via a suitably configured user interface, upload pertinent mission and/or asset and component information into the system and/or determine the relevant nodes by which to bound an inquiry, e.g., by clicking on or drag and dropping them via the dashboard interface, and may formulate a relevant question to be answered by the AI module. Accordingly, the user may review and/or select the bounding nodes, then allow the system to generate an appropriate knowledge map employing the selected nodes and determine the relationships between the nodes. From these determined relationships various further inquiries may be queried and answered, or at least be inferred, e.g., by the AI system.

In such an instance, the queries to be run may pertain to one more of which assets to deploy, how to build them out, e.g., which components to include, and how to deploy them, when, and for what purposes. With these data the AI module may generate a suitable knowledge graph (and/or add to an already existing knowledge graph), from which knowledge graph the bounding nodes may be selected, various further relationships between the nodes may be determined, and a new or evolving deployment strategy may be determined. Further, in such instances, environmental, asset, asset component, and/or asset operator conditions may be entered into the system AI and may be correlated within the knowledge graph with the various proposed communication web configurations, and from these data points within the graph, various additional relationships may be determined, inferences assessed, and predictions made, such as with regard to their effect on the newly proposed strategic operations.

Particularly, with this data the AI module may generate one or more suitable knowledge graphs (and/or add to an already existing knowledge graph), from which knowledge graph(s) the bounding nodes for the buildout, deployment, and operations of one or more assets may be selected, e.g., by a workstation operator, and relationships between a newly proposed implementation and a mission's operational objectives can be determined. A workflow for determining one or more characteristics and/or mission objectives and/or results of the new strategic deployment of the assets of the system may be worked up, and a new query may then be run so as to identify other conditions that may be related to, e.g., causing, one or more data collection and/or communication effects that can be improved by the new buildout. Hence, a plurality of workflows may be engaged so as to determine one or more different assets or configurations that can be worked up so as to improve upon a currently implemented strategic deployment and/or to generate a new strategic formulation, and thereby achieve better data collection, communication, and/or mission success results.

In any of these instances, various of these characteristic data may be uploaded into the system and may be populated into one or more knowledge graphs of the system, whereby various nodes may be identified and/or correlated from which data correlations and various relationships may be determined, inferences assessed, calculations performed, and predictions made and/or reported. For instance, in such a manner, this data, as well as any other relevant data, along with all properties relevant to a particular query to be analyzed, may be uploaded into the system and be used to form a constellation of data nodes. The constellation of data nodes may be employed to determine various relationships pertinent to the mission objectives, asset allocations, and component selection, such as by querying the system and allowing it to generate the appropriate connections from which an answer may be inferred.

Once populated in a manner such as this, one or more queries may be run against the data so as to isolate various sub-profiles that may then be mined for relevant relationships and/or correlations that when calculated are likely to lead to new configurations that in turn will lead to better data collection and communication results. Specifically, the various condition precedent characteristic data may be employed by the AI module so as to determine one or more correlations and/or perform one or more calculations with respect thereto and thereby derive and propose a strategic deployment of the various different asset classes, especially with regard to their buildout, positioning, and movement within the field of conflict.

More specifically the AI module can determine an ideal build for the MLUs and PODS of the system, such as with regard to which electronic components they will carry, e.g., which radios, transceivers, processing elements, etc., where those assets are to be positioned, which plane of the layered data collection and communication web they will occupy, and what functions they will perform within the pipeline of data collection and communication transmission such that a flexible, redundant, and overlapping blanket of data collection and communication assets completely covers the field of engagement. In such an instance, the various different data collectors can monitor any results of engagement, the results can be fed back into the system, and it may be determined if a change in the deployment of the assets is likely to lead to improved mission results. Where it is determined that such a change is likely to lead to increased mission results then that change can be implemented, e.g., automatically or with operator approval, and where it is determined an improvement is not likely to occur, then no change need be implemented.

More particularly, in one use model, a relationship between two properties, e.g., property A: a given set of mission objectives to be carried out within a defined area of interest, and property B, the build out and deployment of one or more modular assets that is proposed to be implemented in carrying out the mission objectives, may be determined, e.g., by the system. Then one or more changes can be made to the build out and/or asset allocation, and a concomitant change to the success or failure of the mission objectives can be predicted based on the change being proposed to the data collection and communications web. The resultant predictive data can then be compared to other such related or corresponding data from a variety of previous, past deployments in the same or similar circumstances, whereby the one or more predictions may be compared, such as for the purpose of giving an increased or decreased weighting to the prediction as to whether the current prediction is likely to be accurate. Accordingly, if a given property, e.g., condition A, is entered into the system, and a second property, e.g., condition B, is entered into the system, then a third condition, e.g., relationship C, such as whether a proposed change to a build out or asset allocation will lead to a greater chance of mission success, may be predicted. Particularly, where a prediction is to be made, a historical context may be generated, whereby previous instances of conditions A and B have resulted in a positive outcome C can then be used to weight and predict the outcome of a subsequent occurrence of conditions A and B leading to the positive outcome C, such as where output C may be inferred, taking the predictive weights between the two into account.

In such an instance, when evaluating the inputs with reference to properties A and B, a relationship between the two may be determined by the artificial intelligence processor, such that if given a new input for properties A and B, the determined relationship may then be used to predict what the outcome of property C will be, given that the two properties are in fact mathematically related. This machine learned relationship may, therefore, be employed to determine when the two or three or more properties are in alignment with one another, e.g., everything is functioning as it should, and may further be used to determine when things are not functioning in alignment, such as when the predicted outcome is not observed, and thus, is indicative of their being a problematic state, which may be flagged by the system. It is to be noted that the preceding applies to any given nodes that are in a mathematical relationship to one another, such as with respect to a multiplicity of subjects and/or a variety of conditions.

In certain instances, however, the relationship between two or more properties are not linear, but rather may be more complex. For instance, in certain embodiments, the artificial intelligence module may be configured to model more complex processing of relationships in a manner similar to a neural network, such as in a deep learning protocol. Accordingly, although in some instances, the relationships may be configured in a linear array, such as to form a direct linkage between the properties, in other instances, the relationships may be layered one on top of the other so as to form a stacked, e.g., neural, network of information.

Hence, in particular instances, the relationships may be formed in a multiplicity of stages and/or levels, where one level of information is connected to the next level of information, such as in a deep learning protocol. Additionally, the relationships between the various properties from one, or the same, level to another may be strengthened, and therefore given greater weight, or weakened, and consequently given less weight, by the machine learning protocol engaged. Accordingly, as information is processed and allocated across the properties in the different, or same, levels of the system, at each stage, a variety of different points are being given greater and greater, or lesser and lesser, weights. Hence, when given a particular input, the AI module may more efficiently and effectively predict a given outcome more accurately based on the various different levels of weighted historical information.

For example, the AI system may be adapted so as to process information in a layered or multi-staged fashion, such as for the purpose of deep learning. Accordingly, the system may be configured to evaluate data in stages. Specifically, the AI module may be adapted such that as it examines various data, such as when performing a learning protocol, stage by stage, level by level, where each connection between data gets weighted by the system, e.g., based on historical evidence and/or characteristics of relationships. The more stages and/or levels of learning that are initiated within the system the better the weighting between junctions will be, and the deeper the learning.

Further, uploading data in stages allows for a greater convergence of data within the system. Particularly, various feature extraction paradigms may also be employed so as to better organize, weight, and analyze the most salient features of the data to be uploaded. Additionally, in order to better correlate the data, one or more users may input and/or modulate basic weighting functions, while the system itself may employ a more advanced weighting function based on active learning protocols. For instance, a deep learning protocol may be employed in training and implementing a search function of the disclosure as discussed herein.

Specifically, deep learning is a paradigm where increased levels of datasets are employed in generating an answer to a query. If there is only one stage of learning involved, when answering a query, the network architecture may be configured as a neural network. However, if the determination implements a multi-stage learning process, when deriving an answer to a query, the architecture may be configured as a deep learning network. The more stages there are, where each stage includes a weight, the deeper the learning will be. But, with each stage added, the computing power required to make the data converge becomes greater and greater. Specifically, with each additional data set being processed, another node is generated, which increases the level of future processing power.

With respect to the present disclosure, when running a deep learning protocol, the process first implements a feature extraction protocol. In the deep learning protocol, salient features are extracted and considered in comparison with similar features stored in a database of previously extracted features. For example, each feature may represent a characteristic that may be categorized into one or more categories, classes, or labels, which labels may be used to recognize patterns. The machine can therefore be trained to recognize the reoccurrence of those patterns in other representations, and thereby draw conclusory predictions based on those recognized patterns.

Accordingly, in order to perform machine learning it is useful to form or access a library of functions. This is useful, for instance, where anchor characterizations may be identified, such as of conditions of a field in conflict, parameters of one or more mission objectives, and a proposed allocation, buildout, and deployment of assets. From these anchors, a knowledge graph may be generated, the knowledge graph can be queried to produce predicted results, and the predicted results can be compared to past results having the same or similar precedent conditions, and a weighting may be given to the predicted results. From this weighting, the various conditions can be scored as to whether a change in one or more of the conditions will lead to an increased or decreased weighting of the predictive results.

Once learnt, this model may then be used to perform subsequent analysis. In such an instance, subsequent analysis or distribution need not involve analysis or distribution of the entire subsequent characterizations. Rather, only data pertaining to any differences or divergence from the anchor, such as in response to a defined condition unexpectedly being improved or worsened. This is termed feature extraction, the preferential analysis of the anchor characterizations, or in some instances, only the changes thereof.

Accordingly, in various instances, methods disclosed herein are directed to using labels, e.g., pointers, to categorize and structure a database, such as for use in the artificial intelligence module to analyze data therein. In such machine learning the data may first be cleaned and prepared for feature extraction, e.g., of characteristic and/or condition and/or other significant data. Such data, once extracted may be captured with respect to an individual instance, a group of instances, and the like, and may be based on one feature, a plurality of features, etc. thereby building a library of features as data is coming into the system. Once the data is in the system it can be used to train the machine to build a graph assembly so s to generate potential levels of correspondences.

As indicated, the AI system may be configured for answering a query, such as from a workstation manager or operator. Accordingly, when performing a search function of the AI repository or database, the database may be configured as a relational database. In various instances, the architecture of that database is such that it may be structured as a table or tree, or the architecture may be configured such that data is stored therein in a graph form, such as a knowledge graph, as described above. Additionally, when performing a search of the database, the search may be an effect-based or an inference-based search query.

An effect-based search is typically one where the outcome is known and/or expected, whereas in an inference-based search, the outcome is not known. Although table-based searching is useful, it is based on known relationships that are categorized by tables, which may be searched by using the known key. Such searching is generally effect-based searching, where the answer is known, and the relationship with its query simply needs to be identified, e.g., via the use of the key.

Inference based searching, on the other hand, is where the relationship between two data points is unknown, but to be determined based on the building of a knowledge graph. In such an instance, the learnings of the system, with respect to other relationships and the rules of those relationships, allow for new relationships to be discovered and otherwise unknown outcomes to be determined. As such, the generation and implementation of the knowledge graph is a useful feature of the present search function in an inference-based learning schema upon which the machine learning and inference engines, as herein described, are primarily built. Hence, as data flows into the database, it is formulated into one or more of these, or another, such structure, and the data, e.g., where its relationship to other data is known, may then be employed to train the search function of the system to determine data points and/or relationships between data points where the relationship was not heretofore previously known.

Specifically, once the known relationships have been determined, through a training process, the newly trained system, and the rules developed, may then be employed to infer other relationships, heretofore unknown, between the data points with a probability establishing the prediction that the inferred relationship is in fact an actual relationship. In such a manner, various conditions of a field in conflict may be entered into the system, as one set of a collection of data points, and likewise a set of characteristics of a variety of proposed assets and buildouts of those assets available for use may also be entered into the system as well. These data may be employed to build a knowledge graph whereby the various relationships, known and inferred, between these various data points may be determined. This may be done for one or a plurality of proposed use models for meeting defined mission objectives, where the relationships and the learnings therefrom may be used to determine known outcomes, such as for training the system.

Once suitably trained, the system may then employ these learnings in determining heretofore unknown relationships so as to infer outcomes therefrom, such as with respect to whether a proposed buildout and asset allocation will likely lead to the attainment of determined mission objectives, such as within one or more bounding mission parameters, given the determined set of conditions within the field of conflict. Hence, known facts and relationships may be used to train the AI engine, which once trained may determine rules by which unknown relationships may be determined and outcomes based on those relationships may be inferred and/or otherwise determined, such as by a suitably configured inference engine of the system.

These data, therefore, serve many purposes, one such purpose being the training of the AI module, and/or its use in one or more predictive models. In such training, known relationships and outcomes can be treated as if they are unknown, and consequently the machine may be made to determine the relationships and predict the outcomes anew, which training may continue until the system has learned to predict the right outcome. Particularly, this training, e.g., two class-model training may be used for a sub-portion of the data, e.g., 50%, the training portion, and the other data may be used to test the learnings from the training portion to predict the known outcomes, with respect to the other 50% of the data. Hence, the first portion of the data may be employed to develop a training model, and the second portion of the data may be used to test the training models to enhance the accuracy of a predictive model, which once sufficiently trained may be employed to make other inferences and thereby predict other outcomes.

For example, once trained, the inference engine may be employed to search the database in response to a user entered query and based on the known and/or inferred relationship between the various data of the system, an answer to that query may be inferred and an outcome predicted, e.g., a given request may be input into the system. Particularly, an answer may be generated by the system based on the relationships between the data. One, two, three, or more inputs may be entered into the system, in addition to a query, and an output may be determined and returned by the system.

For instance, the characteristics and conditions of a field in conflict and a mission objective for resolving such conflict may be correlated one with the other, and be uploaded into a database of potentially correlated data from other such instances. The system may perform a comparison between the characteristic and condition data of the various different instances, such as for use in training and/or the development of predictive models, which models can be queried in such a manner as to determine an optimal build out and allocation for how the various available assets should be configured and deployed, given the field conditions, so as to effectuate the mission objectives. Specifically, as indicted above, the data entered into the system may be used to train the system, and once trained the system may be employed to make one or more correlations or predictions, therewith, such as in response to a query, such as with respect to determining an optimal build out and allocation of the modular data collection and communications assets disclosed herein.

Accordingly, in various instances, the system may include an inference engine, such as configured as a deep-learning neural network, that is adapted for receiving a plurality of inputs, performing an analysis of the data, and generating one or more correlations between the various data points. In particular instances, the system is configured for allowing the inference engine to be accessed on-board a modular asset or remotely, such as via a cloud-based interface accessed through a client computer. Once accessed, information pertaining to a particular use model may be uploaded onto the system, or if already uploaded may be accessed.

In such an instance, relevant data may be uploaded into the system, and may serve as nodes for generating the knowledge graph, where each node may be defined by a number of properties. Once the pertinent group has been defined and the relevant properties characterized within the knowledge graph, the inference engine may then be employed so as to determine both known and inferred correlations between the various data points and/or their characteristics. Such inferences may be performed automatically, or in response to an entered query. The inference engine, in response to the query, can then define the relationships between relevant nodes and/or their defining properties, and form those known relationships either return an answer, or generate, e.g., infer, further heretofore unknown relationships by which an answer may be determined and returned to the system operator, e.g., on the managerial or control plane.

In various instances, along with the answer, e.g., whether a particular asset allocation will lead to a successful mission completion, a predictive quality score, e.g., confidence score, as to how accurate the returned answer is expected to be may also be generated. Based on the confidence score and/or other pertinent factors the rules that the inference engine uses to define the various relationships between particular nodes in the knowledge graph may be adjusted. For instance, these rules may be adjusted to be stricter or more lenient so as to what data points and which relationships will be considered as valid when making a given predictive model, e.g., which nodes may be considered as objects. Particularly, various of these data may be considered as subjects and predicates, and may be correlated as objects, for use in implementing one or more of the procedures referenced herein.

Consequently, once the various relationships have been defined and weighted, a predictive query, such as in the form of an "If"/"Then" statement may be made, such as where the system operator enters a query into the system. Accordingly, the inference engine determines the "then" portion of the statement by employing a predictive model to generate a resultant outcome, such as based on a probability outlook. Hence, the system operator may enter, or the system itself may collect and/or retrieve, data pertaining to one or more conditions of a field in potential conflict, as well as data pertaining to one or more mission objectives and/or mission parameters. The operator may further enter, or the system itself ay retrieve, data pertaining to the assets and electronic components available for use in building a data collection and communications web that could be useful in implementing the mission objectives in the field so as to achieve the objectives given the mission parameters and current conditions within the field. The inference engine may then use that data to build a knowledge graph whereby the system may then return a proposed asset build out, allocation, positioning, and routes of travel for generating the data collection and communication web taking into account both the conditions within the environment of the field as well as the mission objectives and parameters. The system may also suggest alternative or supplemental buildouts and/or allocations that may be useful to implement in substitution or in addition to the originally proposed deployment plan, such as where there is a better change of coverage.

Hence, embodiments of the disclosure and all of the functional operations described in this specification can be implemented in digital electronic circuitry, or in computer software, firmware, or hardware, including the structures disclosed in this specification and their structural equivalents, or in combinations of them. Embodiments of the disclosure can be implemented as one or more computer program products, e.g., one or more modules of computer program instructions encoded on a computer readable medium, e.g., a machine-readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal may be an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For instance, in various instances, certain aspects of the artificial intelligence module may be accelerated, such as by being implemented in hardware, such as by a suitably configured integrated circuit, such as by an FPGA, ASIC, Structured ASIC, and the like. For example, in certain embodiments, the AI system may be configured to model a neural network, including a deep learning neural network, which may be formed of layers and layers or processing engines, where the more layers provided the deeper the learning configuration, and where each processing engine is trained in accordance with the methods disclosed herein to perform predictive analyses, which based on the number of layers may allow for exponential analyses to be performed.

As indicated, one or more aspects or features of the subject matter described herein may be realized in digital electronic circuitry, integrated circuitry, specially designed ASICs (application specific integrated circuits), FPGAs (field programmable gated array), computer hardware, firmware, software, and/or combinations thereof. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

The aforementioned implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device. These computer programs, which can also be referred to as programs, software, software applications, hardware, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal.

The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

Accordingly, provided herein is a non-transitory computer readable medium that stores instructions that, when executed by one or more processors, cause the one or more processors to perform one or more of the method steps disclosed herein. For instance, the computer implemented method may include identifying, e.g., sensing, one or more conditions in a field in conflict, determining a need for deploying a data collection and communications blanket over the field, assessing available assets for generating that blanket, and for directing the build out of one or more modular data collecting and communications units, e.g., the MLUs and PODS disclosed herein, and generating instructions for their deployment, which instructions may include directing which level of plane they are to occupy and when as well as their directionality, e.g., vector and magnitude, of travel. The system may further collect data so as to monitor and asses that deployment, and may suggest or implement changes to that deployment as various conditions and/or mission objectives or parameters change.

Furthermore, non-transitory computer readable medium as implemented by at least one of the computing devices may include instructions for generating a specific buildout and/or deployment strategy for the modular data collection and communications assets disclosed herein, when it is determined that the generation and use of a communications we is useful for the accomplishment of mission objectives. For example, the method may include identifying, using the one or more computing devices, one or more rules that are applicable to one or more of the conditions of deployment, and applying the identified rules to the deployment so as to determine whether the conditions within the environment under threat improve, and if not making real-time changes, or at least suggestions for change, of the deployment strategy. As indicated, the computer implemented instructions may further instruct one or more processing engines of the computing device to determine the accuracy of the information being collected and transmitted, and where information may be inaccurate or missing, the method may include retrieving accurate information when it is determined that the information in the claim packet is deficient because of it being either missing or inaccurate.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the subject matter described herein can be implemented on a computer having a display device, such as for example a cathode ray tube (CRT), or a liquid crystal display (LCD), or light emitting diode (LED) or (OLED) monitor for displaying information to the user and a keyboard and a pointing device, such as for example a mouse or a trackball, by which the user may provide input to the computer. In various instances, the display screen may be a capacitive sensing interactive touch-screen display. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), WiFi, and the Internet. The computing system may include clients and servers. A client and server are generally remote from each other and typically interact through a communication network. The relationship of client and server arises by virtue of computer programs running on the respective computers and having a client-server relationship to each other.

The computing system can include clients and servers. A client and server are generally remote from each other and typically interact through a communication network. The relationship of client and server arises by virtue of computer programs running on the respective computers and having a client-server relationship to each other. Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the disclosure have been described. Other embodiments are within the scope of the following claims. For example, the steps recited in the claims can be performed in a different order and still achieve desirable results. In addition, embodiments of the invention are not limited to database architectures that are relational; for example, the embodiments of the disclosure can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

The devices and methods illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention. The invention has been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein.

The invention claimed is:

1. A transportable modular command control and communications unit for performing data collection, analysis, and communication transmission in an inhospitable environment, the transportable modular unit comprising:
    a housing formed of skeletal framework and at least one interchangeable wall units, the skeletal framework defining an interior space and an exterior space and including a plurality of opposed sets of boundary members being offset from one another by a first distance, each opposed set of boundary members defining a forward side boundary and a rearward side boundary, the forward side boundary and the rearward side boundary being coupled to one another by at least one top extended joining member and a bottom extended joining member, each extended joining member spanning the first distance, together the forward and rearward side boundaries along with the top and bottom extended joining members comprise a first surface interface forming a first receptacle boundary for receiving the at least one interchangeable wall units, the at least one interchangeable wall units being configured to join the receptacle boundary in a manner so as to at least partially enclose the housing thereby separating the interior space from the exterior space, the at least one interchangeable wall unit including a work station having at least one client computing device and a display screen;
    a plurality of sensor elements, the plurality of sensor elements including interior sensor elements positioned within the interior space, and exterior sensor elements coupled to an exterior portion of the housing, the interior sensor elements being configured for detecting one or more interior conditions, and the exterior sensor elements being configured for determining one or more exterior conditions, collectively the sensor elements being adapted for collecting internal and external sensed data;
    a server system, contained within the interior space and being coupled to the plurality of sensor elements and the client computing device via a network interface, the server system having one or more processing units, the one or more processing units including a plurality of processing engines configured for receiving and analyzing the collected internal and external sensed data to produce analyzed result data;

a data storage unit coupled to one or more of the server system and the client computing device by the network interface, the data storage unit including one or more structured databases for storing the collected internal and external sensed data as well as the analyzed result data according to one or more classifications; and a communication's module comprising one or more of a radio frequency (RF) transmitter, a cellular transmitter, a WIFI transmitter, a LiFi transmitter, and a Bluetooth transmitter, for communicating the collected internal and external sensed data and the analyzed result data.

2. The transportable modular command control and communications unit in accordance with claim 1, wherein the interior space defines an internal area and the housing is adjustable in a manner such that the internal area may be increased or decreased.

3. The transportable modular command control and communications unit in accordance with claim 2, wherein one or more of the plurality of opposed sets of boundary members and each extended joining member is configured for being lengthened, shortened, or bent thereby increasing or decreasing the internal area.

4. The transportable modular command control and communications unit in accordance with claim 3, wherein one or more of the plurality of opposed sets of boundary members and each extended joining member comprises a plurality of segments that are configured for collapsing in on one another telescopically.

5. The transportable modular command control and communications unit in accordance with claim 3, wherein one or more of the plurality of opposed sets of boundary members and each extended joining member comprises a plurality of segments that are configured for rotating or pivoting with respect to one another in a manner so as to increase or decrease the area.

6. The transportable modular command control and communications unit in accordance with claim 5, wherein the plurality of segments are coupled one with another by a hinge member.

7. The transportable modular command control and communications unit in accordance with claim 6, wherein the hinge member is configured for allowing one or more of the plurality of segments to pivot with respect to one another in one or more of an X, Y, or Z plane.

8. The transportable modular command control and communications unit in accordance with claim 7, wherein the hinge member is configured for ratcheting in accordance with a defined arc.

9. The transportable modular command control and communications unit in accordance with claim 3, wherein one or more of the plurality of opposed sets of boundary members and each extended joining member is comprised a flexible material that is configured for bending.

10. The transportable modular command control and communications unit in accordance with claim 3, wherein each of the opposed sets of boundary members has a "C"-like configuration.

11. The transportable modular command control and communications unit in accordance with claim 10, wherein the "C"-like configuration is curved or curvilinear.

12. The transportable modular command control and communications unit in accordance with claim 10, wherein the "C"-like configuration is not curved.

13. The transportable modular command control and communications unit in accordance with claim 2, wherein each extended joining member is configured for being lengthened or shortened in a manner to increase or decrease the first distance.

14. The transportable modular command control and communications unit in accordance with claim 3, wherein each of the opposed sets of boundary members is comprised of at least 3 or 4 binding segments, including at least one set of opposed bounding segments that are offset by one another by one or more of a third or fourth bounding segment.

15. The transportable modular command control and communications unit in accordance with claim 14, wherein each of the opposed sets of boundary members is comprised of at least 4 binding segments.

16. The transportable modular command control and communications unit in accordance with claim 15, wherein each of the opposed sets of boundary members is comprised of two sets of opposed binding segments so as to form a square such that the housing forms a cube.

17. The transportable modular command control and communications unit in accordance with claim 14, wherein at least 2 of the binding segments of each of the opposed boundary members is coupled to one another by a hinge member that is configured for allowing one or more of the plurality of segments to pivot with respect to one another in one or more of an X, Y, or Z plane.

18. The transportable modular command control and communications unit in accordance with claim 1, wherein at least of the forward side boundary and the rearward side boundary includes one or more of a removable wall panel interface, for being coupled to a wall panel, and a second housing side boundary interface configured for allowing a side boundary of the first housing to be coupled to a side boundary of a second housing.

19. The transportable modular command control and communications unit in accordance with claim 18, wherein together each of the forward side boundary, the rearward side boundary, and the top and bottom extended joining members comprise a second surface interface forming one or more of a removable wall panel interface, configured for being coupled to a removable wall panel, a second receptacle boundary interface for receiving a second interchangeable wall unit, and a modular unit interface configured for allowing the first modular unit to be coupled to a second module unit.

20. The transportable modular command control and communications unit in accordance with claim 19, wherein each of the forward side boundary and the rearward side boundary includes a removable wall panel, having one or more of a window or a door positioned therein, and wherein the transportable modular communications unit is coupled to a second transportable modular communications unit via the modular unit interface.

* * * * *